(12) United States Patent
Vazquez et al.

(10) Patent No.: US 7,937,665 B1
(45) Date of Patent: May 3, 2011

(54) SYSTEM AND METHOD FOR AUTOMATICALLY GENERATING A GRAPHICAL PROGRAM TO IMPLEMENT A PROTOTYPE

(75) Inventors: Nicolas Vazquez, Austin, TX (US); Jeffrey L. Kodosky, Austin, TX (US); Ram Kudukoli, Austin, TX (US); Kevin L. Schultz, Georgetown, TX (US); Dinesh Nair, Austin, TX (US); Christophe Caltagirone, Austin, TX (US)

(73) Assignee: National Instruments Corporation, Austin, TX (US)

( * ) Notice: Subject to any disclaimer, the term of this patent is extended or adjusted under 35 U.S.C. 154(b) by 2153 days.

(21) Appl. No.: 09/595,003

(22) Filed: Jun. 13, 2000

(51) Int. Cl.
*G06F 3/048* (2006.01)

(52) U.S. Cl. ........ 715/763; 715/965; 715/967; 715/970; 715/771

(58) Field of Classification Search .................. 345/853, 345/704, 743, 763; 715/965, 967, 970, 771; 715/763; 717/105, 109
See application file for complete search history.

(56) References Cited

U.S. PATENT DOCUMENTS

| | | | |
|---|---|---|---|
| 3,744,031 A | 7/1973 | Avery et al. | |
| 4,831,580 A | 5/1989 | Yamada | |
| 4,901,221 A | 2/1990 | Kodosky et al. | |
| 4,914,568 A | 4/1990 | Kodosky et al. | |
| 5,005,119 A | 4/1991 | Rumbaugh et al. | |
| 5,291,587 A | 3/1994 | Kodosky et al. | |
| 5,301,301 A | 4/1994 | Kodosky et al. | |
| 5,301,336 A | 4/1994 | Kodosky et al. | |
| 5,309,556 A | 5/1994 | Sismilich | |
| 5,331,111 A | 7/1994 | O'Connell | |
| 5,386,508 A | 1/1995 | Itonori et al. | |
| 5,481,712 A | 1/1996 | Silver et al. ................... 717/109 |
| 5,485,601 A | 1/1996 | Ching | |
| 5,490,246 A * | 2/1996 | Brotsky et al. ............... 345/763 |

(Continued)

FOREIGN PATENT DOCUMENTS

EP 0510514 * 10/1992

OTHER PUBLICATIONS

Advanced Imaging, Special Report: Imaging and the Macintosh/Robust Image Databases, Apr. 1991, pp. 18-32.

(Continued)

*Primary Examiner* — Namitha Pillai
(74) *Attorney, Agent, or Firm* — Meyertons Hood Kivlin Kowert & Goetzel, P.C.; Jeffrey C. Hood; Jason L. Burgess

(57) ABSTRACT

A system and method for automatically generating a graphical program from a prototyping environment application. By utilizing an application specialized for developing solutions to problems in a particular domain, i.e., a prototyping environment, a user may develop a solution to a problem, i.e., a prototype. The prototype may comprise a series of functions that form an algorithm or process. Once the user has developed the desired prototype, the user may request the prototyping environment to automatically, i.e., programmatically, generate a graphical program implementing the prototype, e.g., in order to run the program independently of the prototyping environment. In various embodiments, the prototyping environment may be operable to generate any of various types of graphical programs. Once the graphical program has been generated, the program may be modified as desired, e.g., in order to include features not available from the prototyping environment that generated the program.

86 Claims, 45 Drawing Sheets

U.S. PATENT DOCUMENTS

| | | | |
|---|---|---|---|
| 5,497,498 | A | 3/1996 | Taylor |
| 5,535,342 | A | 7/1996 | Taylor |
| 5,541,849 | A | 7/1996 | Rostoker et al. |
| 5,583,749 | A | 12/1996 | Tredennick et al. |
| 5,603,043 | A | 2/1997 | Taylor et al. |
| 5,623,659 | A * | 4/1997 | Shi et al. ............................ 707/8 |
| 5,631,974 | A * | 5/1997 | Lau-Kee et al. ............... 382/132 |
| 5,638,299 | A | 6/1997 | Miller |
| 5,652,875 | A | 7/1997 | Taylor |
| 5,684,980 | A | 11/1997 | Casselman |
| 5,732,277 | A | 3/1998 | Kodosky et al. |
| 5,737,235 | A | 4/1998 | Kean et al. |
| 5,742,504 | A | 4/1998 | Meyer et al. |
| 5,764,546 | A | 6/1998 | Bryant et al. |
| 5,862,372 | A * | 1/1999 | Morris et al. .................. 717/109 |
| 5,911,070 | A | 6/1999 | Solton et al. |
| 5,940,296 | A | 8/1999 | Meyer |
| 5,966,532 | A | 10/1999 | McDonald et al. |
| 6,006,039 | A | 12/1999 | Steinberg et al. |
| 6,053,951 | A * | 4/2000 | McDonald et al. ............... 717/1 |
| 6,064,409 | A | 5/2000 | Thomsen et al. |
| 6,173,438 | B1 | 1/2001 | Kodosky et al. |
| 6,201,516 | B1 | 3/2001 | Tanide et al. |
| 6,219,628 | B1 | 4/2001 | Kodosky et al. |
| 6,237,136 | B1 | 5/2001 | Sadahiro |
| 6,282,699 | B1 | 8/2001 | Zhang et al. |
| 6,298,474 | B1 * | 10/2001 | Blowers et al. .................... 717/1 |
| 6,349,274 | B1 | 2/2002 | Kay et al. |
| 6,366,300 | B1 | 4/2002 | Ohara |
| 6,369,836 | B1 | 4/2002 | Larson et al. |
| 6,408,428 | B1 | 6/2002 | Schlansker et al. |
| 6,408,429 | B1 * | 6/2002 | Marrion, Jr. et al. ............. 717/1 |
| 6,437,805 | B1 | 8/2002 | Sojoodi et al. |
| 6,442,442 | B1 | 8/2002 | Weinhofer |
| 6,526,566 | B1 | 2/2003 | Austin |
| 6,584,601 | B1 | 6/2003 | Kodosky et al. |
| 6,608,638 | B1 | 8/2003 | Kodosky et al. |
| 6,629,312 | B1 | 9/2003 | Gupta |
| 6,637,022 | B1 | 10/2003 | Weeren et al. |
| 6,684,381 | B1 | 1/2004 | Bening et al. |
| 6,690,981 | B1 | 2/2004 | Kawachi et al. |
| 6,715,139 | B1 | 3/2004 | Kodosky et al. |
| 6,750,944 | B2 | 6/2004 | Silverbrook et al. |
| 6,751,653 | B2 | 6/2004 | Austin |
| 6,763,515 | B1 | 7/2004 | Vazquez et al. |
| 6,802,053 | B1 | 10/2004 | Dye et al. |
| 6,904,577 | B2 | 6/2005 | Schubert et al. |
| 6,934,667 | B2 | 8/2005 | Kodosky et al. |
| 6,934,668 | B2 | 8/2005 | Kodosky et al. |
| 6,941,543 | B1 | 9/2005 | Brown et al. |
| 2001/0020291 | A1 | 9/2001 | Kudukoli et al. |
| 2001/0024211 | A1 | 9/2001 | Kudukoli et al. |
| 2001/0035879 | A1 | 11/2001 | Washington et al. |
| 2002/0055947 | A1 | 5/2002 | Schultz et al. |
| 2005/0091602 | A1 | 4/2005 | Ramamoorthy et al. |
| 2005/0143968 | A9 | 6/2005 | Odom et al. |

OTHER PUBLICATIONS

Optilab Image Processing and Analysis Software for the Apple Macintosh™ II, User's Manual, dated 1990.

MacUser, John Rizzo, Image Analyst and Enhance, Jul. 1990, pp. 55-58.

SPIE—The International Society for Optical Engineering, Steven Rosenthal and Larry Stahlberg, "Integrated Approach to Machine Vision Application Development", vol. 1386, Nov. 8, 1990, pp. 158-162.

IPLab, Serious Image Processing for the Macintosh II, 1990.

SPIE—The International Society for Optical Engineering, Michael S. Mort and Robert J. Fontana, "Low Cost Image Analysis Workstation Which is Menu Driven and Extensible," vol. 1232, Feb. 4, 1990, pp. 380-389.

IPLab™, User's Guide, Signal Analytics Corporation, 1991.

MacGuide Magazine, vol. 2, Issue 4, Stuart Gitlow, M.D., "X-Ray Vision," Jun. 1989, pp: 89-94.

Ric Ford, Optimage Processes Scientific Images, 1994.

Signal Analytics Corp., News Release, "Signal Analytics Brings Powerful Scientific Image Processing to the Macintosh II", Feb. 1, 1990 (2 pgs.).

US 6,094,526, Marrion et al. (withdrawn).

IPLab, "Serious Scientific Image Processing for the Macintosh II", 1992 (4 pgs.).

IPLab, "Gives You Unparalleled Value", 1992, (6 pgs.).

Signal Analytics Corp., "IPLab Brings Affordable Scientific Image Processing to the Macintosh II", estimated 1990 (2 pgs.).

Automatix Inc., "A Seminar on Machine Vision & Image Analysis", 1993, (46 pgs.).

National Instruments, Measurement and Automation Catalogue, Interactive Vision Software, 1999, pp. 518-520.

MacUser, "Ultimage and IPLab Spectrum", Jul. 1991, (5 pgs.).

"IMAQ Vision Builder Tutorial," National Instruments, Jan. 1999.

Niel Hunt; "IDF: A graphical dataflow programming language for image processing and computer vision"; IEEE International Conference on Systems, Man and Cybernetics; Nov. 1990; pp. 351-360.

W.A. Keddy and P. Agathoklis; "DEDIP: A User-friendly environment for digital image processing algorithm development"; IEEE Pacific Rim Conference on Communications, Computers and Signal Processing; May 1991, pp. 733-736.

Konstantinos Konstantinides and John R. Rasure; The Khoros Software Development Environment for Image and Signal Processing, IEEE Transactions on Image Processing; May 1994; pp. 243-252; vol. 3, No. 3.

Young-Seok Sim, Chae-Seong Lim, Young-Shik Moon and Sung-Han Park; "Design and Implementation of the Visual Programming Environment for the Distributed Image Processing," International Conference on Image Processing; Sep. 1996; pp. 149-152.

"SILMA Products—Production Pilot"; May 24, 2001; 4 pages; Retrieved from the Internet: "www.adept.com/Silma/products/pd-productionpilot.html".

"RoboWorks" Mar. 2002; 3 pages; Retrieved from Internet: www.newtonium.com/public_html/Products/RoboWorks/RoboWorks.htm.

"The Measurement and Automation Catalog 2002" National Instruments Corporation; 2002; pp. 97 and 580-594.

Motion Architect User Guide, Compumotor; Aug. 1994, 23 pages.

"Software Solutions"; GE Fanuc Automation; 2002; 8 pages.

"CIMPLICITY Machine Edition—Motion Developer"; GE Industrial Systems; Dec. 6, 2001; 4 pages.

"CIMPLICITY Machine Edition"; GE Fanuc Automation; 2000; 4 pages.

"Motion Builder: Making Motion Control Programming Easy"; Servo Catalogue; pp. 86-87.

* cited by examiner

New VI Reference Node

Open VI Object Reference Node

Downcast Reference Node

Close Application or VI Reference Node

SYSTEM AND METHOD FOR AUTOMATICALLY GENERATING A GRAPHICAL PROGRAM TO IMPLEMENT A PROTOTYPE

RESERVATION OF COPYRIGHT

A portion of the disclosure of this patent document contains material to which a claim of copyright protection is made. The copyright owner has no objection to the facsimile reproduction by anyone of the patent document or the patent disclosure as it appears in the Patent and Trademark Office patent file or records, but reserves all other rights whatsoever.

FIELD OF THE INVENTION

The present invention relates to the fields of software-implemented prototyping and graphical programming, and more particularly, to the automatic generation of a graphical program that implements a prototype constructed in a prototyping environment application.

DESCRIPTION OF THE RELATED ART

Knowledge of computer-implemented techniques for solving problems in a wide array of fields is expanding at a rapid pace. As new techniques and computerized methods are developed for a given problem domain, specialized software applications for developing solutions to problems in that domain are often created. These specialized applications can provide an environment that is conducive to rapidly and conveniently prototyping a problem solution. Hence, these applications are also referred to as "prototyping environments".

A prototyping environment may integrate various capabilities in order to aid developers of problem solutions, depending on the particular problem domain. For example, a prototyping environment may provide a library of operations that are specific to a problem domain and may enable a user to select and execute various operations from the library. The prototyping environment may include a graphical user interface that is streamlined for interactively experimenting with various parameters associated with the selected operations and seeing the effects of the adjusted parameters. A prototyping environment may also include capabilities for simulating real-world objects or processes. A prototyping environment may be used to generate a recipe, solution, or script, also called a prototype, which represents an algorithm or process designed by the user in the prototyping environment.

Prototyping environments may be developed for many different problem domains. For example, a prototyping environment for image processing may enable a user to load or acquire an image and apply various image processing operations to the image, such as filtering operations, morphology operations, edge detection operations, etc. Such a prototyping environment may enable the user to build a script including various operations that are applied to images, e.g., for use in a machine vision, pattern matching, shape matching, or other imaging application. Other examples of prototyping environments include:

a sound processing environment for applying various audio operations to a sound clip, e.g., in order to analyze the sound clip, eliminate background noise, etc.

an instrumentation environment for interacting with hardware instruments, e.g., in order to initialize an instrument, acquire data from the instrument, analyze the acquired data, etc.

a circuit design environment for developing and testing circuit designs, e.g., for programmable logic devices Since prototyping environments are usually designed for ease of use and are specialized for users familiar with a particular problem domain, they may enable users to create a computer-implemented solution to a problem without requiring the users to utilize or understand traditional programming techniques. For example, the prototyping environment may aid the user in creating a recipe or script (called a prototype) and offer other guidance to help the user in creating the solution. However, there is often a tradeoff between specialization/ease-of-use and the ability to create customized solutions to a problem. For example, a user may desire the ability to enhance a solution with features that are not provided by the prototyping environment used to create the solution. Also, a solution created using a given prototyping environment usually may be run within that prototyping environment. However, it may be desirable to instead export the solution into other environments. For example, it may be desirable to create a computer program which implements the solution, recipe, or prototype. This would allow the user to integrate the solution with other applications or processes.

Thus, it is often desirable to enable a prototyping environment to automatically generate an independent program that implements a solution created in the prototyping environment. In particular, it may be desirable to enable the prototyping environment to generate a graphical computer program, rather than a program coded in a traditional text-based programming language, such as C, C++, Java, Basic, Fortran, Pascal, etc. When traditional text-based programming languages are used, the user's programming skills and ability to interact with the computer system often become a limiting factor in the achievement of optimal utilization of the computer system.

There are numerous subtle complexities which a user must master before he can efficiently code or alter a program written in a text-based programming language. The task of programming a computer system to implement an algorithm or model a process often is further complicated by the fact that a sequence of formulas, steps or other procedures customarily used to conceptually model an algorithm or process often does not closely correspond to the traditional text-based programming techniques used to program a computer system to model such a process. In other words, the requirement that a user program in a text-based programming language places a level of abstraction between the user's conceptualization of the solution and the implementation of a method that accomplishes this solution in a computer program. Thus, a user often must master substantially different skills in order to both conceptually model a system or process and then to program a computer to model the system or implement the process. Since a user often is not fully proficient in techniques for programming a computer system in a text-based language to implement his solution, the efficiency with which the computer system can be utilized often is reduced.

Thus, graphical programming environments have become popular, in part, because they enable a user to easily and intuitively implement an algorithm or model a process. U.S. Pat. Nos. 4,901,221; 4,914,568; 5,291,587; 5,301,301; and 5,301,336; among others, to Kodosky et al disclose one embodiment of a graphical programming environment. The graphical programming environment disclosed in Kodosky et al can be considered a higher and more intuitive way in which to interact with a computer. The method disclosed in Kodosky et al allows a user to construct a diagram using a block diagram editor, such that the diagram created graphically displays a procedure or method for accomplishing a certain result, such as manipulating one or more input values to produce one or more output values. In response to the user constructing the diagram, data structures or executable code that corresponds to the displayed procedure is automatically created, so that the diagram may be compiled or interpreted by a computer. Therefore, a computer program may be created solely by using a graphically based programming environment. This graphically based programming environment may be used for creating virtual instrumentation systems, industrial automation systems, modeling processes, and simulation, as well as for any type of general programming.

Therefore, Kodosky et al teaches a graphical programming environment wherein a user places or manipulates icons in a block diagram using a block diagram editor to create a graphical "program." A graphical program for controlling or modeling devices, such as instruments, processes or industrial automation hardware, may be referred to as a virtual instrument (VI). A graphical program may have an associated graphical user interface, e.g., one or more front panels or user interface panels that include various user interface elements or front panel objects, such as controls or indicators, that represent or display the respective input and output that will be used by the graphical program or VI, and may include other icons which represent devices being controlled. The graphical user interface (GUI) may be comprised in a single window or screen of user interface elements, or may comprise a plurality of individual windows or screens, each having one or more user interface elements, wherein the individual windows may optionally be tiled together. When the controls and indicators are created in the graphical user interface, corresponding icons or terminals may be automatically created in the block diagram by the graphical programming environment. Alternatively, the user can place terminal icons in the block diagram, which may cause the display of corresponding user interface elements or front panel objects in the GUI, either at edit time or later at run time. As another example, the user interface elements may be embedded in the block diagram.

During creation of the graphical program, the user may select various function nodes or icons that accomplish his desired result and connect the function nodes together. For example, the function nodes may be connected in a data flow or control flow format. The function nodes may be connected between the terminals of the respective controls and indicators. Thus the user may create or assemble a data flow program, referred to as a block diagram, representing the graphical data flow which accomplishes his desired process. The assembled graphical program may then be compiled or interpreted to produce machine language that accomplishes the desired method or process as shown in the block diagram.

A user may input data to a graphical program using the user interface controls described above. This input data may propagate through the data flow block diagram or graphical program and appear as changes on the user interface output indicators. In an instrumentation application, the user interface panel can be analogized to the front panel of an instrument. In an industrial automation application the user interface panel can be analogized to the MMI (Man Machine Interface) of a device. The user may adjust the controls on the user interface panel to affect the input and view the output on the respective indicators. Alternatively, the user interface panel may be used merely to view the input and output, and the input may not be interactively manipulable by the user during program execution.

The use of graphical programming environments may be especially advantageous and natural in fields such as instrumentation, process control, industrial automation, simulation, machine vision, data acquisition, test and measurement, man machine interface (MMI), supervisory control and data acquisition (SCADA) applications, among others, in which computer systems are employed to model and/or control physical systems. Computer modeling or control of devices such as instruments or industrial automation hardware has become increasingly desirable in view of the increasing complexity and variety of instruments and devices available for use. As discussed above, specialized prototyping environments may be utilized to facilitate the development of solutions, such as scripts or prototypes, for performing such computer interaction with instruments or industrial automation hardware. When a need arises to transport the solution developed in the prototyping environment to an independent computer program, it would be desirable to automatically construct the program as a graphical program, since as described above, users may then more easily understand, modify, or maintain the program.

SUMMARY OF THE INVENTION

The problems outlined above may in large part be solved by providing a system and method for automatically generating a graphical program from a prototyping environment application, as described herein. By utilizing an application specialized for developing solutions to problems in a particular domain, i.e., a prototyping environment, a user may develop a solution to a problem, i.e., a prototype. The prototype may comprise a series of functions that form an algorithm or process. As an example, an image processing prototyping environment may be utilized to create a series of image processing operations, e.g., to select a series or set of machine vision or image processing tools, that may be applied to an image in order to analyze the image, e.g., in order to count the number of objects of a certain shape which appear in the image.

For each function of the prototype, one or more parameters may be associated with the function. The associated parameters may include input and/or output parameters. An input parameter provides a value affecting the behavior of the function, while an output parameter value is set by the function. For each input parameter, the prototyping environment may enable the user to adjust the parameter value as desired, e.g., in order to experimentally see the effect of varying the parameter value. For each output parameter, the prototyping environment may be operable to display the output parameter value, once the function has set the value. The prototyping environment may provide a graphical user interface for setting input parameter values and viewing output parameter values. As each function is added to the prototype, input parameter values that the user has set for the operation may be associated with the function. Parameters may have an associated data type, e.g., a simple type such as string, integer, floating point, Boolean, etc., or a complex type which is an aggregate of one or more simple types.

Once the user has developed the desired prototype, the user may request the prototyping environment to automatically, i.e., programmatically, generate a graphical program implementing the prototype, e.g., in order to run the program independently of the prototyping environment. In various embodiments, the prototyping environment may be operable to generate any of various types of graphical programs. For example, a generated program may be targeted toward a particular graphical programming development environment application, e.g., to utilize proprietary features or to create files that are formatted in a manner expected by the graphical programming development environment. Examples of graphical programming development environments include LabVIEW, BridgeVIEW, DasyLab, and DiaDem from National Instruments, VEE from Hewlett Packard, Sanscript from Northwoods Software, WiT from Coreco, and Vision Program Manager from PPT Vision, among others. In one embodiment, the prototyping environment may also be operable to generate a text-based program implementing the prototype, such as a program coded in C, C++, Java, Basic, Pascal, etc.

In one embodiment, the prototyping environment may interface with a graphical programming development environment in order to generate the graphical program, wherein the graphical programming development environment provides an application programming interface (API) to support the dynamic creation/editing of a graphical program. One particular embodiment of such an API is described.

Once the graphical program has been generated, the program may be modified as desired, e.g., in order to include features not available from the prototyping environment that generated the program.

In one embodiment, the prototyping environment is operable to display a series of interrelated user interface screens or windows, i.e., a code generation "wizard", in response to the user requesting the graphical program to be generated. The wizard may be operable to receive user input specifying various options to be used in generating the program. For example, the user may select a particular programming development environment where the program will be used.

As noted above, various parameters may be associated with functions of the prototype. In one embodiment, the wizard may enable the user to specify one or more of these parameters that are desired to be interactively changeable or viewable. The generated graphical program is then operable to display a user interface including controls and indicators that enable the user to change or view the parameter values interactively. The user interface control for a given input parameter is operable to receive user input, such as during program execution, and provide this input to the associated function in the program. Similarly, the user interface indicator for a given output parameter is operable to receive output data from the program, such as during program execution, and display this output to the user.

In one embodiment, the prototyping environment may be operable to store a prototype created by a user, e.g., as a script file. An association between a script created in the prototyping environment and the graphical program generated from the script may be maintained. This association may enable a user to run the automatically generated program and then return to the prototyping environment in order to view or edit the script used to generate the program. In one embodiment, the generated program may be "locked", requiring the user to explicitly unlock the program before it can be modified. Locking the program may facilitate the retrieval or recreation of the script information used to generate the program.

The techniques described herein may be applied in order to automatically generate graphical programs from prototyping environments geared toward any of various fields or disciplines. One particular example of a prototyping environment, an image processing prototyping environment, is discussed in order to gain a better understanding of the application of the system and methods described herein to a particular problem domain. It is noted, however, that the techniques described herein may be applied to any of various types of prototyping environments, as desired, such as prototyping environments directed toward process control, automation, test and measurement, machine vision, simulation, robotics, audio, video, graphics, and workflow processes, among others.

BRIEF DESCRIPTION OF THE DRAWINGS

A better understanding of the present invention can be obtained when the following detailed description of the preferred embodiment is considered in conjunction with the following drawings, in which.

Figure 1:
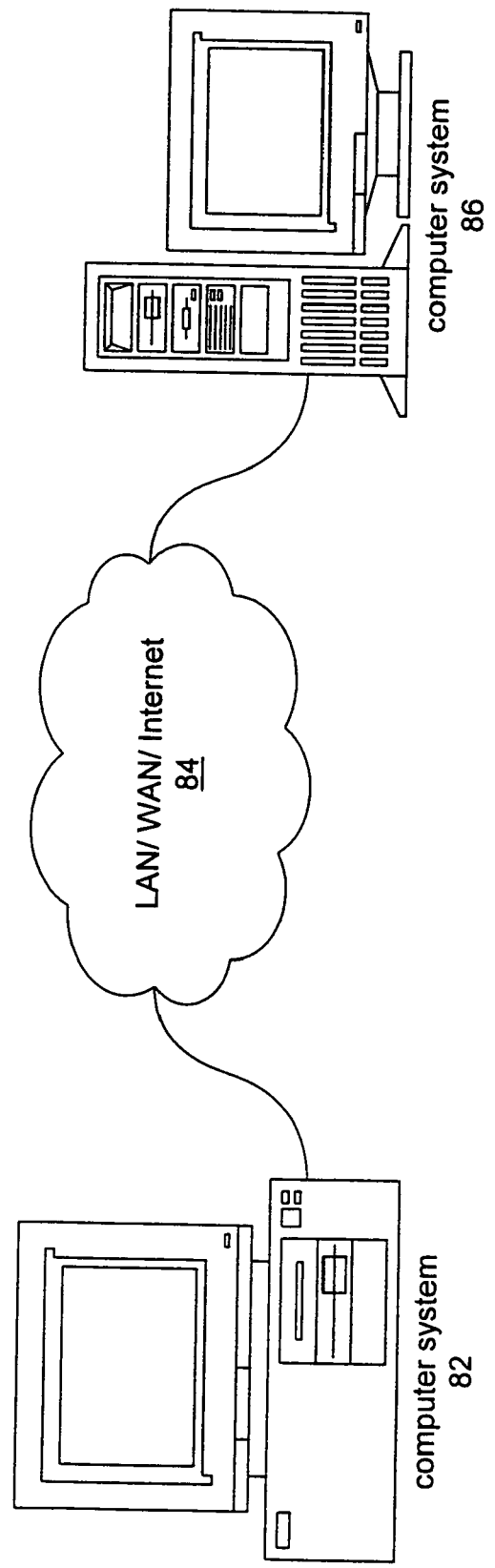
FIG. 1 illustrates a computer system connected through a network to a second computer system.

While the invention is susceptible to various modifications and alternative forms specific embodiments are shown by way of example in the drawings and are herein described in detail. It should be understood however, that drawings and detailed description thereto are not intended to limit the invention to the particular form disclosed, but on the contrary the invention is to cover all modifications, equivalents and alternative following within the spirit and scope of the present invention as defined by the appended claims.

DETAILED DESCRIPTION OF THE PREFERRED EMBODIMENT

Incorporation by Reference

The following references are hereby incorporated by reference in their entirety as though fully and completely set forth herein.

U.S. patent application Ser. No. 09/518,492 titled "System and Method for Programmatically Creating a Graphical Program" filed Mar. 3, 2000.

U.S. patent application Ser. No. 09/587,682 titled "System and Method for Automatically Generating a Graphical Program to Perform an Image Processing Algorithm" filed Jun. 5, 2000.

FIG. 1—Computer System Connected to a Network

FIG. 1 illustrates an exemplary computer network in which a computer system 82 is connected through a network 84 to a second computer system 86. The computer system 82 and the second computer system 86 can be any of various types, as desired. The network 84 can also be any of various types, including a LAN (local area network), WAN (wide area network), or the Internet, among others.

The computer system 82 includes or stores a prototyping environment application such as described above. The prototyping environment application may be used to create a prototype. As used herein, the term "prototype" is intended to include solutions, recipes, scripts, or other mechanisms which represent an algorithm, process, or solution to a problem. For example, a prototype may comprise a series or set of functions or operations that form an algorithm or process for a particular problem. A prototype may also comprise an "object-oriented" or other type of solution representation which indicates functions or operations that may be performed to accomplish a desired algorithm or solve a particular problem. As used herein, the term "algorithm" is intended to include algorithms, processes, solutions, or other methodologies for solving a problem or performing a function.

A particular example of a prototyping environment, an image processing prototyping environment, is discussed below, but in other embodiments the prototyping environment may be used to develop prototypes in any of various fields or disciplines, such as image processing, image analysis, machine vision, process control, automation, test and measurement, simulation, motion control, robotics, audio, video, graphics, telecommunications, and workflow processes, among others. Examples of prototyping environments include IMAQ Vision Builder from National Instruments Corporation, Checkpoint from Cognex Corporation, and IPLab Spectrum from Scanalytic Corporation, among others.

As described below, the prototyping environment (or a separate program) is operable to automatically (or programmatically) generate a graphical program implementing a prototype created in the prototyping environment. The graphical program that is thus generated may be a program associated with a particular graphical programming development environment application. For example, the program may utilize graphical program libraries provided by the graphical programming development environment or may run under control of the graphical programming development environment. The graphical programming development environment may reside on the computer system 82 or on the second computer system 86.

The prototyping environment may include all program logic necessary for generating the program. In this instance, the computer system 82 may implement one embodiment of the present invention without need of any services or programs from computer system 86. Alternatively, the prototyping environment stored on the computer system 82 may act as a client to a server program, e.g., the graphical programming development environment application, in order to request the server program to generate part or all of the graphical program. The server program may reside on the computer system 82 or on the second computer system 86. The client program may interface with the server program indirectly through a proxy component, such as an ActiveX component. The client program may also interface with the server program in any of various other ways, e.g., through a graphical application programming interface (API).

The prototyping environment, graphical programming development environment, and the generated program may be implemented in any of various ways, including procedure-based techniques, component-based techniques, and/or object-oriented techniques, among others. The programs may be written using distributed modules or components so that each of the prototyping environment, graphical programming development environment, and generated program may reside on any combination of computer system 82, computer system 86, and other computer systems connected to the network 84.

Figure 2A:
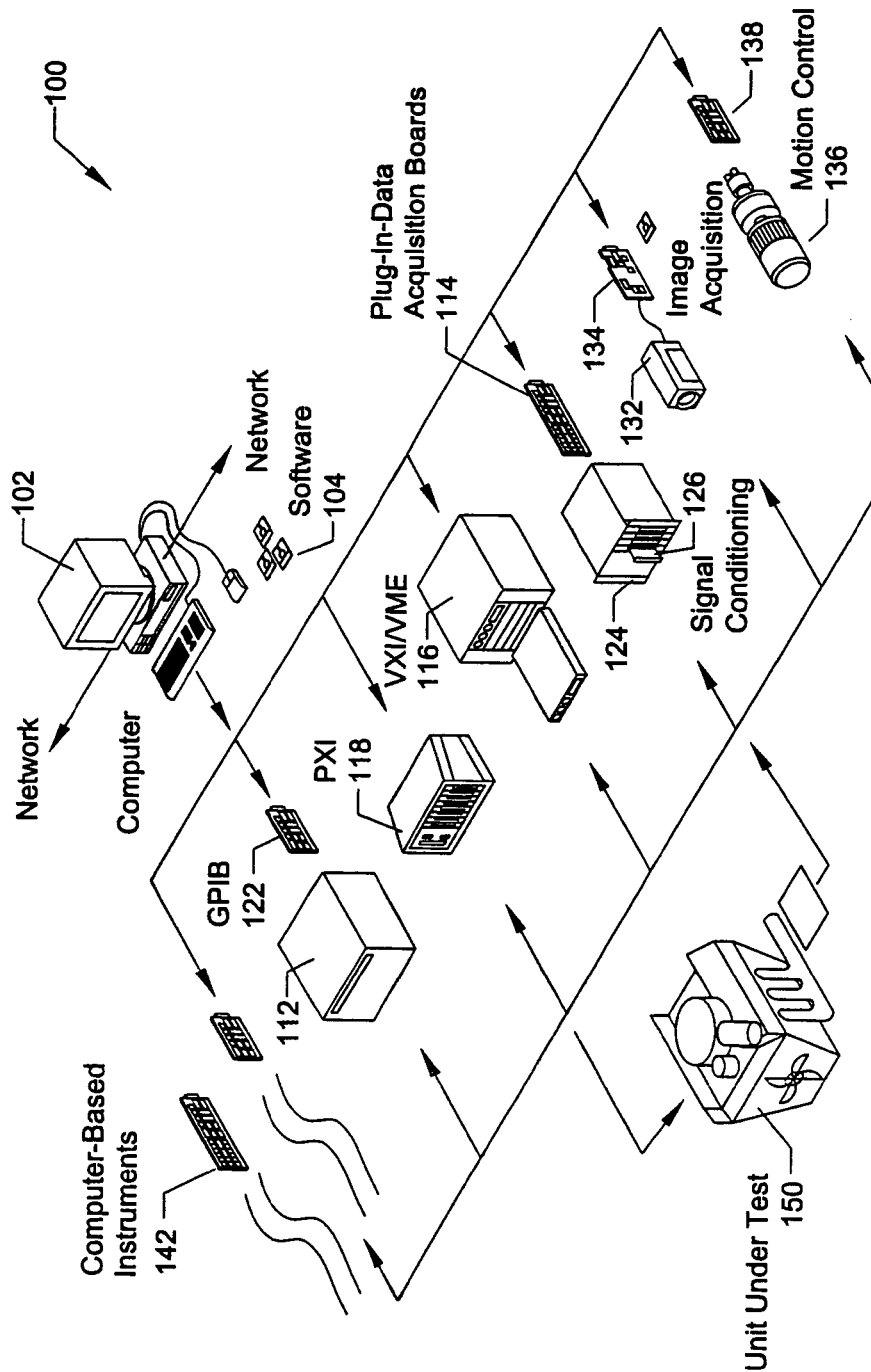
FIGS. 2A and 2B illustrate representative instrumentation and process control systems including various I/O interface options.
Figure 2B:
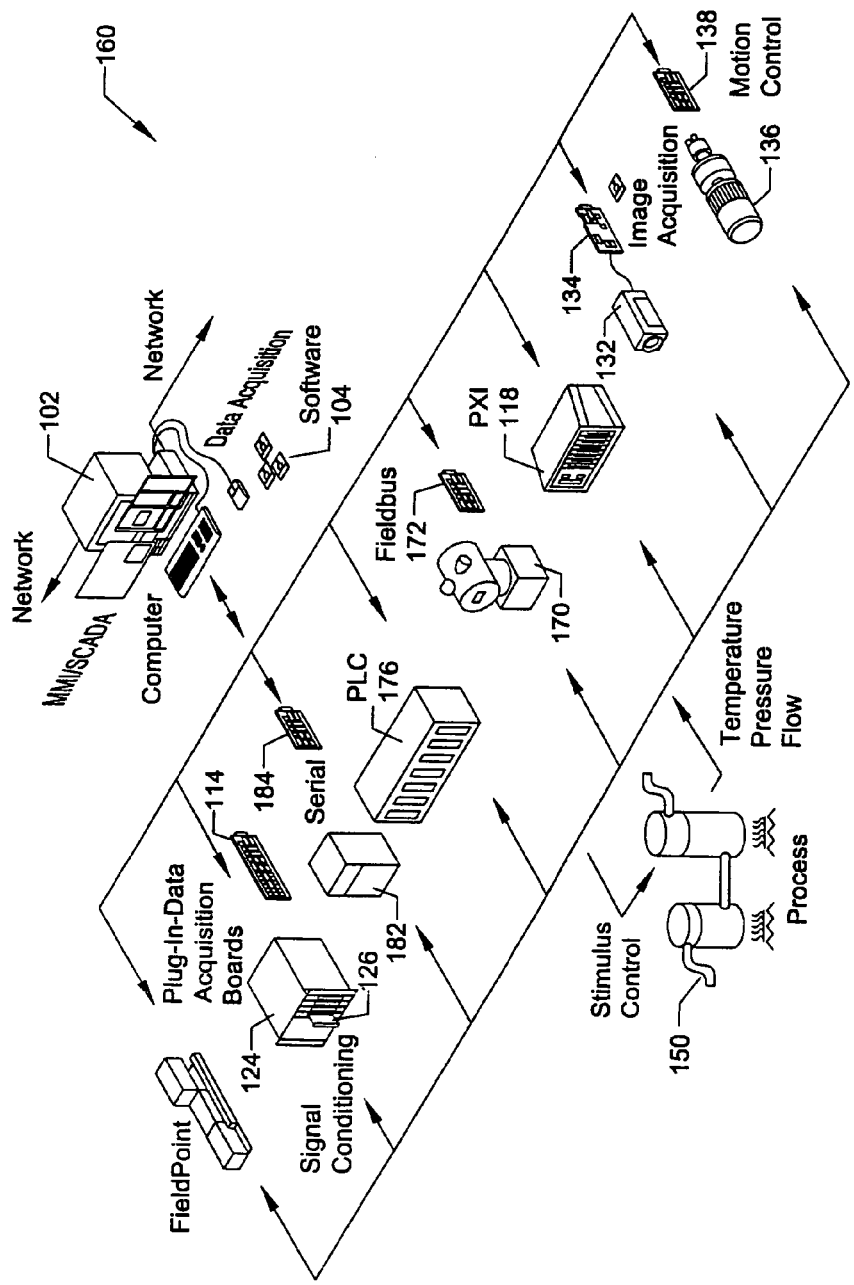

FIGS. 2A and 2B—Instrumentation and Industrial Automation Systems

FIGS. 2A and 2B illustrate exemplary systems which may store or use a prototyping environment and/or graphical programming development environment for automatically creating programs for image processing, machine vision, instrumentation, process control, or other purposes. These programs may of course be stored in or used by other types of systems as desired.

FIG. 2A illustrates an instrumentation control system 100. The system 100 comprises a host computer 102 which connects to one or more instruments. The host computer 102 comprises a CPU, a display screen, memory, and one or more input devices such as a mouse or keyboard as shown. The computer 102 connects through the one or more instruments to analyze, measure, or control a unit under test (UUT) or process 150. The host computer 102 may store prototyping environment and/or graphical programming development environment computer programs or components for automatically creating a graphical program, such as a graphical program which interacts with or controls the one or more instruments. In other words, the computer 102 may be either of computers 82 or 86.

The one or more instruments may include a GPIB instrument 112 and associated GPIB interface card 122, a data acquisition board 114 and associated signal conditioning circuitry 124, a VXI instrument 116, a PXI instrument 118, a video device 132 and associated image acquisition card 134, a motion control device 136 and associated motion control interface card 138, and/or one or more computer based instrument cards 142, among other types of devices.

The GPIB instrument 112 is coupled to the computer 102 via the GPIB interface card 122 provided by the computer 102. In a similar manner, the video device 132 is coupled to the computer 102 via the image acquisition card 134, and the motion control device 136 is coupled to the computer 102 through the motion control interface card 138. The data acquisition board 114 is coupled to the computer 102, and may interface through signal conditioning circuitry 124 to the UUT. The signal conditioning circuitry 124 preferably comprises an SCXI (Signal Conditioning eXtensions for Instrumentation) chassis comprising one or more SCXI modules 126.

The GPIB card 122, the image acquisition card 134, the motion control interface card 138, and the DAQ card 114 are typically plugged in to an I/O slot in the computer 102, such as a PCI bus slot, a PC Card slot, or an ISA, EISA or Micro-Channel bus slot provided by the computer 102. However, these cards 122, 134, 138 and 114 are shown external to computer 102 for illustrative purposes.

The VXI chassis or instrument 116 is coupled to the computer 102 via a VXI bus, MXI bus, or other serial or parallel bus provided by the computer 102. The computer 102 preferably includes VXI interface logic, such as a VXI, MXI or GPIB interface card (not shown), which interfaces to the VXI chassis 116. The PXI chassis or instrument is preferably coupled to the computer 102 through the computer's PCI bus.

A serial instrument (not shown) may also be coupled to the computer 102 through a serial port, such as an RS-232 port, USB (Universal Serial bus) or IEEE 1394 or 1394.2 bus, provided by the computer 102. In typical instrumentation control systems an instrument will not be present of each interface type, and in fact many systems may only have one or more instruments of a single interface type, such as only GPIB instruments.

The instruments are coupled to the unit under test (UUT) or process 150, or are coupled to receive field signals, typically generated by transducers. The system 100 may be used in a data acquisition and control application, in a test and measurement application, a process control application, or a man-machine interface application.

FIG. 2B illustrates an exemplary industrial automation system 160. The industrial automation system 160 is similar to the instrumentation or test and measurement system 100 shown in FIG. 2A. Elements which are similar or identical to elements in FIG. 2A have the same reference numerals for convenience. The system 160 comprises a computer 102 which connects to one or more devices or instruments. The computer 102 comprises a CPU, a display screen, memory, and one or more input devices such as a mouse or keyboard as shown. The computer 102 connects through the one or more devices to a process or device 150 to perform an automation function, such as MMI (Man Machine Interface), SCADA (Supervisory Control and Data Acquisition), portable or distributed data acquisition, process control, advanced analysis, or other control. In FIG. 2B, the computer 102 may store prototyping environment and/or graphical programming development environment programs or components for automatically creating a graphical program, such as a graphical program that is involved with the automation function performed by the automation system 160. In other words, the computer 102 may be either of computers 82 or 86.

The one or more devices may include a data acquisition board 114 and associated signal conditioning circuitry 124, a PXI instrument 118, a video device 132 and associated image acquisition card 134, a motion control device 136 and associated motion control interface card 138, a fieldbus device 170 and associated fieldbus interface card 172, a PLC (Programmable Logic Controller) 176, a serial instrument 182 and associated serial interface card 184, or a distributed data acquisition system, such as the Fieldpoint system available from National Instruments, among other types of devices.

The DAQ card 114, the PXI chassis 118, the video device 132, and the image acquisition card 136 are preferably connected to the computer 102 as described above. The serial instrument 182 is coupled to the computer 102 through a serial interface card 184, or through a serial port, such as an RS-232 port, provided by the computer 102. The PLC 176 couples to the computer 102 through a serial port, Ethernet port, or a proprietary interface. The fieldbus interface card 172 is preferably comprised in the computer 102 and interfaces through a fieldbus network to one or more fieldbus devices. Each of the DAQ card 114, the serial card 184, the fieldbus card 172, the image acquisition card 134, and the motion control card 138 are typically plugged in to an I/O slot in the computer 102 as described above. However, these cards 114, 184, 172, 134, and 138 are shown external to computer 102 for illustrative purposes. In typical industrial automation systems a device will not be present of each interface type, and in fact many systems may only have one or more devices of a single interface type, such as only PLCs. The devices are coupled to the device or process 150.

Referring again to FIGS. 2A and 2B, the computer system 102 preferably includes a memory medium on which one or more computer programs or software components according to the present invention are stored. The term "memory medium" is intended to include an installation medium, e.g., a CD-ROM, floppy disks 104, or tape device, a computer system memory such as DRAM, SRAM, EDO RAM, Rambus RAM, etc., or a non-volatile memory such as a magnetic media, e.g., a hard drive, or optical storage. The memory medium may comprise other types of memory as well, or combinations thereof.

In addition, the memory medium may be located in a first computer in which the programs are executed, or may be located in a second different computer which connects to the first computer over a network, such as the Internet. In the latter instance, the second computer provides the program instructions to the first computer for execution. Also, the computer system 102 may take various forms, including a personal computer system, mainframe computer system, workstation, network appliance, Internet appliance, personal digital assistant (PDA), television system or other device. In general, the term "computer system" can be broadly defined to encompass any device having at least one processor which executes instructions from a memory medium.

In one embodiment, the prototyping environment, graphical programming development environment, and/or the resulting graphical program that is automatically generated are designed for data acquisition/generation, analysis and/or display, machine vision, or for controlling or modeling instrumentation or industrial automation hardware. For example, in one embodiment, the graphical program that is generated is a National Instruments LabVIEW graphical program. The LabVIEW graphical programming development environment provides specialized support for developers of instrumentation and industrial automation applications.

However, it is noted that the present invention can be used for a plethora of applications and is not limited to machine vision, instrumentation, or industrial automation applications. In other words, FIGS. 2A and 2B are exemplary only, and graphical programs for any of various types of purposes may be automatically generated from prototyping environments targeted toward any of various types of purposes, where the prototyping environment, graphical programming development environment, and the generated graphical program are stored in and execute on any of various types of systems.

Figure 3:
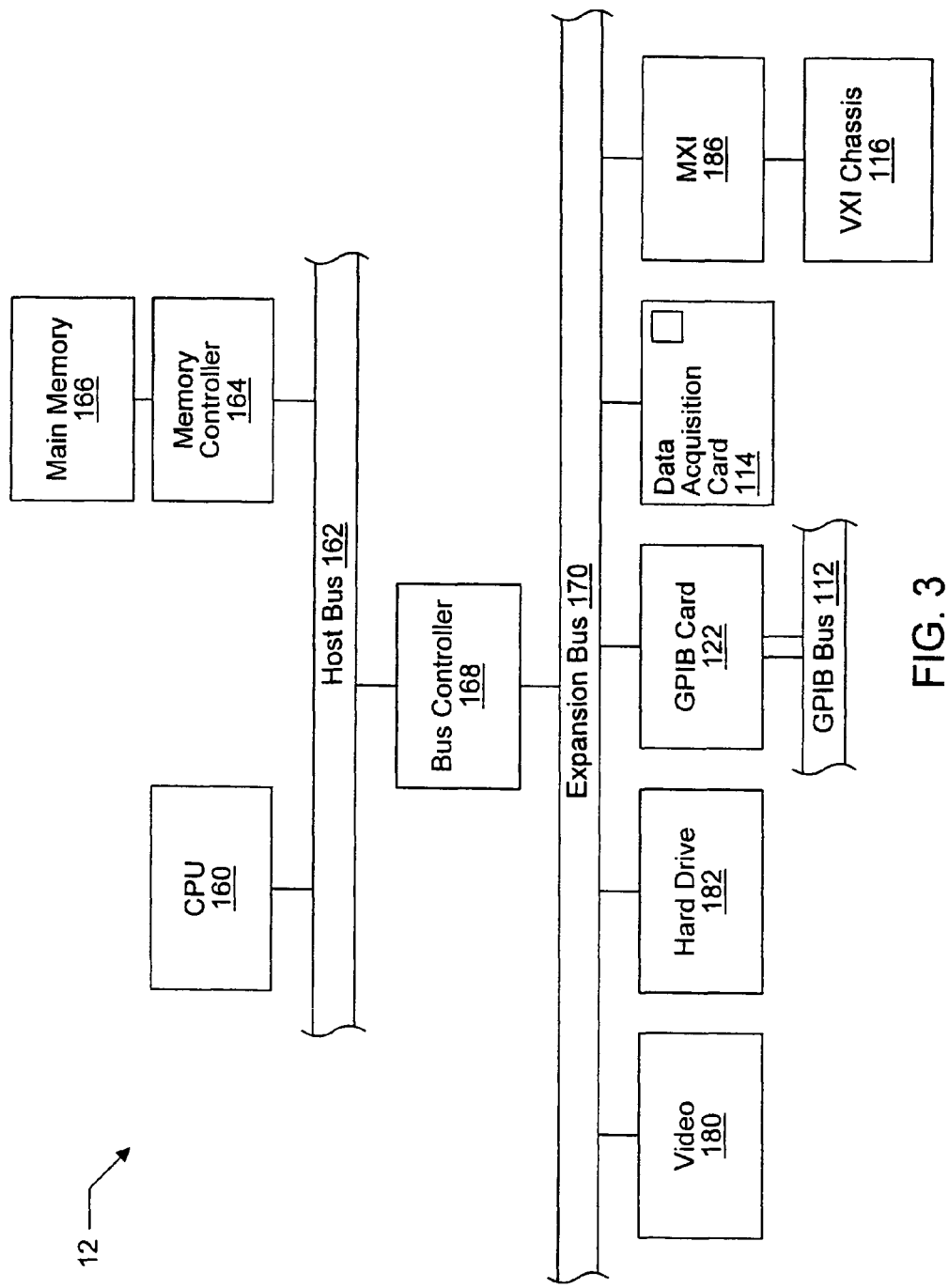
FIG. 3 is a block diagram of the computer system of FIGS. 1, 2A and 2B.

FIG. 3—Computer System Block Diagram

FIG. 3 is a block diagram of the computer system 82 or 86 (or 102) illustrated in FIGS. 1, 2A and 2B. It is noted that any type of computer system configuration or architecture can be used as desired, and FIG. 3 illustrates a representative PC embodiment. It is also noted that the computer system may be a general purpose computer system as shown in FIGS. 2A and 2B, a computer implemented on a VXI card installed in a VXI chassis, a computer implemented on a PXI card installed in a PM chassis, or other types of embodiments. The elements of a computer not necessary to understand the present invention have been omitted for simplicity.

The computer 102 includes at least one central processing unit or CPU 160 which is coupled to a processor or host bus 162. The CPU 160 may be any of various types, including an x86 processor, e.g., a Pentium class, a PowerPC processor, a CPU from the SPARC family of RISC processors, as well as others. Main memory or random access memory 166 is coupled to the host bus 162 by means of memory controller 164.

The main memory 166 stores computer programs according to the present invention. The main memory 166 also stores operating system software as well as the software for operation of the computer system, as well known to those skilled in the art. The computer programs of the present invention will be discussed in more detail below.

The host bus 162 is coupled to an expansion or input/output bus 170 by means of a bus controller 168 or bus bridge logic. The expansion bus 170 is preferably the PCI (Peripheral Component Interconnect) expansion bus, although other bus types can be used. The expansion bus 170 includes slots for various devices such as the data acquisition board 114 (of FIG. 2A), a GPIB interface card 122 which provides a GPIB bus interface to the GPIB instrument 112 (of FIG. 2A), and a VXI or MXI bus card 186 coupled to the VXI chassis 116 for receiving VXI instruments. The computer 102 further comprises a video display subsystem 180 and hard drive 182 coupled to the expansion bus 170.

Figure 4:
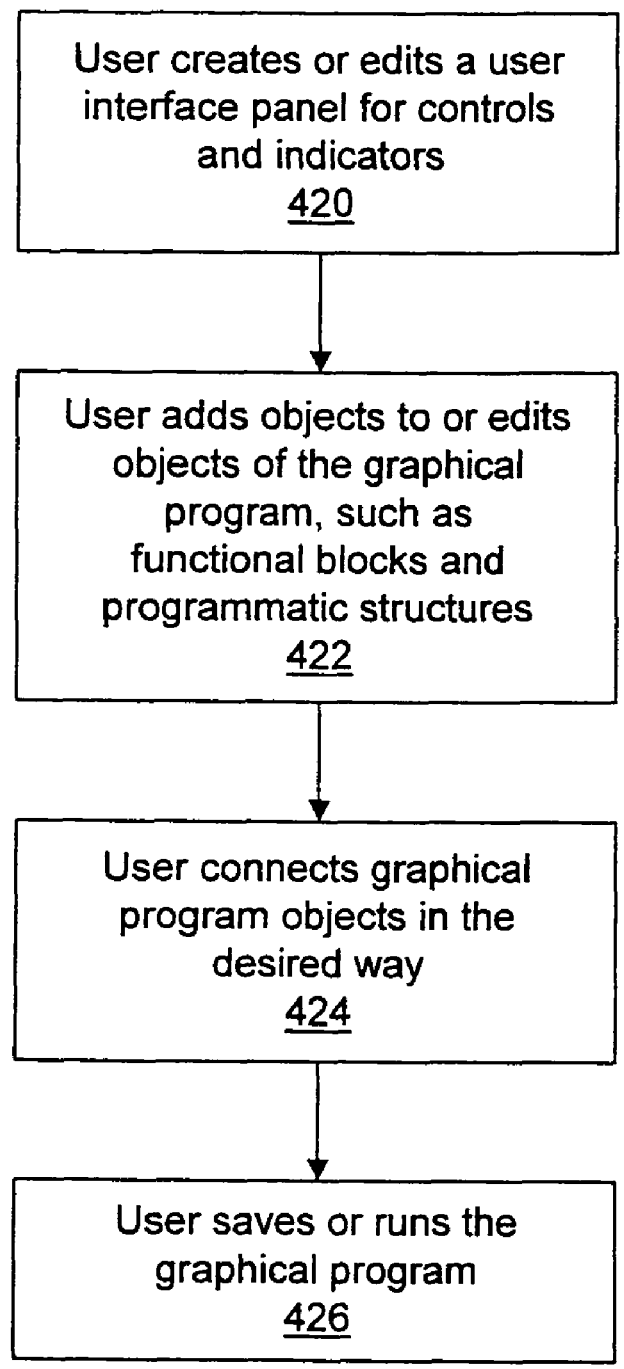
FIG. 4 is a flowchart diagram illustrating interactive creation or editing of a graphical program.

FIGS. 4-5: Interactive Creation of a Graphical Program by a User

FIG. 4 is a flowchart diagram illustrating one embodiment of how a user may interactively or manually create or edit a graphical program according to prior art. As shown in the flowchart and described below, the user manually adds various objects to a graphical program, connects them together, etc. The resulting graphical program may be operable to perform any of various types of operations, algorithms, or processes.

Figure 5A:
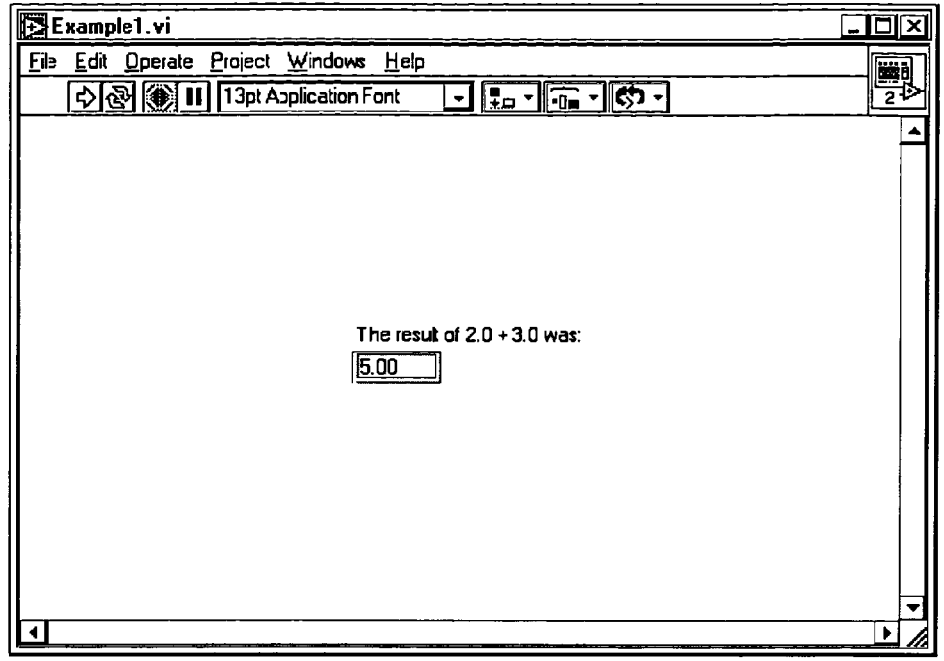
FIGS. 5A and 5B illustrate a simple graphical program comprising a user interface panel and a block diagram.

In the embodiment shown in FIG. 4, the steps are performed by a user creating or editing a graphical program in a graphical programming environment. As shown, in step 420 the user may create or edit a user interface panel for displaying a graphical user interface. The user interface panel may comprise controls for accepting user input, displaying information such as program output, or both. For example, the user interface panel may include buttons, selectable lists, text boxes, graph controls, images, etc. A user may "drop" various controls or other objects onto the user interface panel, e.g., by selecting the desired control from a control palette. FIG. 5A illustrates a simple user interface panel. Step 420 is not necessarily performed. For example, a user interface panel may not be desired, a user interface panel may be inherently specified during creation of the block diagram, or a user interface panel may automatically be created as the user creates the executable portions of the graphical program.

Figure 5B:
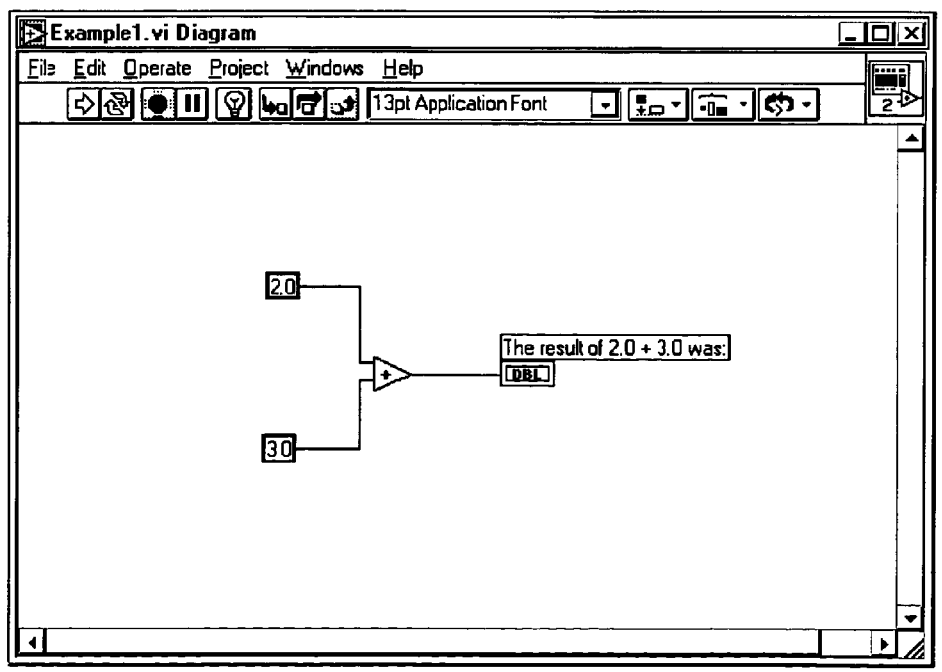

A graphical program may include a block diagram comprising objects referred to herein as "nodes" which are connected together to model the program execution logic and data flow or control flow. A block diagram node may be displayed as an icon representing the type or functionality of the node. FIG. 5B illustrates a simple block diagram. As a user adds objects to the user interface panel, the graphical programming environment may automatically create a corresponding object on the block diagram. Such block diagram nodes which correspond to user interface panel objects are referred to herein as user interface nodes. For example, the FIG. 5B block diagram node labeled "The result of 2.0+3.0 was:" is a user interface node corresponding to the FIG. 5A user interface output indicator. User interface nodes may be connected with other objects or nodes in the block diagram to participate in the program logic and data/control flow. User interface nodes may map input/output between a user interface panel and a block diagram. For example, the user interface node in FIG. 5B receives data and displays the data in the corresponding user interface indicator in FIG. 5A.

In step 422 of FIG. 4, the user adds other objects/nodes to or edits other objects/nodes of the graphical program. These objects or nodes may include function nodes which perform predefined functional operations such as numeric functions, Boolean functions, string functions, array functions, error functions, file functions, application control functions, etc. For example the block diagram shown in FIG. 5B uses an addition function node to add two constants together. In step 422 the user may also add other types of nodes to the graphical program. For example, nodes may be added which represent numeric constants. FIG. 5B illustrates numeric constant nodes representing the floating point constants 2.0 and 3.0.

Other types of nodes which may be added include subprogram nodes for calling a graphical subprogram, global or local variable nodes for defining and using variables, etc. In step 422, the user may also add other types of objects to the graphical program. For example, objects representing programmatic structures such as for loops, while loops, case structures, etc. may be added. The user may add nodes and other types of objects to a graphical program in various ways, e.g., by selecting a node or object from a palette that displays icons representing the various nodes and objects.

In step 424 of FIG. 4, the user connects or "wires" the graphical program objects in order to achieve the desired executable logic and data flow or control flow.

For example the objects may include input and output terminals, and the user may connect the output terminal of one node to the input terminal of another node, etc. FIG. 5B illustrates one embodiment of how objects may be connected. In this example, output terminals of the two numeric constant nodes are connected to the input terminals of an addition function node. The addition function node performs the addition operation on the numeric input. The output terminal of the addition function node is connected to the input of the user interface indicator node so that the result of the addition operation is displayed in the user interface panel shown in FIG. 5A.

Programmatic structure objects may also include terminals which integrate them with the other objects of the graphical program. For example, a while loop may comprise a condition terminal to which an output terminal of a node supplying a boolean value may be connected to signify when the loop should end.

In step 426 of FIG. 4, the user saves or runs the graphical program. The graphical program may be saved in any of various formats. For example, a tree of data structures may be built which represents the various elements of the graphical program and the relationships among the elements, and the data structures may be saved in a binary or text format. If the graphical program includes user interface panels, these panels may also be saved. In step 426 the user may also execute the graphical program. The user may run the graphical program in any of various ways. For example, a graphical programming environment may allow a program to be run from within the development environment, or the user may create a standalone program and run the program, etc.

It is noted that steps 420 through 426 typically occur in an iterative manner and typically occur in various orders. For example a user may add a user interface control to a user interface panel, then connect a user interface node corresponding to the control to another node, then add and connect a function node to the program, then run the program to test it, then change the way a node is connected, etc. Thus, the flowchart of FIG. 4 is exemplary, and various steps may be combined, omitted, added, reordered, or modified as required or desired for developing different graphical programs or using different embodiments of graphical program development environments.

As described below, an API which enables a client program to programmatically generate or edit a graphical program may be supported by a graphical programming system. Such an API may be utilized by a prototyping environment application to enable the automatic generation of a graphical program to implement a prototype, without requiring the type of user interaction described above with reference to FIGS. 4-5.

Figure 6:
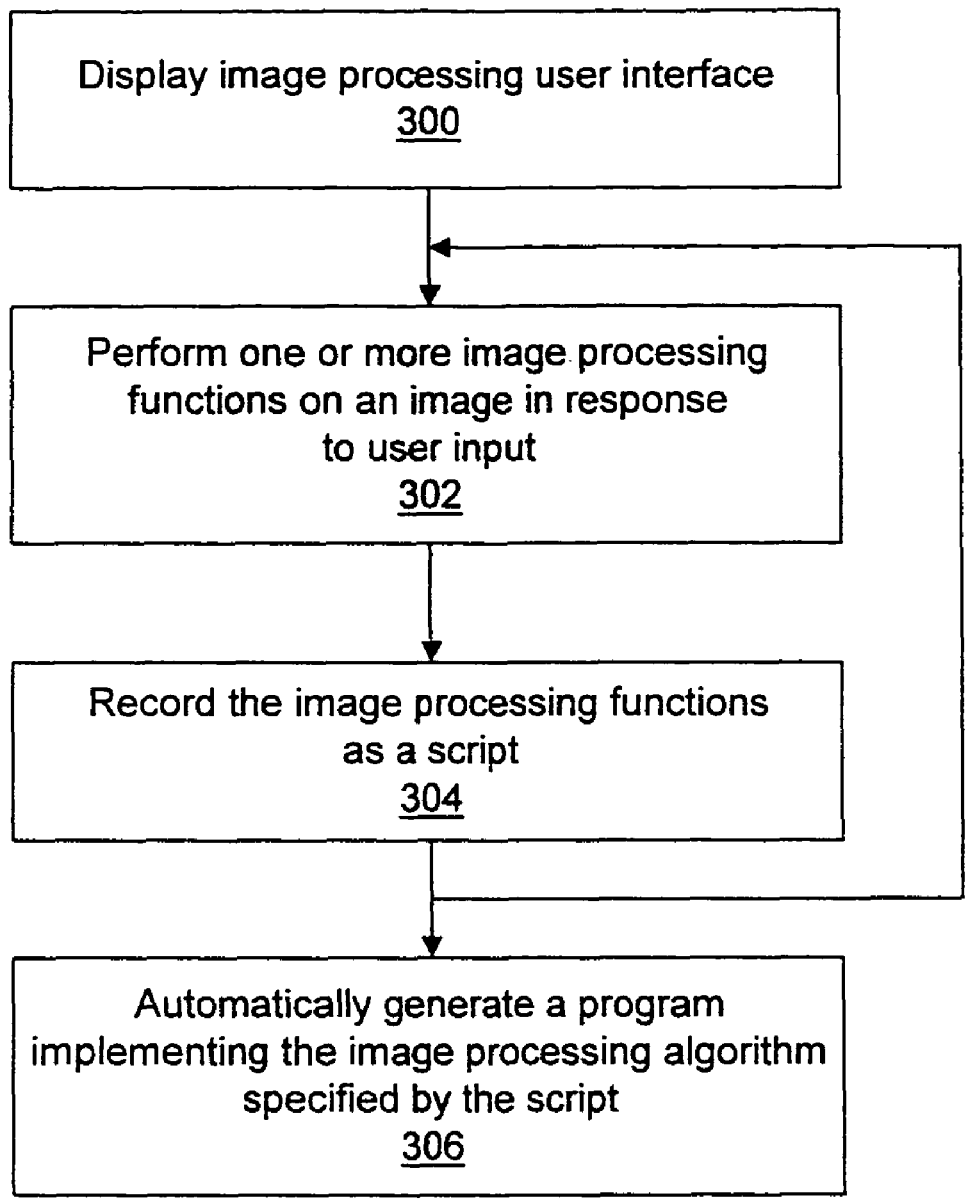
FIG. 6 is a flowchart diagram illustrating one embodiment of a method for automatically generating a graphical program to perform an algorithm or process.

FIG. 6—Automatic Creation of a Graphical Program

FIG. 6 is a flowchart diagram illustrating one embodiment of a method for automatically generating a graphical program to implement a prototype developed in a prototyping environment. In step 300, a user interface usable to develop a prototype may be displayed. As discussed above, the prototyping environment may be targeted toward creating prototype solutions to problems in any of various domains. An exemplary user interface for an image processing prototyping environment is described below.

In step 302, one or more functions or operations may be performed in response to user input accepted via the user interface displayed in step 300. For example, for an image processing prototyping environment, the user may load or acquire an image via the user interface, and step 302 may comprise selecting various image processing operations and applying the operations to the image. As the image processing operations are performed on the image, the user interface may update the image or display a separate resulting image.

As shown in step 304, the functions or operations performed in step 302 may be recorded, e.g., as a script which specifies steps of an algorithm or process. In other words, steps 302 and 304 comprise the creation of a prototype. It is noted that in another embodiment, steps 302 and 304 may comprise the creation of a prototype implemented as an "object-oriented", diagrammatic, or other type of solution representation which indicates functions or operations that may be performed in order to accomplish a desired algorithm or solve a particular problem.

The functions or operations recorded in step 304 may be recorded automatically in response to the user's actions of performing each function, or the user may provide input explicitly requesting each desired function to be recorded. For example, the user may first apply a given function and experimentally vary parameter values associated with the function in order to see the effects before recording the function. The user interface may enable the user to easily modify or analyze the recorded functions by adding or removing functions, performing undo operations, moving to a particular place in the list of functions and updating the state of the environment accordingly, etc.

In step 306, a graphical program implementing the recorded functions may be automatically generated, e.g., in response to a user request via the user interface. In the preferred embodiment, the step of automatically generating the graphical program is performed by programmatically generating the graphical program. Step 306 may be performed by the prototyping environment or by a different "program generation" program that may communicate with the prototyping environment, such as a graphical programming development application. One embodiment of step 306 is discussed in detail below.

In various embodiments, the prototyping environment may be operable to generate any of various types of graphical programs. For example, a generated program may be targeted toward a particular graphical programming development environment application, e.g., to utilize proprietary features or to create files that are formatted in a manner expected by the graphical programming development environment. Examples of graphical programming development environments include LabVIEW, BridgeVIEW, DasyLab, and DiaDem from National Instruments, VEE from Hewlett Packard, Sanscript from Northwoods Software, WiT from Coreco, and Vision Program Manager from PPT Vision, among others. In one embodiment, the prototyping environment may also be operable to generate a text-based program implementing the prototype, such as a program coded in C, C++, Java, Basic, Pascal, etc. For example, the prototyping environment may display a selectable list of program types enabling the user to indicate which type of graphical and/or text-based programs to create, wherein each program type specifies a particular programming development environment or programming language.

Figure 7:
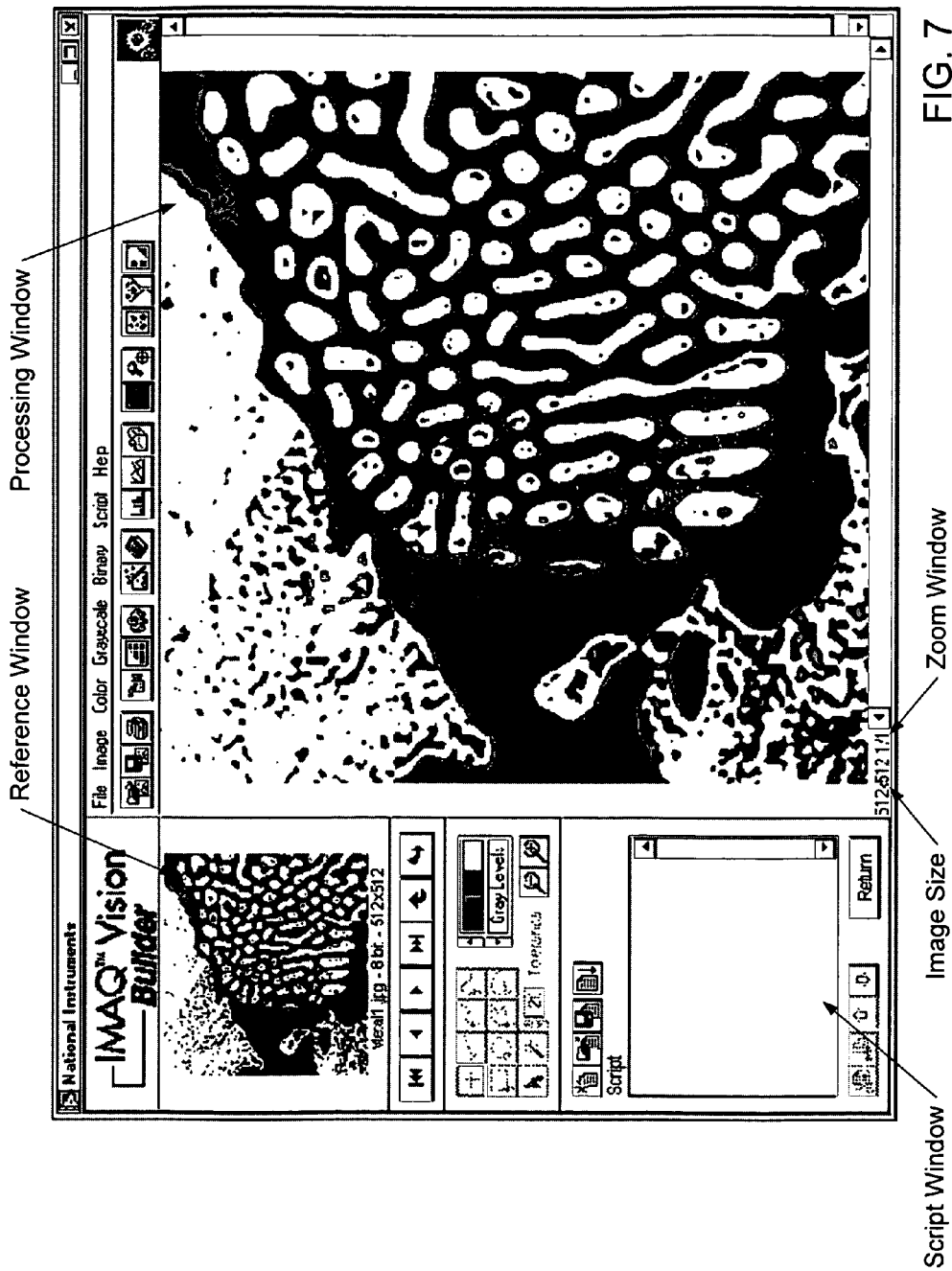
FIG. 7 illustrates an exemplary user interface for an image processing prototyping environment.

As noted above, FIG. 6 represents one embodiment of a method for automatically generating an image processing program, and various steps may be combined, omitted, added, reordered, or modified as desired. In particular, it is noted that the embodiment shown in FIG. 6 is illustrated in terms of FIGS. 7-14: Prototyping Environment User Interface An image processing prototyping environment application is discussed herein, in order to gain a better understanding of the application of the present invention to a particular field. FIG. 7 illustrates an exemplary user interface for an image processing prototyping environment application. The image processing prototyping environment may enable a user to easily load an image and quickly apply various image processing functions or operations to the image, immediately seeing the results. The image processing operations selected and applied by the user are preferably recorded as a script. Once the desired image processing algorithm has been developed, the prototyping environment may then automatically create a standalone graphical program in response to the script, i.e., to implement the algorithm comprised in the script.

In various embodiments, the image prototyping environment may be operable to load and manipulate any of various types of images, including gray-level and color images. The prototyping environment may also support complex images in which pixel values have a real part and an imaginary part. The images may be obtained from any of various sources. The images may, for example, be obtained from an image file, such as a BMP, TIFF, AIPD, PNG, JPG, or GIF file, or a file formatted according to another image format. The images may also be obtained from a hardware device, such as a camera. For example, images may be obtained from a device such as the video device 132 illustrated in FIGS. 2A and 2B, or from any of various other types of devices, including digital cameras, framegrabbers, etc.

The prototyping environment may support any of various image processing functions or operations. As used herein, the term "image processing" may include image processing, image analysis, and machine vision functions or operations, among others.

Image processing functions for processing an image may include functions such as:
 filtering functions for smoothing, edge detection, convolution, etc.
 morphology functions for modifying the shape of objects in an image, including erosion, dilation, opening, closing, etc.
 thresholding functions for selecting ranges of pixel values in grayscale and color images
 particle filtering functions to filter objects based on shape measurements The term "image processing" may also include functions for performing various types of image analysis, including:
 a histogram function that counts the total number of pixels in each grayscale value and graphs it
 a line profile function that returns the grayscale values of the pixels along a line drawn through the image with a line tool and graphs the values
 particle analysis functions that computes such measurements on objects in an image as their areas and perimeters
 a 3D view function that displays an image using an isometric view in which each pixel from the image source is represented as a column of pixels in the 3D view, where the pixel value corresponds to the altitude.

The term "image processing" may also include functions useful in machine vision applications, including:
 an edge detection function that finds edges along a line drawn through the image with a line tool
 a pattern matching function that locates regions of a grayscale image that match a predetermined template
 a shape matching function that searches for the presence of a shape in a binary image and specifies the location of each matching shape
 a caliper function that computes measurements such as distances, areas, and angles based on results returned from other image processing functions
 a color matching function that quantifies which colors and how much of each color exist in a region of an image and uses this information to check if another image contains the same colors in the same ratio It is noted that the image processing functions listed above are exemplary only and that, in various embodiments of an image processing prototyping environment, other types of image processing functions or operations may be supported.

The user interface of the image processing prototyping environment may enable the user to load or select an image and easily select image processing functions to apply to the image. One element illustrated in FIG. 7 is labeled as a "reference window". FIG. 7 also illustrates a "processing window". As the user applies various image processing functions to the loaded image, the processing window may display the resulting image, while the reference window displays the original unmodified image. The user may select an image processing function to apply by choosing the desired function from a menu bar or by clicking on an icon, etc.

The FIG. 7 user interface also illustrates a "script window". Each image processing function that the user applies to the image may be displayed in this script window. The image processing operations that a user applies to an image may result in a script of image processing operations specifying an algorithm that can be applied to analyze or manipulate other images. As an example, FIGS. 8-14 illustrate a process of developing an image processing script useful for "blob analysis".

A "blob" (Binary Large OBject) is a connected region or grouping of pixels in an image in which all pixels have the same intensity level. In a binary image, the background is zero, and every non-zero pixel is part of a binary object. Finding the size, number, or location of blob regions in an image may be useful for many applications, such as detecting flaws on silicon wafers, detecting soldering defects on electronic boards, locating objects in motion control applications, etc.

Figure 8:
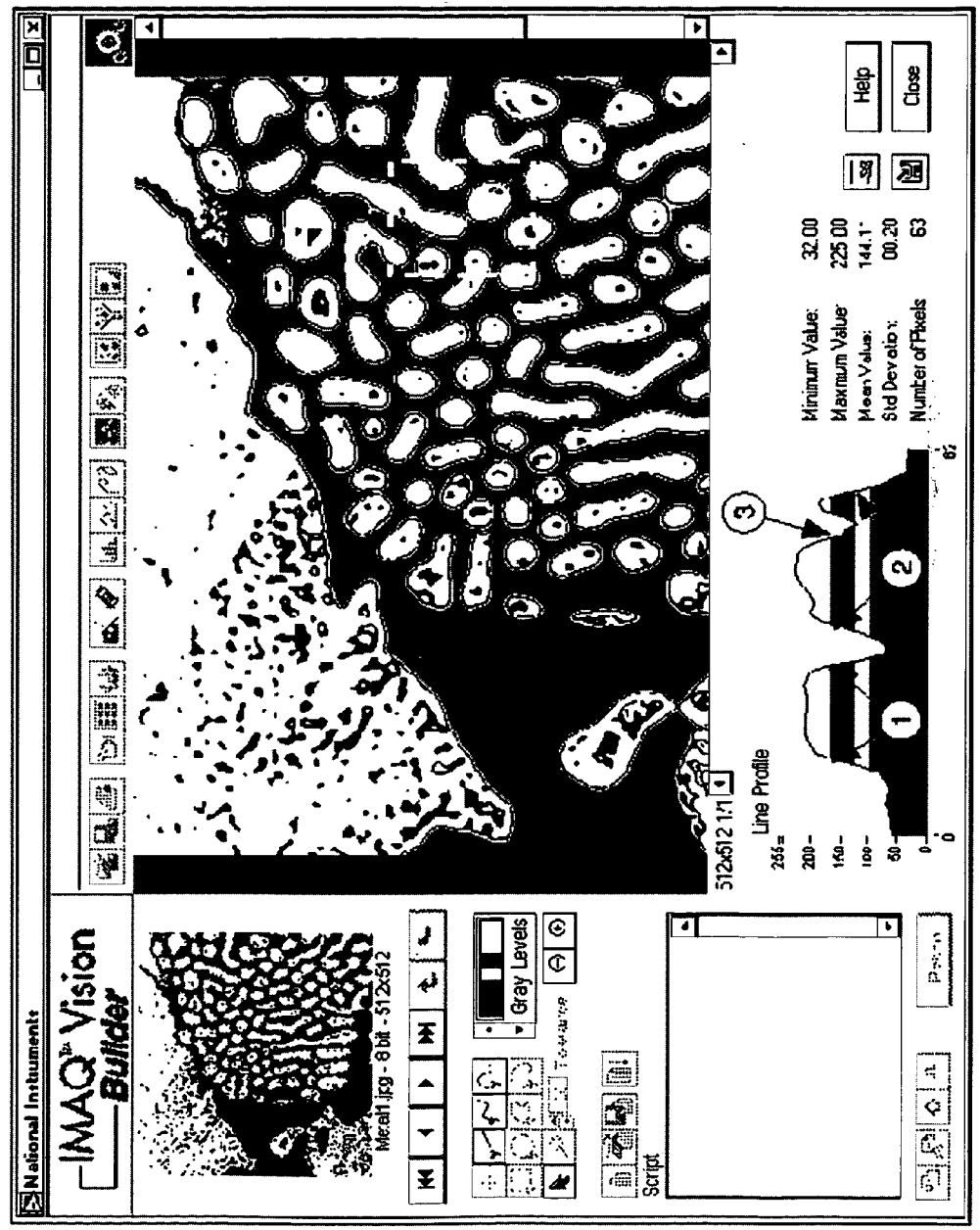
FIGS. 8-14 are screen shots illustrating a process of developing an image processing script useful for "blob analysis"

FIG. 8 illustrates an image for which the user desires to perform blob analysis. In FIG. 8, the user has selected a line profile tool and has drawn a straight line through a portion of the image in the processing window. A rectangle in the processing window indicates the location of this line. In response, the image processing prototyping environment displays grayscale values of the line drawn with the line profile tool, such as the minimum and maximum pixel values, in the bottom of the window. Note that details regarding the image processing functions applied in FIGS. 8-14 are omitted. For background information on image processing in general or the particular image processing functions referred to herein, please refer to available literature, such as the *IMAQ Vision User Manual*, available from National Instruments Corporation.

Figure 9:
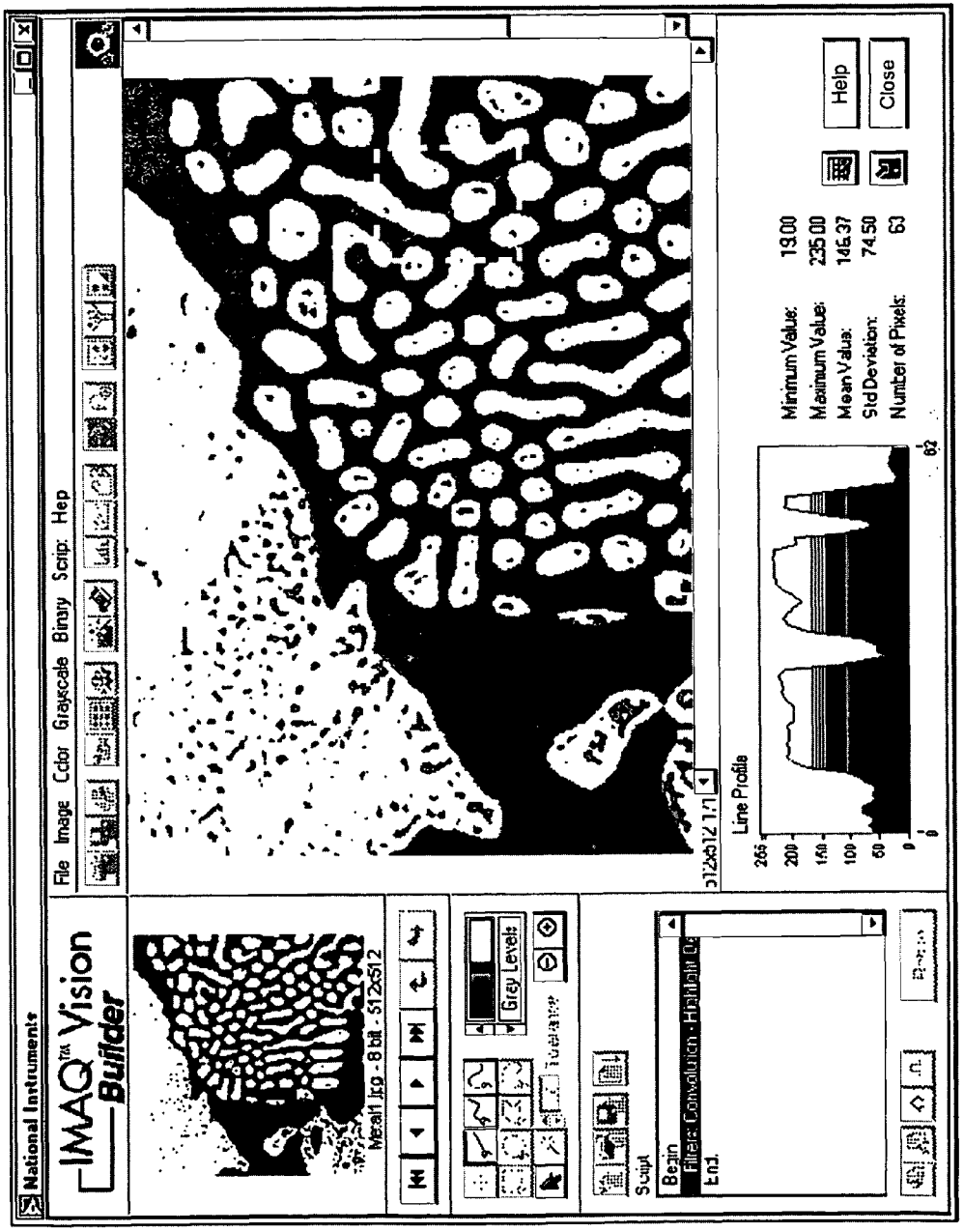

Based on the line profile grayscale values shown in FIG. 8, the user may then apply a filter to the image, e.g., to sharpen edges in the image and to create contrast between the particles and the background. The image processing prototyping environment may provide various types of filters that may be applied, e.g., by selecting the desired filter from a menu bar. FIG. 9 illustrates the resulting image after the user has applied a "Convolution—Highlight Details" filter to the original image. Due to this filter operation, the FIG. 9 image appears to be sharper than the original image. Note that the filtering operation the user applied is recorded in the script window of FIG. 9. Note also that the grayscale values of a line drawn with the line profile tool have changed from the values shown in FIG. 8.

The next step the user may want to perform in the blob analysis is a thresholding operation to separate the particles from the background. A thresholding operation converts the grayscale image to a binary image, keeping the pixels of interest and removing the remaining pixels. The FIG. 10 processing window illustrates the results of applying a thresholding operation in which pixels with a value of 130 to 255 are kept and other pixels are removed. The thresholding operation applied to the image is recorded in the script window of FIG. 10.

It is noted that for each type of image processing function supported, the image processing prototyping environment may be operable to display intermediate windows or screens that the user interacts with. These intermediate windows or screens may enable the user to specify various parameters or settings that apply to a particular image processing function. When the image processing function is added to the script, the specified parameters may be associated with the image processing function. The parameters may then be used when generating the desired program to implement the image processing algorithm, as described below. It is noted that various image processing functions may have output parameters as well as input parameters.

The process of developing an image processing algorithm may typically involve experimenting with various image processing functions and settings for the functions. However, FIGS. 8-14 omit such intermediate states and simply illustrate the result of applying each step in the algorithm to the image. For example, when performing a threshold operation, an intermediate screen such as shown in FIG. 11 may appear. FIG. 11 illustrates a selection box enabling the user to select the particular type of threshold operation to apply and illustrates an interactive graph with minimum and maximum threshold values that the user may adjust in order to find the desired threshold pixel values to use. When the threshold operation step is added to the script, the specified minimum and maximum values may be associated with the step.

Figure 10:
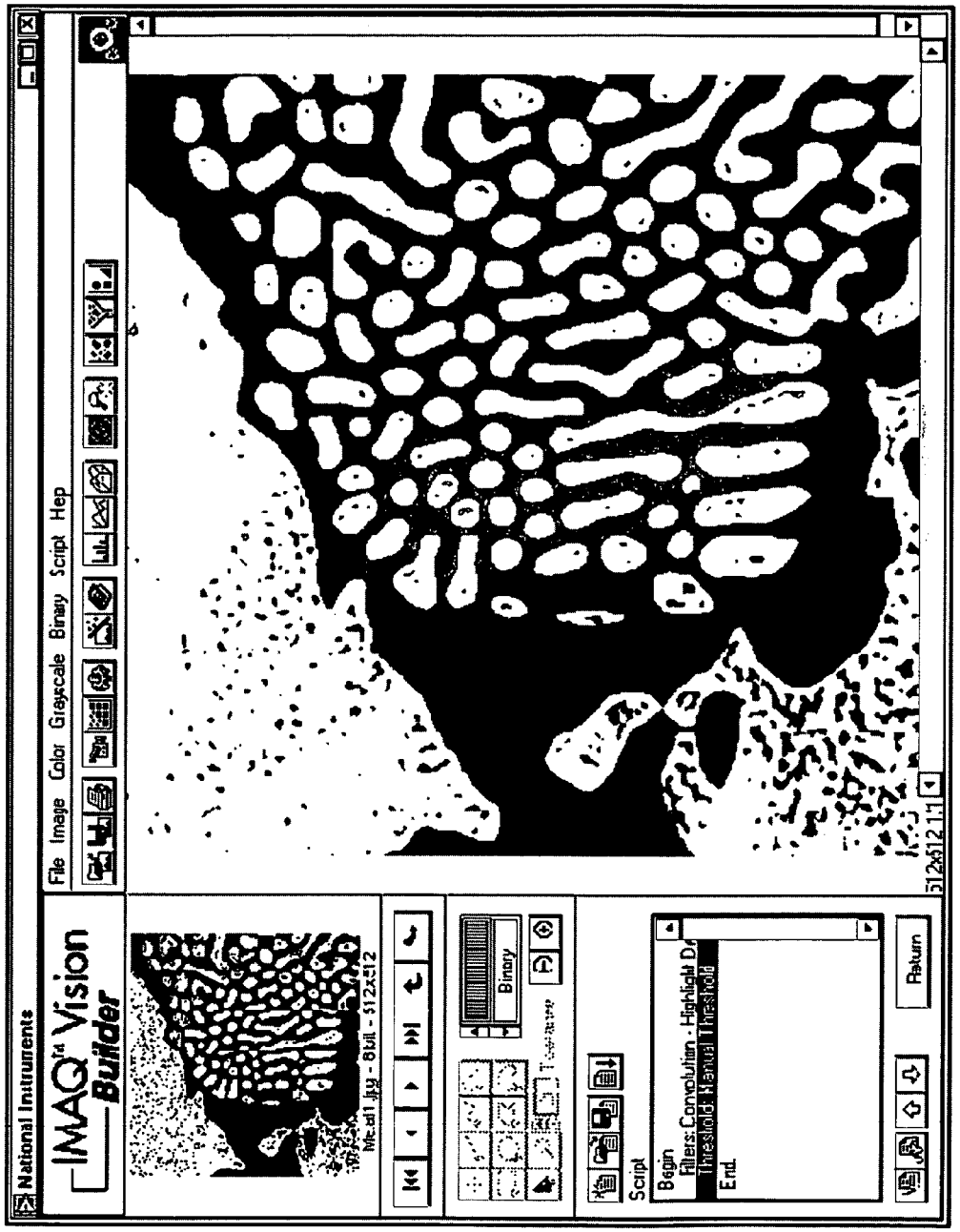
Figure 11:
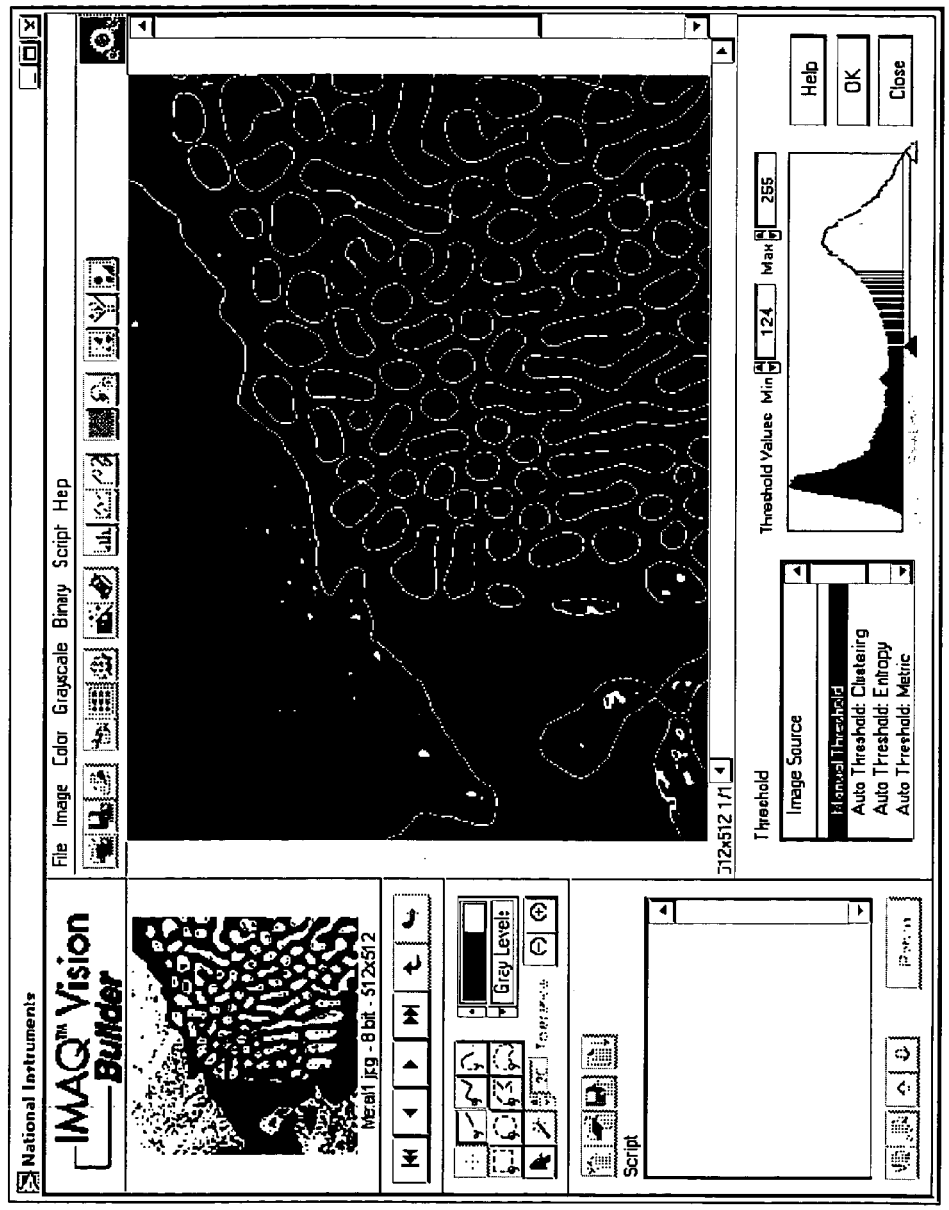
Figure 12:
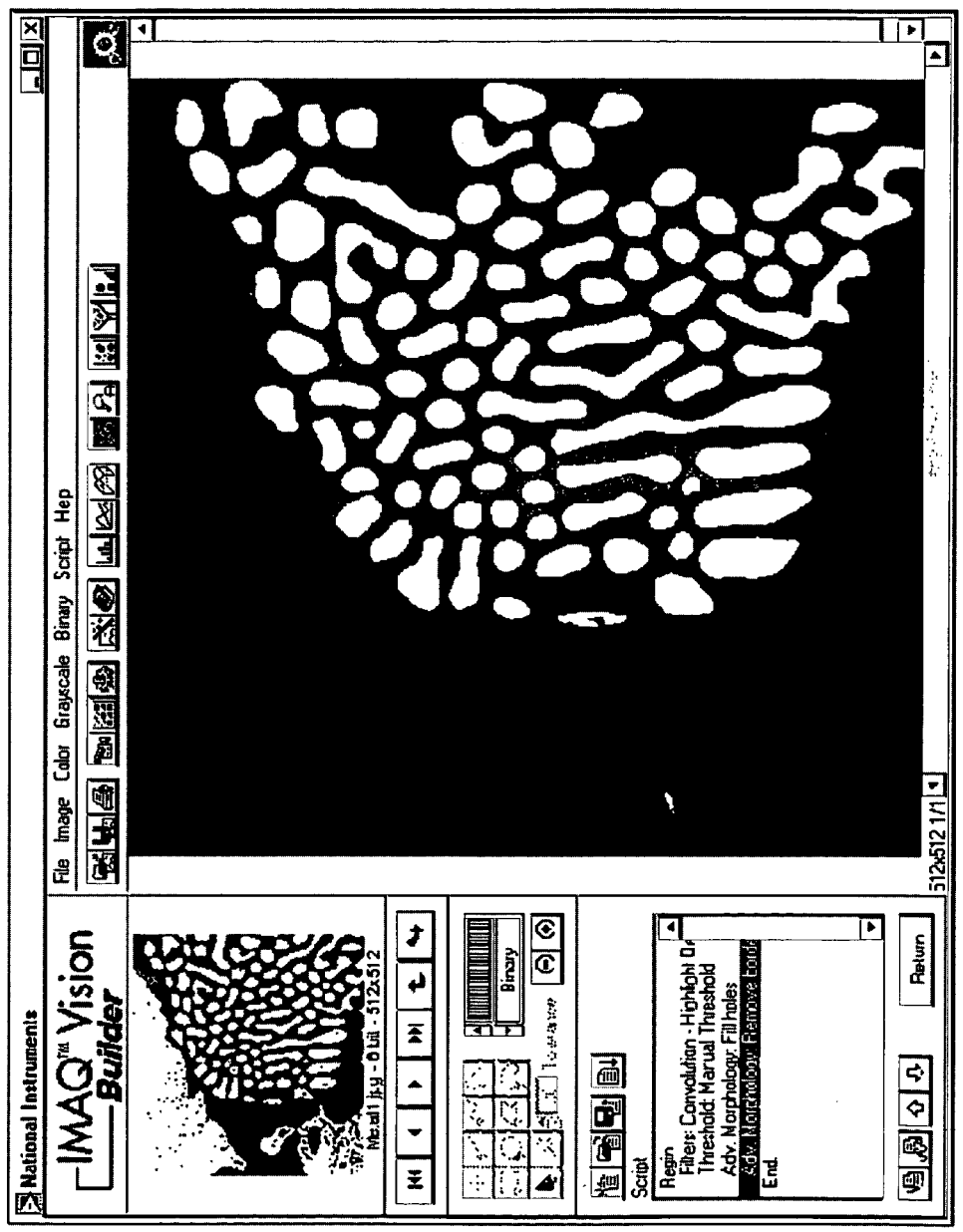
Figure 13:
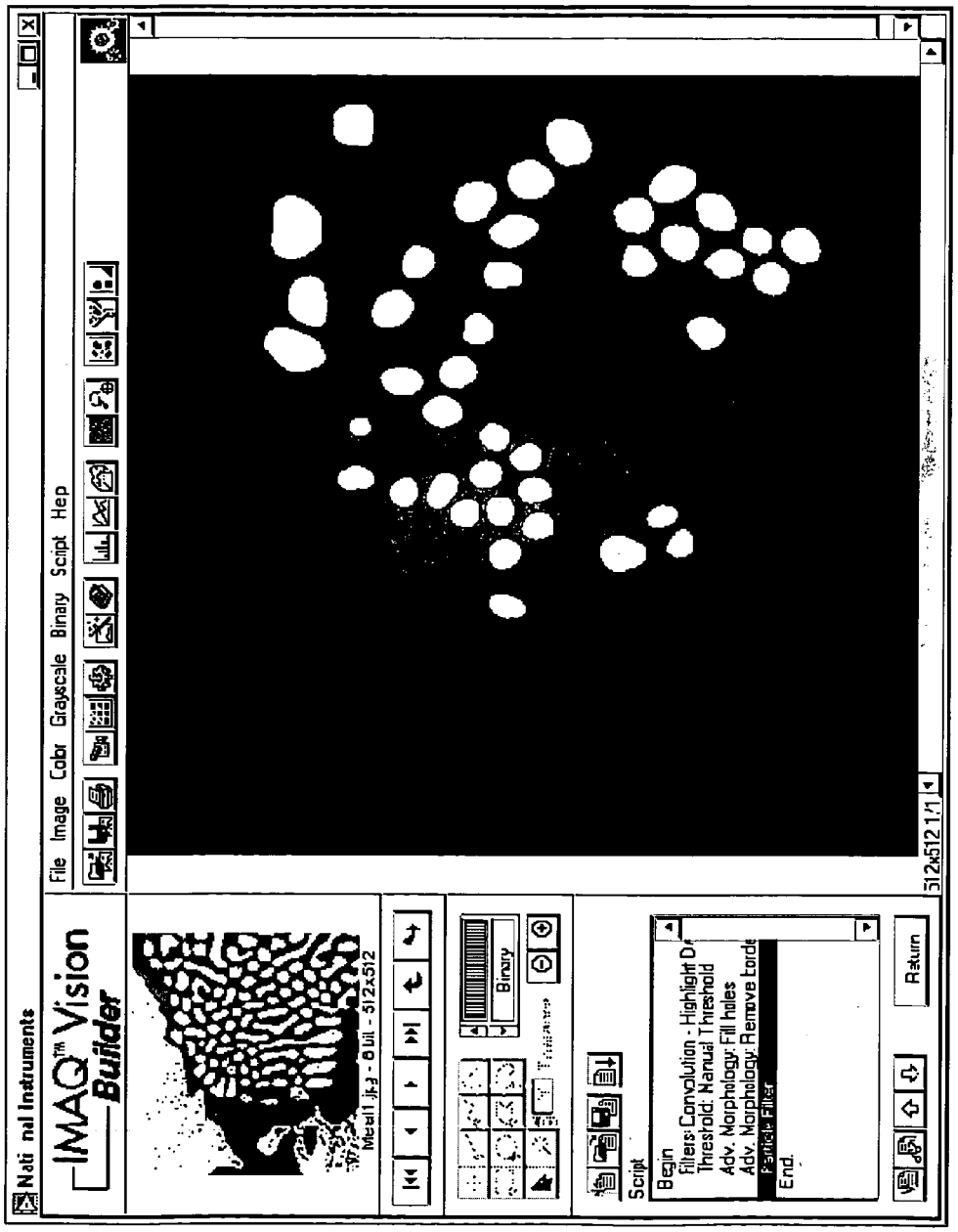

Continuing with the blob analysis example, after the thresholding operation is applied, the FIG. 10 binary image is obtained. The FIG. 10 particles are referred to as blobs. The user may then apply morphological functions to the image, where the morphological functions affect each blob on an individual basis. The FIG. 12 processing window illustrates the results of applying two successive morphological functions to the image: a "Fill Holes" function to fill holes in the particles, and a "Remove Border Objects" function to remove objects that touch the border of the image. These morphological functions are also displayed in the FIG. 12 script window.

The user may next want to apply a particle filter function which isolates and keeps the circular blobs and removes the non-circular blobs from the image. The FIG. 13 processing window illustrates the results of applying such a particle filter. The particle filter operation is displayed in the FIG. 13 script window.

Figure 14:
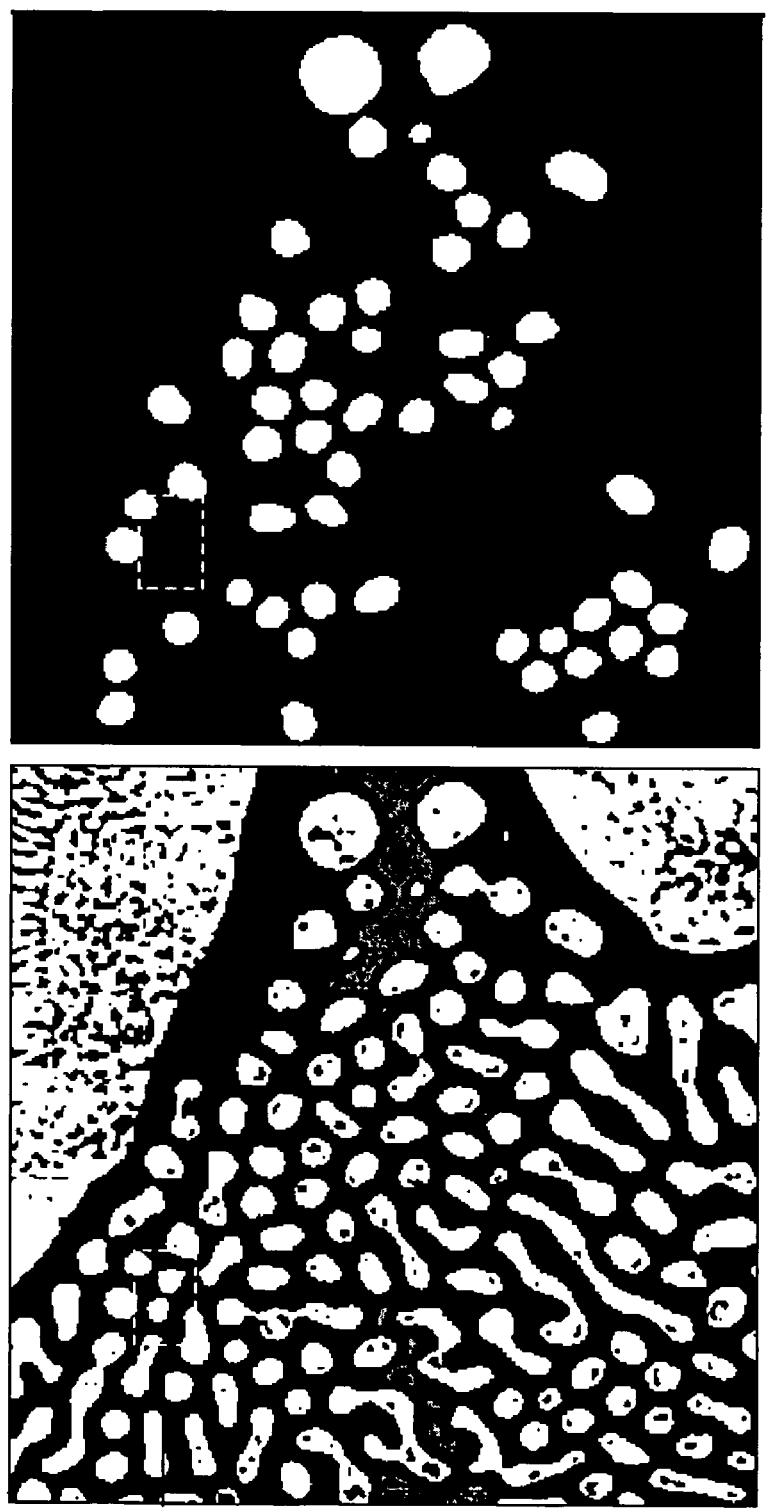

Once the user has developed the desired image processing algorithm in the image processing prototyping environment, the user may test the algorithm on other images. As described above, a script describing each step of the algorithm may be recorded, and the prototyping environment may be operable to "replay" this script on other images. For example, FIG. 14 illustrates an original image (Metal3.jpg) and the image that results from applying the script described above for FIGS. 8-13. Notice that the resulting image is similar to the FIG. 13 result, in which circular blobs are isolated. Of course, the blob analysis algorithm discussed above is exemplary only, and image processing algorithms to perform any of various other types of image processing, manipulations, or analyses may be developed.

FIGS. 15-20: Requesting a Graphical Program to be Generated from a Script

Figure 15:
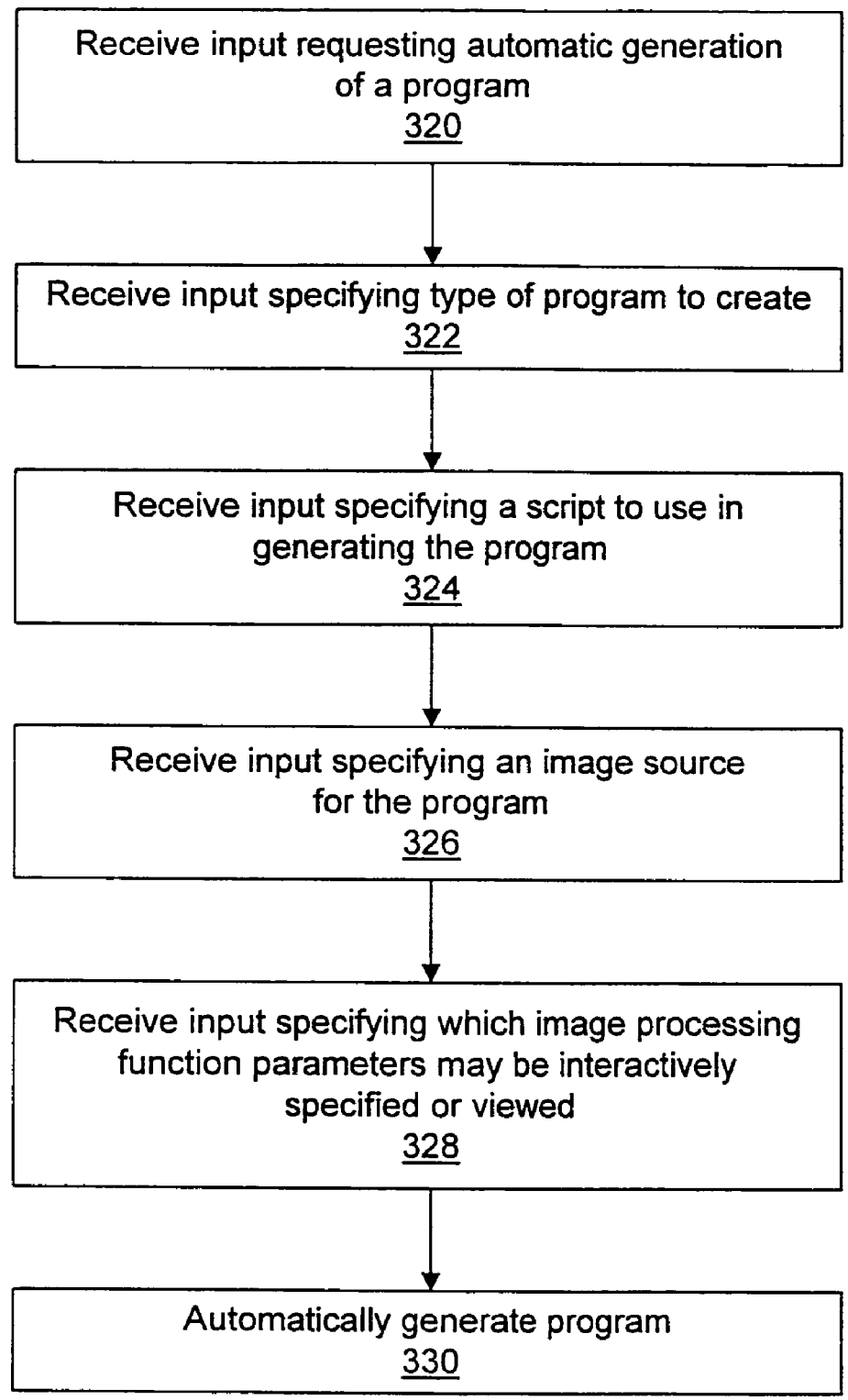
FIG. 15 is a flowchart diagram illustrating one embodiment of a method for receiving information to be used in automatically generating a graphical program.

Once the user has developed and tested an image processing algorithm in the image processing prototyping environment, the prototyping environment may be operable to automatically generate a graphical program to perform the algorithm. FIG. 15 is a flowchart diagram illustrating one embodiment of a method for receiving information to be used in generating the program. In one embodiment, a code generation "wizard", i.e., a series of related user interface dialogs, may be employed to receive the information described in FIG. 15. FIGS. 16-20 illustrate an example of such a code generation wizard.

In step 320 of FIG. 15, input requesting automatic generation of a program is received, e.g., interactively or programmatically. For example, once the user has developed a script as described above, the user may then issue a command to generate a program from the script.

As described above, in various embodiments, any of various types of graphical programs may be generated to implement the image processing algorithm. In step 322, input specifying a type of graphical program to create may be received. The input received in step 322 may specify a particular graphical programming language to use in generating the graphical program and/or may specify a particular graphical programming development environment where the generated program will be used. If a particular graphical programming development environment is specified in step 322, the generated graphical program may utilize proprietary programming or development features, or may adhere to proprietary requirements, of that specified graphical programming development environment. It is noted that in an alternative embodiment, the prototyping environment may only be operable to generate one default type of graphical program, and thus step 322 may not be performed.

Figure 16:
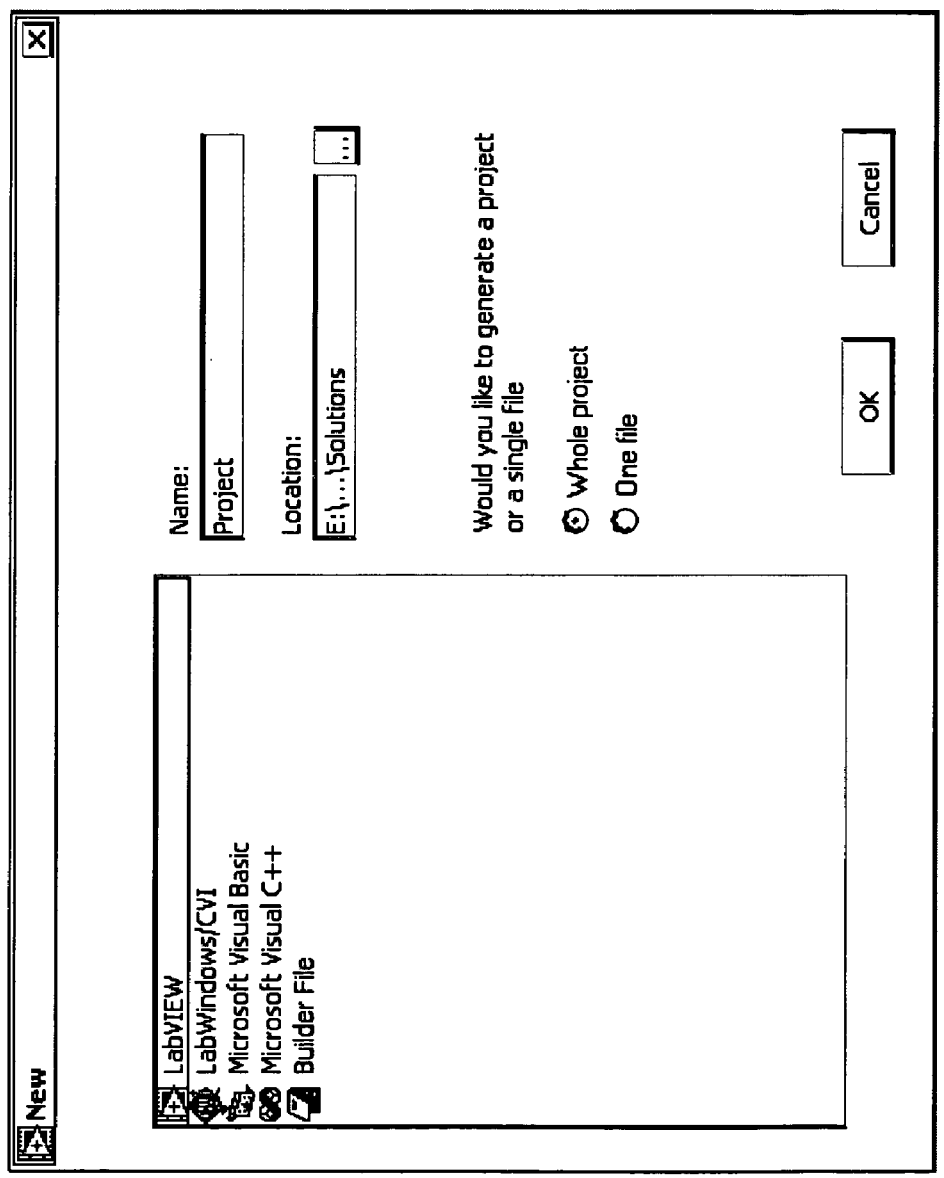
FIG. 16 illustrates a user interface for receiving information specifying a graphical program type to create.

FIG. 16 illustrates a user interface for receiving information specifying a program type to create. A selectable list of various programming development environments is shown. In the embodiment shown in FIG. 16, the list includes a graphical programming development environment, LabVIEW, as well as various text-based programming environments, including LabWindows/CVI, Microsoft Visual Basic, and Microsoft Visual C++. In alternative embodiments, any of various other graphical or text-based programming languages or development systems may be supported.

As shown in FIG. 16, a user may also specify whether to generate additional files or other elements associated with the generated program. For example, many graphical programming development environments utilize proprietary file types, such as project files that specify information or settings for an application. For an embodiment supporting such programming development environments, the user may specify whether to generate only the file(s) implementing the program or to also generate a project file or other relevant files associated with the program.

Figure 17:
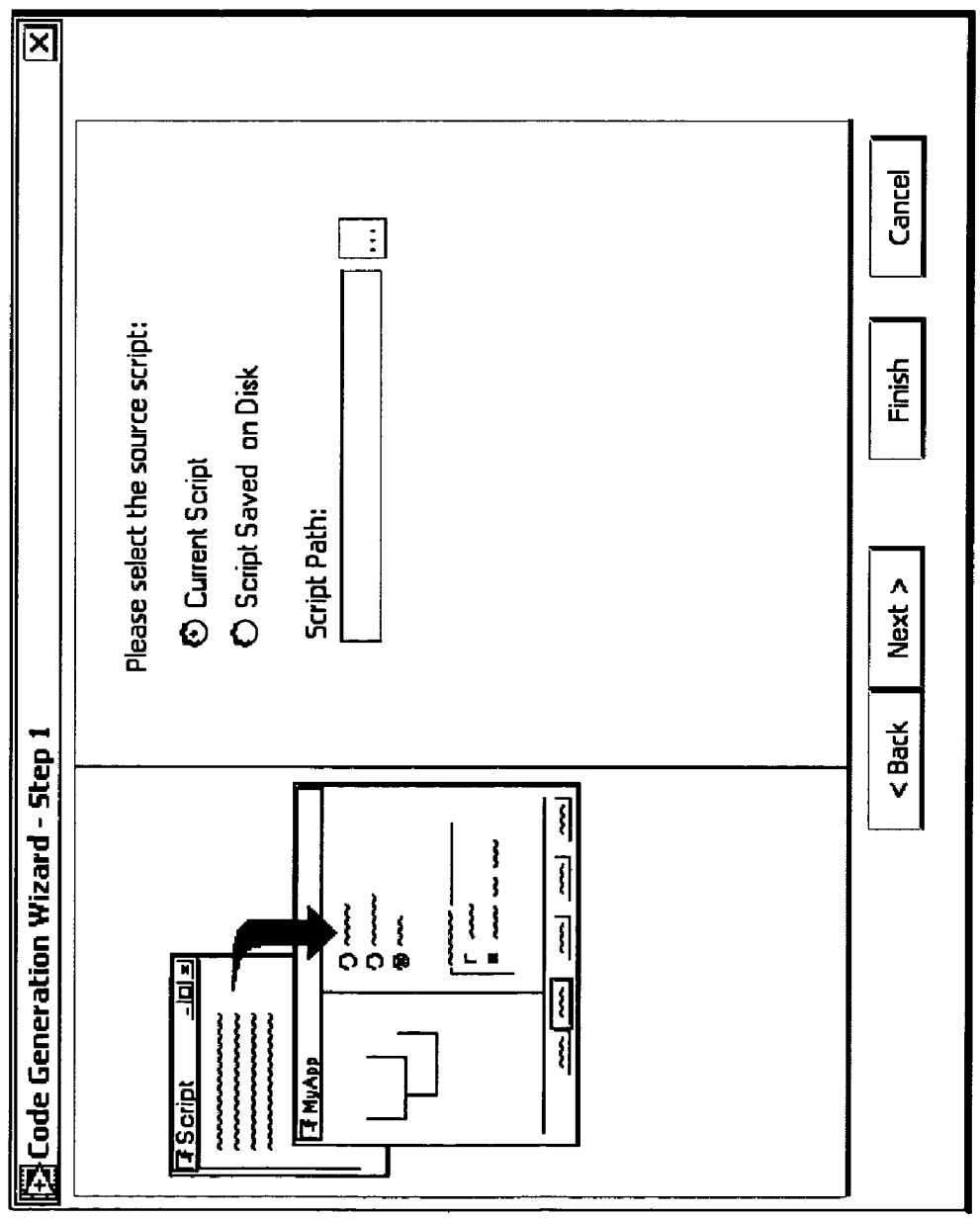
FIG. 17 illustrates a user interface for receiving information specifying a particular script to use in generating a graphical program.

In step 324, input specifying a particular script to use in generating the graphical program may be received. For example, a script developed as described above may be saved to a script file, which is then specified in step 324. Alternatively, a current script, i.e., a script that is currently open or in use, may be specified. FIG. 17 illustrates a user interface for receiving the information of step 324. In one embodiment, the current script is automatically used in generating the program.

Figure 18:
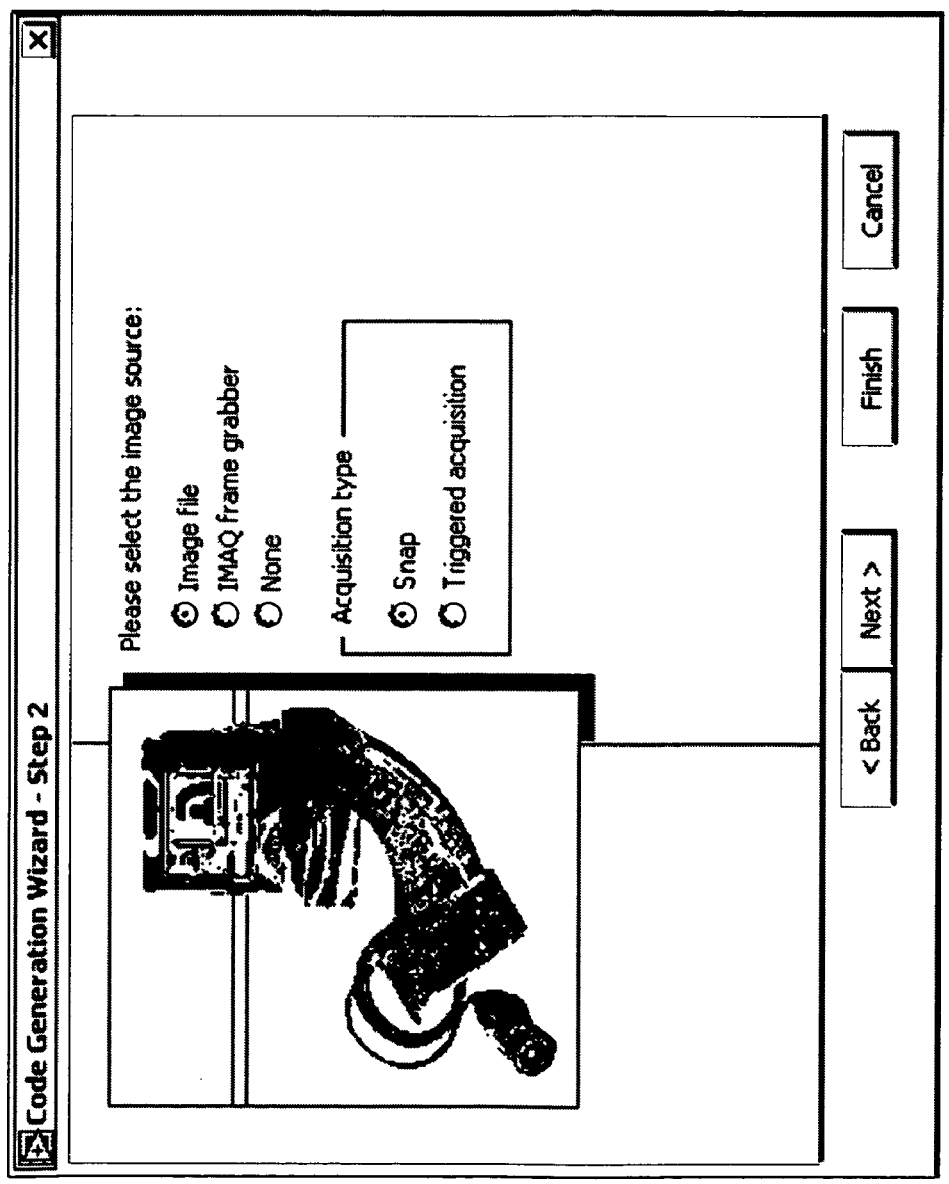
FIG. 18 illustrates a user interface for specifying an image source type for a graphical program.

In step 326, input specifying an image source or type of image source for the program may be received. In one embodiment, the generated program may perform different operations, depending on the type of image source. For example, if the image source is an image file, the graphical program may include code for opening the file, extracting the image from the file, etc. If the image source is a hardware device, the graphical program may include code for initializing the hardware device, acquiring the image from the device, etc. FIG. 18 illustrates an exemplary user interface for specifying an image source type. In this example, either an image file or a framegrabber hardware device may be specified. As shown in FIG. 18, if the image source is a hardware device, various parameters relating to the device, e.g., snap or triggered acquisition may also be specified in step 326.

In step 328, input specifying which image processing function parameters may be interactively specified or viewed may be received. As described above, each particular image processing function may have associated input and/or output parameters or settings. When developing the script, the user may set the input parameter values for each step as desired, and the desired parameter values may be associated with the image processing function when the function is added to the script. The input parameter values may then be used to generate a program that operates as desired. In one embodiment, the parameter values are automatically hardcoded into the program and cannot be changed without modifying the program code. However, the user may desire the ability to interactively change one or more of the input parameter values during program operation and/or view one or more output parameter values. Thus, in the preferred embodiment, the user can specify which input parameter values may be interactively specified or which output parameters may be viewed. The generated graphical program is then operable to accept program input specifying new values for the chosen input parameters during program operation and is operable to provide program output displaying the chosen output parameters. For example, in one embodiment, a graphical user interface panel including various user interface controls and indicators allowing the user to set the input parameter values and view the output parameter values may automatically be displayed when the graphical program executes.

Figure 19:
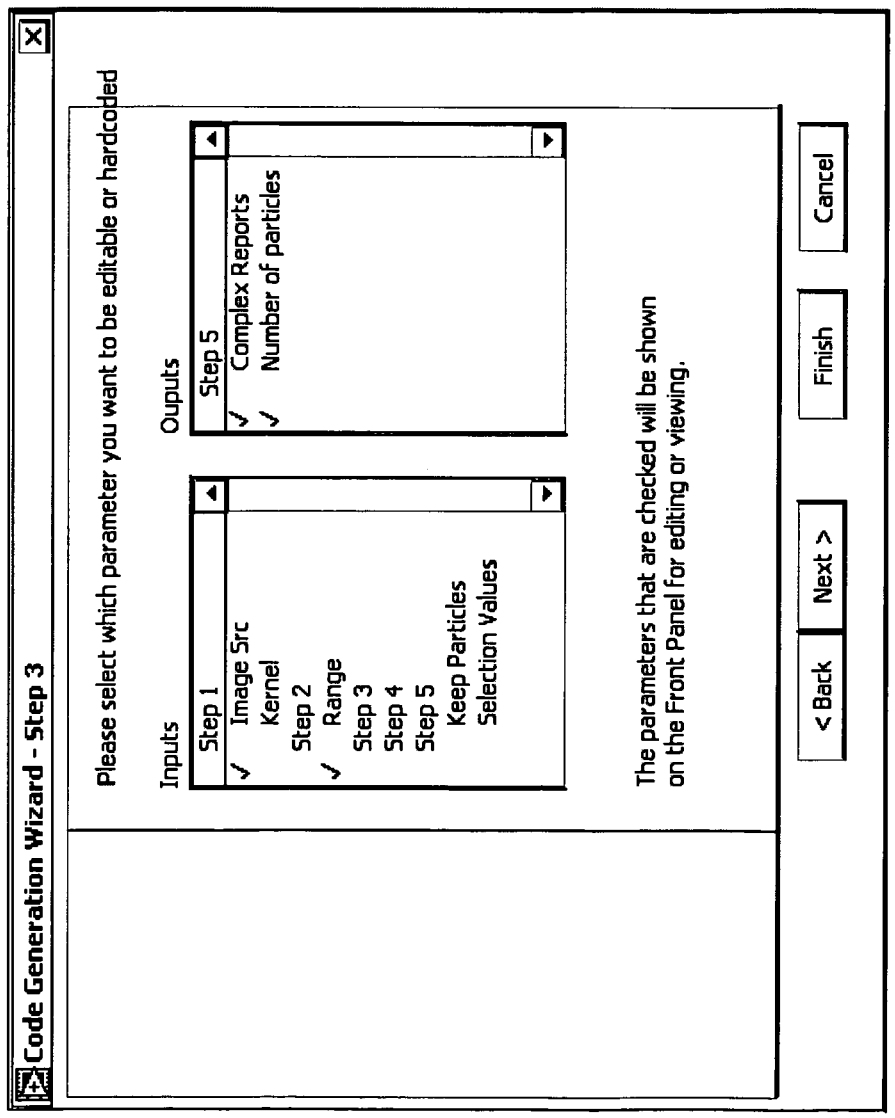
FIG. 19 illustrates a user interface for specifying input and output parameters for a graphical program that are desired to be interactively changeable or viewable.
Figure 23:
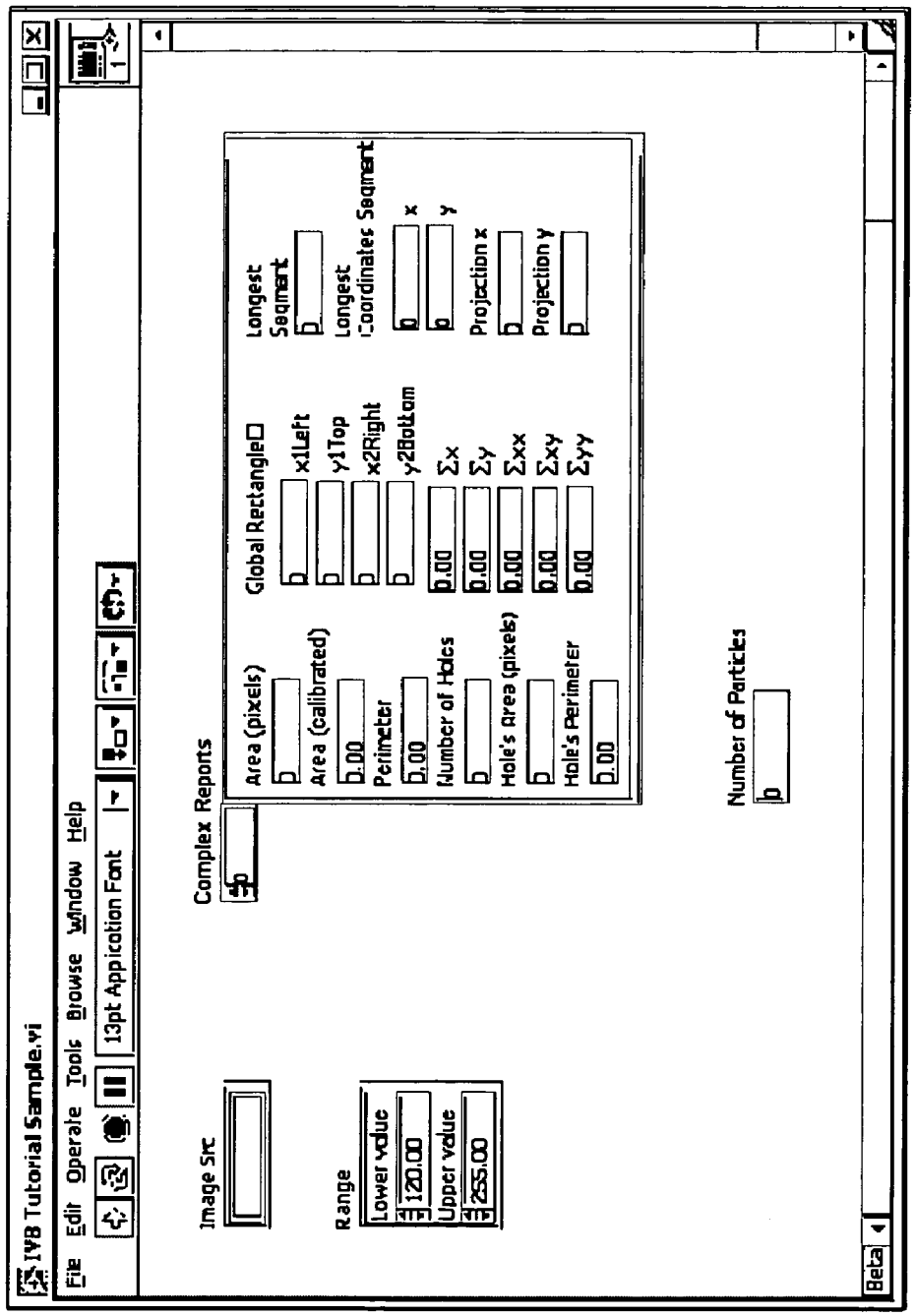
FIG. 23 illustrates a user interface panel including user interface controls and indicators for specifying input parameter values and displaying output parameter values for the graphical program of FIG. 22.

FIG. 19 illustrates a user interface for receiving input specifying the input and output parameters that are desired to be interactively changeable or viewable. The items displayed in FIG. 19 correspond to the final script shown in the script window of FIG. 13. As shown, the user interface may divide the items into input or output parameters and sub-divide each group to illustrate which step of the script the items correspond to. For example, as discussed above with reference to FIG. 11, step 2 of the script, a threshold operation, may utilize input parameters specifying minimum and maximum threshold values. The user interface shows an item labeled "Range" which corresponds to these input parameters. The user may place a check beside each input parameter desired to be interactively changeable and beside each output parameter desired to be interactively viewable. FIG. 23, discussed below, illustrates a user interface panel with user interface controls and indicators corresponding to the selected input and output parameters, respectively.

In step 330, the graphical program is automatically generated, using the information received in steps 322-328. Step 330 may be performed in any of various ways as appropriate for a particular graphical programming language or graphical programming development environment. For example, each step recorded in a script may correspond to a particular function node or group of function nodes, and the prototyping environment may create a graphical program that includes the appropriate nodes. In various embodiments, additional elements may also be included in the created graphical program. For example, as described above, the created program may include nodes operable to load or acquire an image, display the image, etc.

Figure 20:
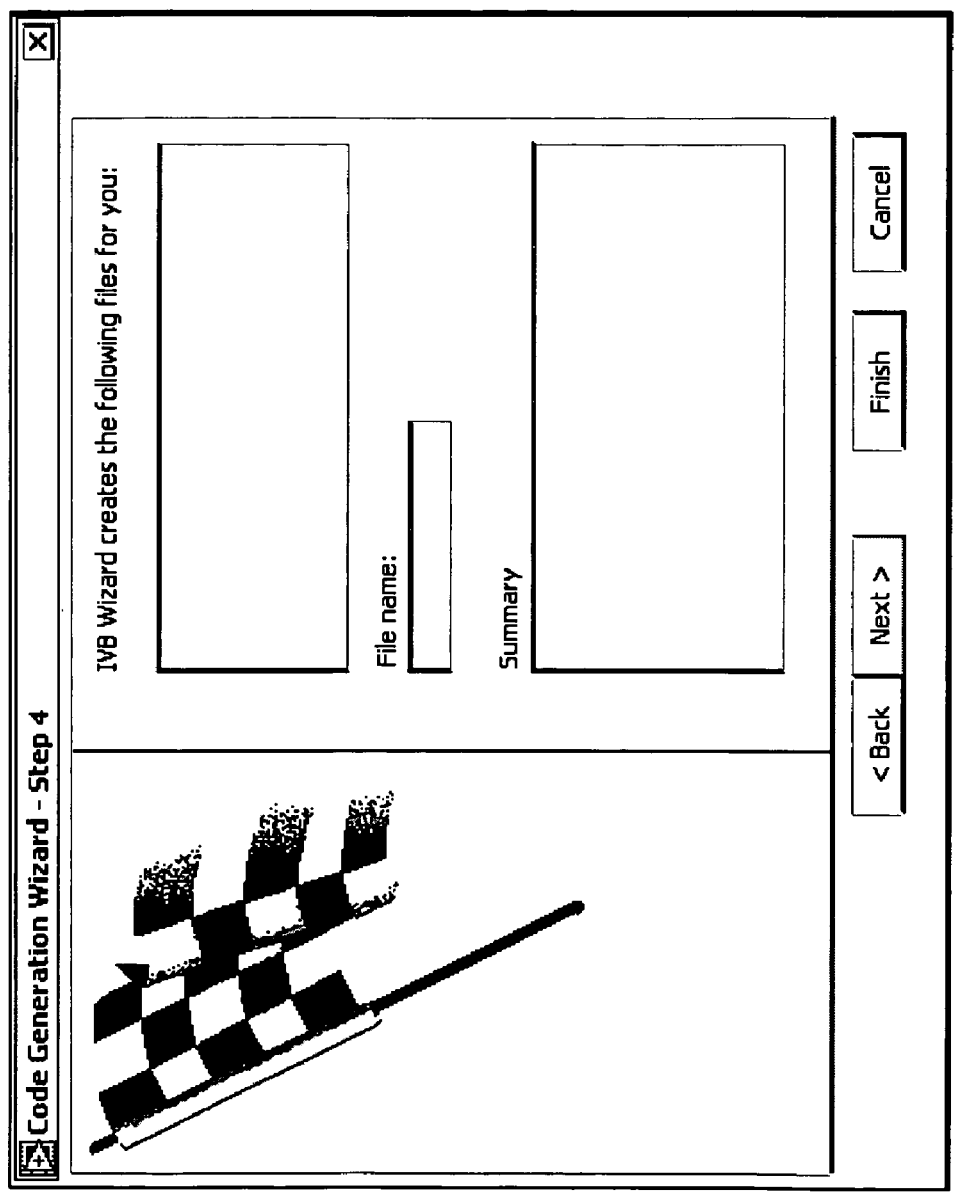
FIG. 20 illustrates a user interface for specifying a file name for a program file.

One or more files including graphical program code may be generated in step 330. FIG. 20 illustrates a user interface for receiving input specifying a file name for a program file. Also, as described above, step 330 may comprise generating other files, e.g., project files, in addition to the file(s) specifying the program code.

As noted above, the flowchart of FIG. 15 represents one embodiment of a method for receiving information to be used in generating a program, and various steps of FIG. 15 may be added, omitted, reordered, combined, etc. For example, the method may receive additional input in addition to that described above, to be used in generating the program. This additional input may pertain, for example, to a particular graphical programming development environment that is supported, and/or may serve to enhance the functionality described above. As one example, additional input regarding the image source for a program may be received, e.g., to specify a particular default image file name.

Maintaining an Association Between a Script and a Generated Program

In one embodiment, an association between the script created in the prototyping environment and the program generated from the script may be maintained. This association may enable a user to run the automatically generated program and then return to the prototyping environment in order to view or edit the script used to create the program. The ability to return to the prototyping environment may be useful, for example, if while using the program to process images, it is discovered that the program has an error or needs to be modified for other reasons.

The association between the script and the generated program may be implemented in any of various ways. For example, in one embodiment, a program file may be enabled to store information related to the program; thus, the script information may be stored in the program file when the program is created. In another embodiment, the script information may be stored in another file associated with the program, such as a project or resource file. In another embodiment, the prototyping environment may be operable to store the script information. For example, when the program is created, the prototyping environment may determine or receive a key usable for uniquely identifying the program, and this key may later be used by the prototyping environment to retrieve the script information used to create the program. In another embodiment, information specifying the script used to create the program may not be maintained, but rather, the prototyping environment may be operable to read the graphical program and automatically re-create the script used to create the program.

In various embodiments, a user may perform any of various actions in order to return to the prototyping environment to view or edit the script associated with a program. For example, the graphical program may be a program associated with a graphical programming development environment that is coupled with the prototyping environment, and the user may be able to automatically return to the prototyping environment by issuing a command to the graphical programming development environment, e.g., by selecting a menu item. In another embodiment, the user may first view the user interface for the prototyping environment and then select the script corresponding to the program.

In one embodiment, a program created from a script may be "locked". While the program is locked, the user may be prevented from modifying the program. The ability to lock the program may be useful, for example, in order to ensure that the state of the program corresponds to the state of the script used to create the program when the user returns to the prototyping environment. If the user desires to modify the program, the user may unlock the program, e.g., by selecting an option in a development environment associated with the program. The mechanisms of locking and unlocking a program may be implemented in any of various ways, according to methods supported by a particular system or graphical programming environment.

Figure 21:
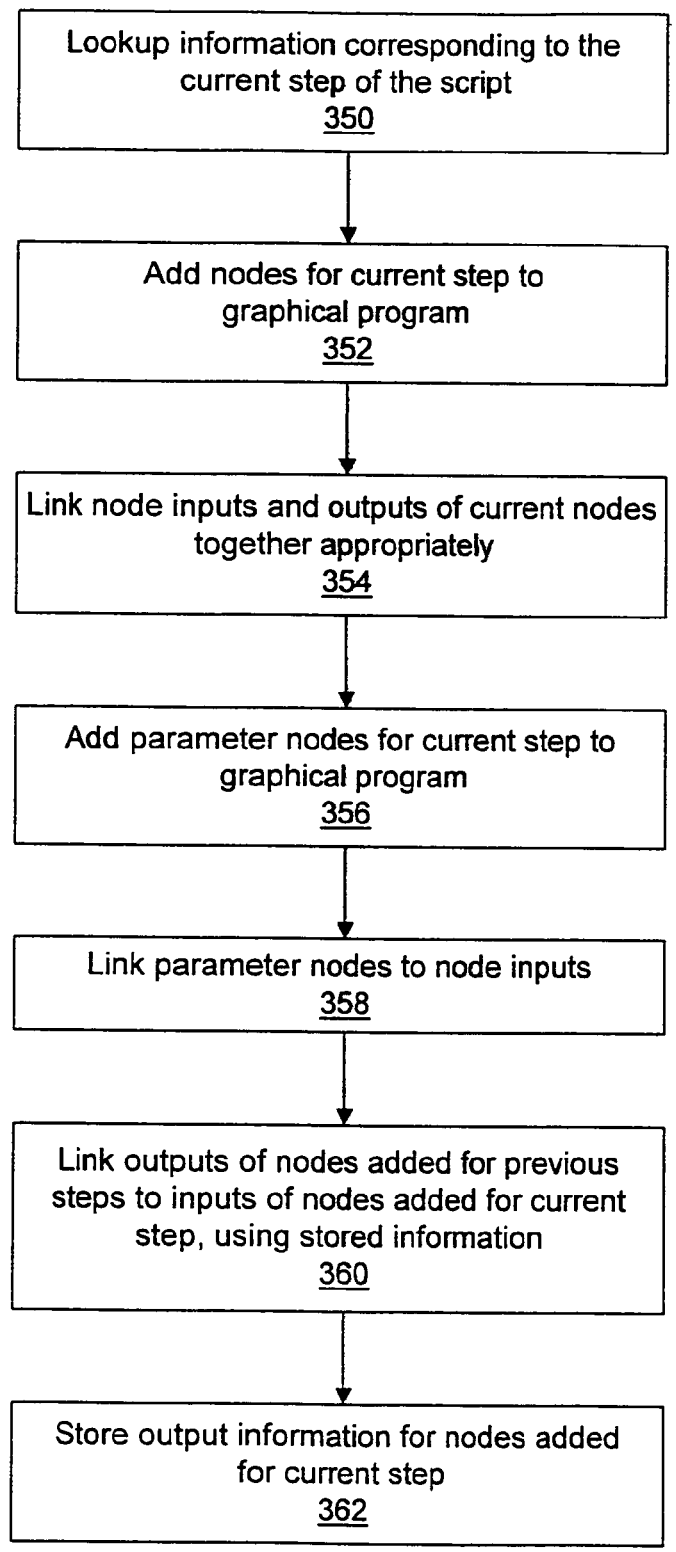
FIG. 21 is a flowchart diagram illustrating one embodiment of a process of programmatically generating a graphical program from a script.

FIG. 21—Automatic Graphical Program Generation

FIG. 21 is a flowchart diagram illustrating in detail one embodiment of automatically generating a graphical program from a script, as discussed above with reference to step 330. As described above, the script may include a number of steps, where each step represents a particular function. FIG. 21 illustrates a method that may be performed for each step in the script, in order to generate graphical program code corresponding to the script step. It is noted that various steps of FIG. 21 may be combined, reordered, altered, omitted, etc.

Step 350 of FIG. 21 is to lookup information corresponding to the current step of the script, e.g., from a database. For example, each possible function step that can appear in a script may have a corresponding key, such as the function name, that may be used to lookup the information.

As described above with reference to FIG. 4, a graphical program diagram may comprise nodes which are connected together to model the program data flow or control flow, where various nodes represent different functional blocks. For each function step of a script, the step may be implemented in a graphical program using one or more nodes that are connected to each other appropriately. For example, FIG. 9 illustrates a convolution filter function step in the prototyping environment script window. This convolution filter function may correspond to a single node available in a graphical programming system, wherein the node implements the convolution functionality. Alternatively, the convolution filter function may be implemented using a plurality of graphical program nodes. The graphical program nodes may be any of various types of nodes supported by a particular graphical programming system, including subprogram nodes, function nodes, etc. In one embodiment, the graphical programming system provides a library of nodes related to the problem domain or field of the prototyping environment, which may be used in implementing steps of the script.

Thus, the information retrieved in step 350 may include a list of one or more nodes to add to the graphical program, in order to implement the current step of the script. The information may also include information specifying how the inputs and outputs of these nodes should be linked to each other, in order to accomplish the desired data or control flow. The link information may be specified in any of various ways, as appropriate for a particular graphical programming system. For example, in one embodiment, each graphical program node includes terminals corresponding to each node input or output. Thus, the link information may specify pairs of node terminals that should be connected to each other.

The information retrieved in step 350 also may include parameter information. As described above, various parameters or settings may be associated with each step in a script. These parameters may be represented in the graphical program as leaf nodes which provide input to or display output from the nodes which implement the current step of the script. Thus, the parameter information may include a list of leaf nodes to add to the graphical program, in order to provide or accept the parameter values to or from the other nodes. A type may be specified for each parameter. For example, if an input parameter is an integer value, a corresponding leaf node may be created as an integer constant node, i.e., a node which is operable to output an integer constant. A default value for the parameter may also be specified. For input parameters, information specifying which node input the output of the corresponding leaf node should connect to may also be specified. For output parameters, information specifying which node output the input of the corresponding leaf node should connect to may also be specified.

As discussed above, in one embodiment, the user may designate certain parameter values that he wishes to be able to change or display interactively. For these parameters, a leaf node constant representing the parameter value is preferably not connected to the node input/output that receives/generates the parameter value. Instead, a user interface control or indicator representing the parameter value may be created, and the node input or output that receives or generates the parameter value may be configured to receive or set the value of this user interface control or indicator. In one embodiment, when a user interface control or indicator is created, a corresponding node may be automatically created in the graphical program diagram. Thus, the output or input of the node corresponding to the user interface control/indicator may simply be connected to the node input or output that receives or generates the parameter value. For other embodiments, the node input/output may be connected to the user interface control/indicator value in any of various other ways, as supported by the particular embodiment.

The parameter information obtained in step 350 may include information specifying the type of user interface control/indicator to create and possibly other user interface information. For example, for a parameter that may be one of several strings, the parameter information may specify that a user interface control for selecting from a list of strings should be created and may specify the list of strings to configure the control with. Alternatively, the system may be operable to automatically create an appropriate user interface control or indicator by examining the type information of the node input or output that control or indicator connects to. This automatic creation of user interface controls/indicators is discussed below.

In step 352, the nodes determined in step 350 are added to the graphical program. Elements may be added to the graphical program in any of various ways. For example, the application that generates the graphical program may comprise program logic for creating a graphical program file that is formatted appropriately. However, in the preferred embodiment, the application interfaces with a graphical programming system and requests the graphical programming system to create the desired program. Interfacing with a graphical programming system is discussed below.

In step 354 the inputs and outputs of the nodes added in step 352 are linked to each other appropriately, using the information from step 350. Again, the application may perform step 354 directly or may request a graphical programming system to connect the node inputs and outputs.

In step 356, nodes representing parameters to the functions for the current step of the script are added to the graphical program, using the information from step 350. For example, various leaf nodes may be added, as described above. In step 358, the outputs of the parameter nodes are connected to the appropriate inputs of the nodes added in step 352. Step 356 may also involve configuring the leaf nodes with an appropriate value. As noted above, when a step is added to a script, parameter values specified by the user (or default values) may be associated with the step. These parameter values may be used to configure the leaf nodes with an appropriate value. For example, in FIG. 11, a maximum threshold parameter value of 255 is illustrated. In this example, a leaf node representing the maximum threshold parameter may be created as an integer constant and may configured with a value of 255. Thus, this leaf node would provide the value 255 to the node input that the leaf node is connected to. For a parameter that is interactively changeable, steps 356 and 358 may involve creating a user interface control for the parameter and linking the control to the appropriate node input, as described above.

Steps 350-358 describe adding graphical program elements pertaining to a particular step of the script to the graphical program. For a given current step, it may be necessary to link various outputs of nodes added for previous steps to inputs of nodes added for the current step. For each step, information regarding outputs of nodes added for the step may be stored, e.g., in a table in memory. In step 360, this stored information may be used to connect the appropriate outputs of nodes previously added to inputs of nodes added for the current step. For example, in addition to specifying the desired links between nodes added for the current step of the script, the information obtained in step 350 may also specify when an input of a node added for the current step should be connected to an output of a node added for a previous step in the script. The stored information may then be searched to determine which previous node output should connect to the current node input. Any of various types of information enabling this determination may be stored, as appropriate for a particular embodiment, such as output terminal names, output data types, etc.

In step 362, output information relating to nodes added for the current step of the script is stored, so that this information will be available for subsequent steps.

Figure 22:
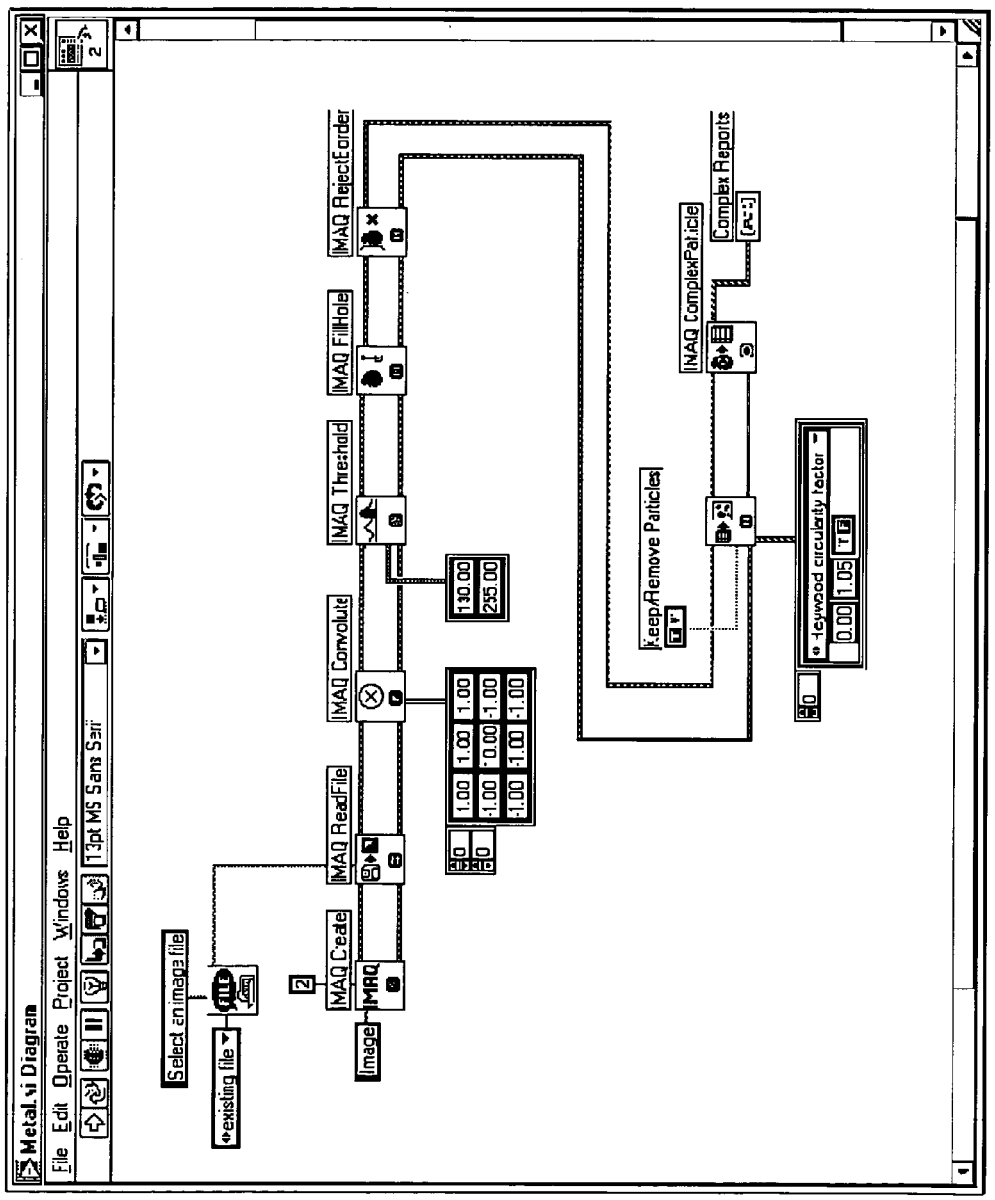
FIG. 22 illustrates an exemplary graphical program that is automatically generated from the image processing algorithm script example discussed with reference to FIGS. 8-14.

FIGS. 22-23: Example of a Generated Graphical Program

FIG. 22 illustrates an exemplary graphical program that is automatically generated from the image processing algorithm script example discussed with reference to FIGS. 8-14. For convenience, the graphical program diagram is grouped into portions, and each portion is labeled in order to illustrate which step of the script the portion implements. As described above, each portion includes one or more nodes which implement the image processing function specified by the corresponding step of the script. For nodes that accept or provide parameter values, the nodes are connected to leaf nodes that provide or accept the parameter values to or from the nodes.

The graphical program of FIG. 22 correspond to the code generation user interface screen shown in FIG. 19, in that the program is operable to accept interactive user input specifying the input parameters selected in FIG. 19 and is operable to display the output parameters selected in FIG. 19. FIG. 23 illustrates a user interface panel including user interface controls and indicators corresponding to the selected input and output parameters. This user interface panel may be generated along with the graphical program block diagram. Each user interface control or indicator on the user interface panel has a corresponding leaf node in the block diagram. For example, the block diagram leaf node labeled "Range" corresponds to the user interface control labeled "Range", and the output of the "Range" leaf node is connected to the input of the "IMAQ Threshold" node, so that the "IMAQ Threshold" node receives the new range values as they are adjusted by a user.

Note that for the parameters which are not selected in FIG. 19, no corresponding user interface controls or indicators are created, and values for these parameters are instead hard-coded into the block diagram. For example, the "Keep Particles" item is unselected in FIG. 19, and a Boolean constant leaf node labeled "Keep/Remove Particles" is connected to one of the nodes which implement step 5 of the script. The constant value may be set to True or False, e.g., depending on the settings the user specified when the script was created.

As noted above, in one embodiment, an appropriate user interface control or indicator for a selected parameter may be automatically created by examining the type information of the node input or output that the control or indicator connects to. For example, as discussed below, the prototyping environment may interface with a graphical programming system and may request the graphical programming system to create each graphical program object. The graphical programming system may be operable to automatically create a user interface control or indicator that matches the data expected by a node input or produced by a node output. For example, with respect to the block diagram node labeled "IMAQ Threshold", the graphical programming system may examine the input terminal of the node and discover that the terminal expects two integer values. The graphical programming system may then create a user interface control appropriate for providing two integer values, such as the "Range" control illustrated in FIG. 23.

Interfacing with a Graphical Programming System

As described above, in one embodiment the prototyping environment may interface with a graphical programming system in order to automatically generate a graphical program implementing a script. The graphical programming system may support an application programming interface (API) that allows callers to create or edit graphical programs and add objects or nodes to graphical programs in order to achieve the desired functionality. For example, the prototyping environment may first call an API function to create a graphical program object, obtaining a reference to this object. The prototyping environment may then call an API function to add nodes representing the appropriate image processing functions to the graphical program object.

The graphical programming system may support any of various types of APIs for callers to use. For example, many applications are operable to call standard ActiveX/COM components. Thus, in one embodiment, the graphical programming system may expose COM objects that the prototyping environment may call to create the graphical program. In another embodiment, the graphical programming system may provide a graphical API for creating graphical programs. An exemplary graphical API that may be used for creating a graphical program is described below.

Figure 24:
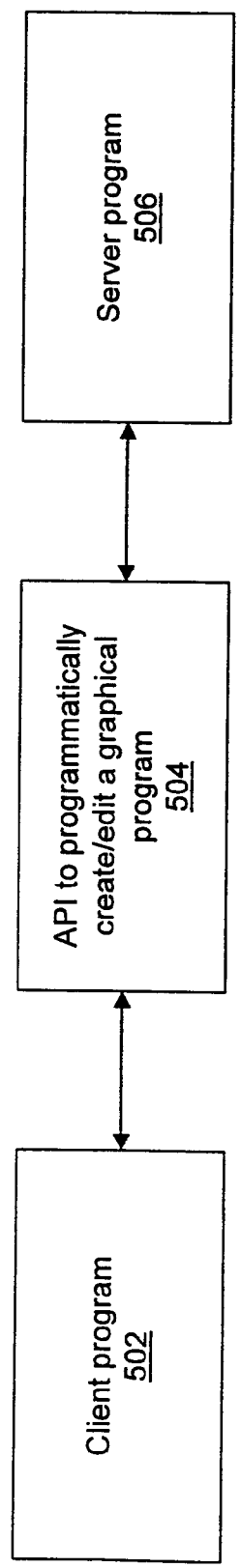
FIG. 24 is a block diagram illustrating the abstract relationship between a client program, an API to programmatically create/edit a graphical program, and a server program.

FIG. 24—Client Program Accesses Server Program Through an API

In general, a program utilizing an API provided by a graphical programming system in order to generate a graphical program is referred to herein as a client program. The image processing prototyping environment described above may be such a client program. The sections below, however, are described using the general term, "client program".

FIG. 24 is a block diagram illustrating the abstract relationship between a client program 502, an API 504 to programmatically create/edit a graphical program, and a server program 506. As noted above, the client program 502 may be any of various types of programs. For example, the client program 502 may be a graphical program. The client program 502 may also be a text-based program such as a C++ program, a Visual Basic program, a Java program, etc., or any combination of these or other languages. The client program 502 may execute independently or may execute within an execution subsystem of an application development environment.

The client program 502 may call the API 504 in any of various ways. For example, a client graphical program may include graphical nodes corresponding to the API 504. One embodiment of a set of graphical nodes which a client graphical program may utilize to create/edit a graphical program is described in detail below. A client graphical program may also interface with text-based code which calls the API 504.

For example, the client graphical program may be a LabVIEW graphical program which includes code interface nodes.

The client program 502 may call the API 504 in various other ways. For example, the server program 506 may expose a component such as an ActiveX component, CORBA component, JavaBeans component, etc., and the client program 502 may obtain a reference to the object to invoke functions or methods of the API 504. The API 504 may also be integrated with the language or development environment of the client program 502, e.g. as a library.

Through the API 504, the client program 502 communicates with a server program 506. The server program 506 is operable to perform the actions indicated by the API. For example, the server program may be operable to create a new graphical program, add objects to the graphical program, connect graphical program objects, etc. The server program 506 may be an instance of a graphical programming environment. In the preferred embodiment, the server program 506 is an instance of the LabVIEW graphical programming environment.

FIG. 24 illustrates the abstract relationship between the client program 502, the API 504, and the server program 506. In actual embodiments, various layers may exist which implement the elements of the FIG. 24 relationship. For example, the client program 502 may be a part of a larger software application, the server program 506 may receive information sent by the client program via an intermediate server, etc.

Figure 25:
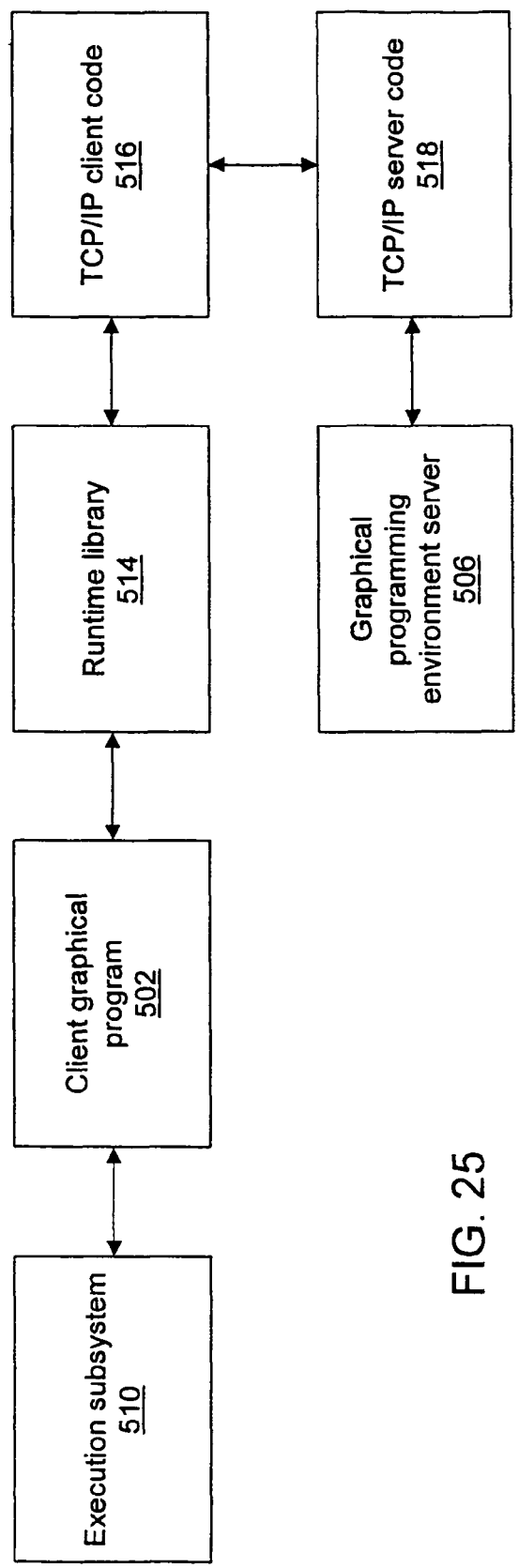
FIG. 25 illustrates an embodiment of the client/server relationship of FIG. 24 in which the client program is a graphical program, and the server program is an instance of a graphical programming environment application.

FIG. 25—Client Graphical Program Accesses Graphical Programming Environment

FIG. 25 illustrates one embodiment of the client/server relationship of FIG. 24. In the embodiment of FIG. 25, the client program 502 is a graphical program, and the server program 506 is an instance of a graphical programming environment application. The client graphical program 502 may execute independently or may execute within an execution subsystem 510, such as an execution subsystem of a graphical programming environment. The client graphical program 502 may be a graphical program created using the same graphical programming environment as the graphical programming environment server 506. For example, the client graphical program 502 may be a LabVIEW graphical program, and the server program 506 may be a LabVIEW application.

The client graphical program 502 utilizes the API 504 of FIG. 24 to communicate with the graphical programming environment server 506. For example, the client graphical program 502 may include graphical nodes which request the graphical programming environment 506 to open a graphical program, edit objects of the graphical program, etc. The functionality of the API 504 may be implemented in various ways. In the example of FIG. 25, the client graphical program 512 interfaces with a runtime library 514 which includes code corresponding to the API nodes. In other embodiments, the graphical program may interface with other types of software components which implement the API, such as ActiveX, CORBA, or JavaBeans components.

The client graphical program 502 may execute in a different location than the graphical programming environment server 506. The client and server programs may communicate using any of various types of protocols, such as a TCP/IP-based network protocol. As shown in FIG. 25, the runtime library 514 may include TCP/IP client code 516, and the graphical programming environment server 506 may include TCP/IP server code 518. The TCP/IP server code 518 may listen for requests from TCP/IP client code 516. Once a connection is established, the client code 516 and server code 518 may exchange messages using a message protocol.

The block diagram of FIG. 25 illustrates an architecture in which the client program 502 communicates with a server program 506 via a defined protocol. Thus, both the client program and the server program must know the required communications protocol. In the preferred embodiment of FIG. 25, the client graphical program 502 is a LabVIEW graphical program, and the server program 506 is a LabVIEW application instance. In this embodiment, the LabVIEW client program may include certain nodes, such as the nodes described below, for communicating with the LabVIEW application server and causing the LabVIEW application server to create/edit a graphical program.

Figure 26:
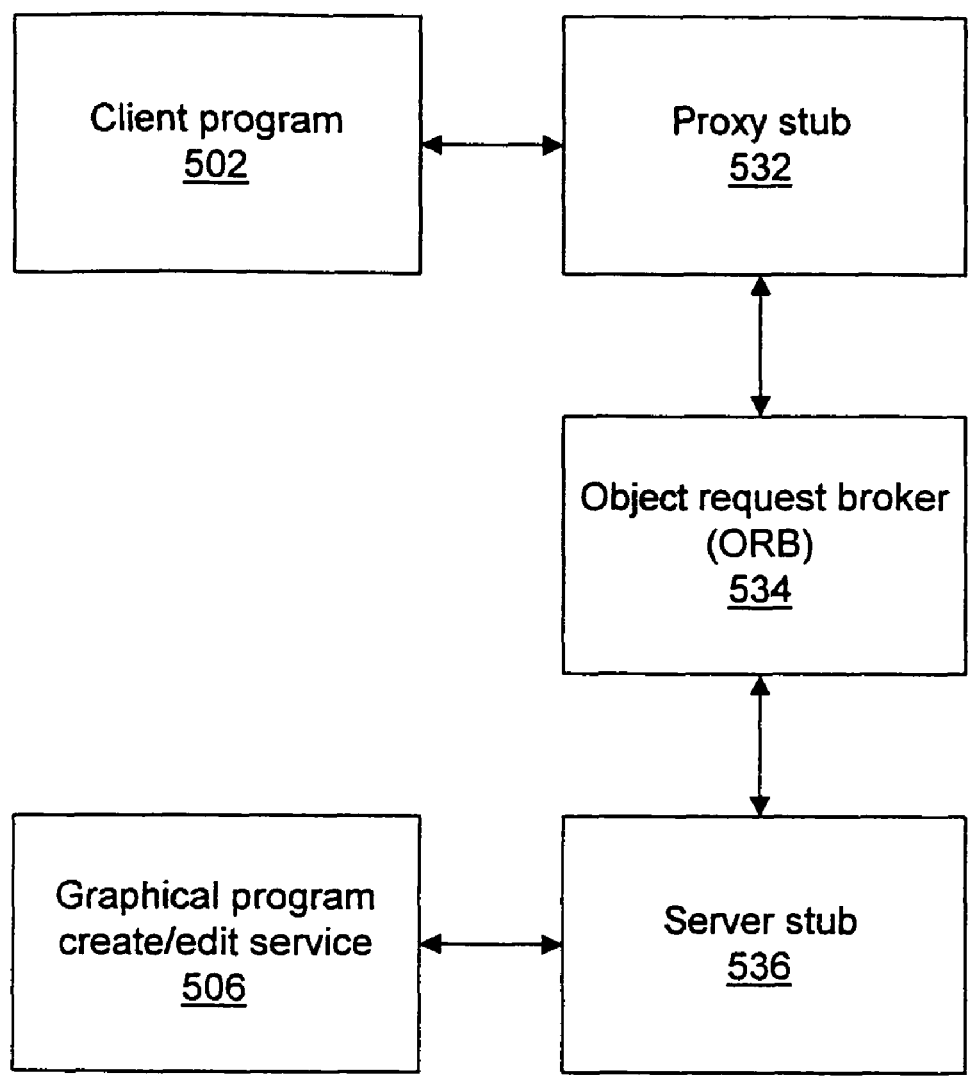
FIG. 26 illustrates an embodiment of the client/server relationship of FIG. 24 in which the client program communicates with the server program via an object request broker (ORB), and the server program is a service operable to create/edit a graphical program.

FIG. 26—ORB Client Program Accesses Graphical Program Service

FIG. 26 illustrates an embodiment of the client/server relationship of FIG. 24, in which a client program 502 may communicate with a server program 506 without needing to use a protocol specific to the client or server programs. In the embodiment shown in FIG. 24, the client program 502 is a program which communicates with the server program 506 via an object request broker (ORB), and the server program 506 is a service operable to create/edit a graphical program, referred to as a graphical program service. The client program 502 may be a text-based program, such as a Visual Basic, C++, Java, etc. program, or may be a graphical program. The graphical program service 506 may be implemented in any of various ways. For example, the service 506 may encapsulate or call a portion of a graphical programming environment which is operable to create/edit a graphical program, or alternatively, the service 506 may be a standalone program operable to create/edit a graphical program.

FIG. 24 illustrates the general relationship in which a client program references a service object via an ORB. The ORB may be any of various ORBs, such as the ActiveX/DCOM system, a CORBA system, a Java application environment, etc. The client program 502 requests a reference to the graphical program service 506 from the ORB 534. The ORB may create a proxy stub 532 for the client program 502 and a server stub 536 for the graphical program service. As shown in FIG. 24, the proxy stub 532 may communicate through the ORB infrastructure 534 with the server stub 536, and the server stub 536 may interface with the graphical program service 506. The proxy stub 532 may comprise API functions/methods to create/edit a graphical program which the client program 502 may invoke, and the ORB may transparently cause the graphical program service 506 to execute the corresponding functions/methods.

As an example, the ORB 532 may be the ActiveX/DCOM system, the client program 502 may be an automation client program, such as a Visual Basic automation client, and the graphical program service 506 may be an ActiveX component provided by a graphical programming environment. In this example, the client program 502 may create a reference to the ActiveX graphical program service component in the standard way and may invoke methods on the component to create/edit a graphical program. The ActiveX component may then execute appropriate portions of the graphical programming environment code in order to perform the requested operations. As another example, the ORB may be a Java application environment, and the client program 502 and the graphical program service 506 may be Java programs. In this example, the client program 502 may request an interface to the graphical program 506 and may use the interface to request the graphical program service 506 to create/edit a graphical program.

The block diagram of FIG. 24 illustrates a general architecture in which the client program 502 communicates with a graphical program service 506 via intermediate software proxies or components. Various elements of FIG. 24 may not be present, or various other elements may also be present, as appropriate for particular embodiments. In the preferred embodiment, the graphical program service is a software component such as an ActiveX component which is provided by the LabVIEW graphical programming environment for client programs to use to programmatically create/edit graphical programs.

FIGS. 27-40: VI Server Functions

The server program 506 of FIG. 24 is operable to receive requests to create/edit a graphical program from a client and perform the actual operations of creating/editing the graphical program. In the preferred embodiment, the server program of FIG. 24 is an application instance of the LabVIEW graphical programming environment. As noted above, the LabVIEW environment provides specialized support for developers of instrumentation and industrial automation applications, and a LabVIEW graphical program may be referred to as a virtual instrument or VI. The LabVIEW environment comprises functionality referred to as "VI Server" which enables client programs to communicate with the LabVIEW environment. The VI Server functionality enables client programs to programmatically create or edit a LabVIEW graphical program or VI.

A client program which requests LabVIEW to create/edit a VI may itself be a VI. A client VI may include particular nodes in the VI which utilize the VI Server functionality of a LabVIEW instance to request the LabVIEW instance to create a new VI, add objects to the VI, etc. These nodes are described in FIGS. 27-40 below, and FIGS. 41-44 illustrate exemplary uses of these nodes. LabVIEW also provides components such as. ActiveX components which enable text-based programs such as Visual Basic programs, Visual C++ programs, etc. to access the VI Server functionality. In the preferred embodiment, these components enable text-based programs to perform all of the functions described below.

It is noted that, although the implementations of the blocks shown in FIG. 24 are described with reference to the preferred embodiment of LabVIEW and VI Server, these implementations may differ in other embodiments.

Figure 27:
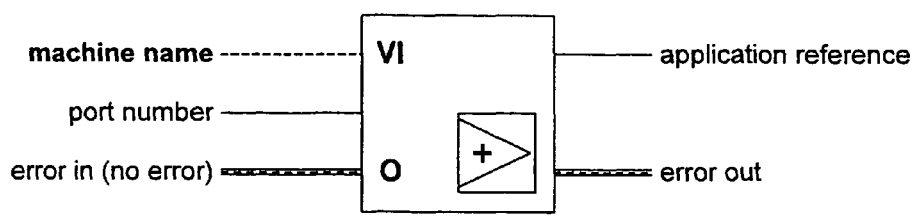
FIGS. 27-37 illustrate graphical program nodes that may be included in a first graphical program in order to programmatically create or edit a second graphical program.

FIG. 27—Open Application Reference Node

FIG. 27 illustrates the Open Application Reference node. The Open Application Reference node returns a reference to a VI Server application running on the specified computer. If an empty string is specified for machine name, then the node returns a reference to the local LabVIEW application in which this function is running. If a machine name is specified, then the node attempts to establish a TCP connection with a remote VI Server on that machine on the specified port.

The application reference output can be used as an input to the Property and Invoke nodes described below to get or set properties and invoke methods on the application. The application reference output is used as the input to the Open VI Reference function to obtain references to VIs in that application. The reference is closed with the Close Application or VI Reference function. If the user forgets to close this reference, the reference closes automatically when the top level VI associated with this function finishes executing. However, closing the reference operates to conserve the resources involved in maintaining the connection.

The following describes the inputs and outputs of the Open Application Reference node:

machine name is the address of the computer that runs a copy of LabVIEW to which it is desired to establish a connection. This address can be in dotted decimal notation (such as 130.164.15.250) or domain name notation (such as foo.natinst.com). An empty string will cause this function to return a reference to the local LabVIEW. The machine name input enables client programs to communicate with a VI Server instance running on any computer connected to the Internet.

port number is the port on which the remote LabVIEW application is listening. If port number is not wired, the default VI Server listener port number (3363) is used.

error in describes error conditions that occur prior to the execution of this function. The default input of this cluster is "no error". If the error Boolean of this cluster is True, the Open Application Reference function will do nothing but pass through the error via the error out output.

application reference is the reference to the specified application.

error out contains error information. If error in indicates an error, error out contains the same error information. Otherwise it describes the error status that this function produces.

Figure 28:
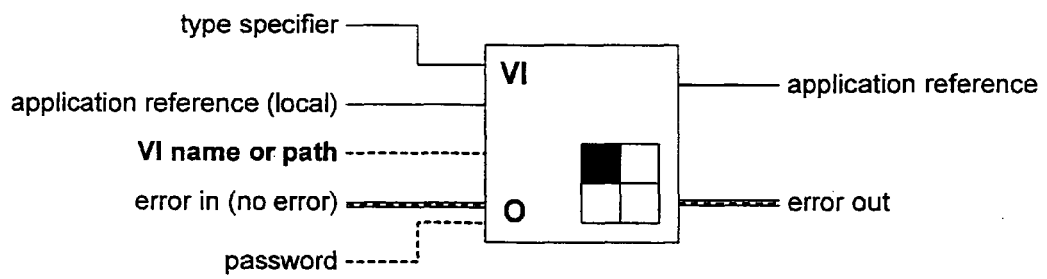

FIG. 28—Open VI Reference Node

FIG. 28 illustrates the Open VI Reference node. The Open VI Reference node returns a reference to a VI specified by a name string or path to the VI's location on disk. This reference may then be used to edit the VI. In the current embodiment, references can only be obtained to standard VIs. This excludes Control, Typedef, and Global VIs. In the preferred embodiment, the Open VI Reference node can be used to obtain a reference to any VI.

References to VIs in another LabVIEW application are obtained by wiring an application reference (obtained from the Open Application Reference function) to this function. In this case, the path input refers to the file system on the remote LabVIEW computer. If a reference is wired to the local LabVIEW application the same behavior is obtained as if nothing had been wired to the application reference input.

If editing operations are to be performed on the referenced VI, and the VI has a password-protected diagram, the password is provided to the password string input. If the incorrect password is provided, the Open VI Reference function returns an error and an invalid VI reference. If no password is provided when opening a reference to a VI that is password protected, the reference can still be obtained, operations can only be performed that do not edit the VI.

If the specified VI is to be called through the Call By Reference function, a strictly-typed VI reference is wired to the type specifier input. The function ignores the value of this input. Only the input's type—the connector pane information—is used. By specifying this type, the Open VI Reference function verifies at run time that the referenced VI's connector pane matches that of the type specifier input.

If a Generic VI refnum type is wired to the type specifier input, this results in the same behavior as if the type specifier input had not been wired at all.

If the type specifier input is wired with a strictly-typed VI refnum, the VI must meet several requirements before the VI reference is returned successfully:

1) The VI cannot be broken for any reason.
2) The VI must be runnable as a subVI, that is, it cannot be active as a top-level VI (unless the VI is re-entrant).
3) The connector pane of the VI must match that of the type specifier.

If the user forgets to close this reference using a close reference node, the reference closes automatically when the top-level VI associated with this function finishes executing. However, closing the reference operates to conserve the resources involved in maintaining the connection.

If a strictly-typed reference to a reentrant VI is obtained, a dedicated data space is allocated for that reference. This data space is preferably always used and is used only in conjunction with the output VI reference. This can lead to some new behaviors in LabVIEW. For example, parallel calls (using the Call By Reference node) to a reentrant VI using the same VI reference do not execute in parallel, but executes serially, one after the other. As another example, a reentrant VI could get a reference to itself (allocating a new data space) and call itself recursively through the Call By Reference node. It is noted that allocating a data space dynamically is both time consuming and memory consuming and is not generally recommended for implementing recursive algorithms.

A VI reference is similar to what is known as a function pointer in other languages. However, in LabVIEW, these function pointers also can be used to reference VIs across a network.

The following describes the inputs and outputs of the Open VI Reference node:

application reference is a reference to a LabVIEW application. If this input is left unwired, the reference is to an application on the local version of LabVIEW. If the input is wired, and the reference is to a remote version of LabVIEW, then the remote LabVIEW is queried to return the VI reference.

type specifier is used for its data type only. The value of the input is ignored. The data type of the type specifier input determines the data type of the vi reference output.

VI name or path is polymorphic and can accept a string containing the name of the desired VI, or a path containing the complete path (including the name) to the desired VI. If a name string is wired, then the VI must already be in memory. If a path is wired and the VI is already in memory, the VI in memory is obtained, whether its path is the same as the input or not. If the VI is not in memory, then the VI must be at the specified path for this function to succeed. If the VI is at that location, the VI is loaded into memory.

error in describes error conditions that occur prior to the execution of this function. The default input of this cluster is no error.

password is the plain-text file for the VI. If the VI is not password protected, the input is ignored. If the VI is password protected and an incorrect password is entered, the VI can be referenced, but the VI cannot be edited through that VI reference.

vi reference is the refnum associated with the requested VI. If the function fails, "not-a-refnum" is returned.

error out contains error information. If error in indicates an error, error out contains the same error information. Otherwise error out describes the error status that this VI produces.

If the user specifies a remote version of LabVIEW by the application reference input, the path is interpreted on the remote machine in the context of the remote file system. The path is expressed using the local computer's path separators, but is translated to the remote computer's path separators when the request arrives there. For example, to reference a VI on a Macintosh at My HD:LabVIEW VIs.foo.vi from a Windows application, the Window's path syntax: My HD:\LabVIEW VIs\foo.vi would be used. Conversely, to reference a VI on a Windows computer at C:\labview\foo.vi from a Macintosh application, the Macintosh path syntax: C:labview:foo.vi would be used.

Figure 29:
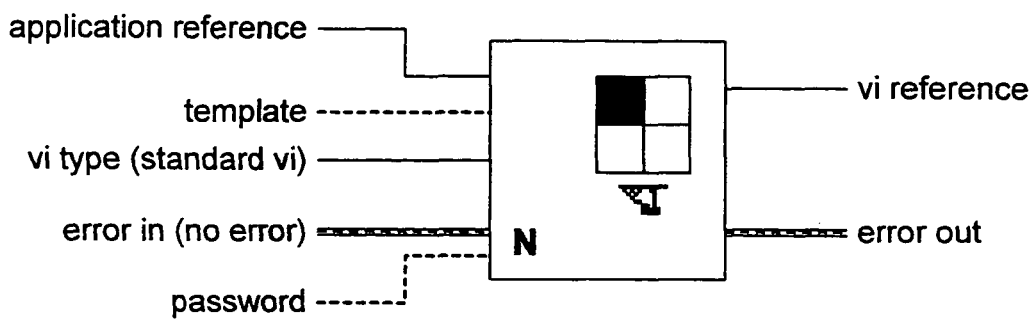

FIG. 29—New VI Reference Node

FIG. 29 illustrates the New VI Reference node. The New VI Reference node creates a new VI and outputs a reference to the new VI. The following describes the inputs and outputs of the New VI Reference node:

application reference is an input reference to a local or remote LabVIEW application. Such a reference may be obtained from the Open Application Reference node. If this input is left unwired, the reference is to an application on the local version of LabVIEW.

template is a path of or reference to an existing VI to be used as a template for the new VI. If the template input is wired, the new VI will be a copy of the template VI.

vi type specifies the type of VI to create. The possible types are: standard VI, global VI, or control VI.

error in describes error conditions that occur prior to the execution of this function. The default input of this cluster is no error.

password is the password input for the template VI, if a password-protected VI is wired to the template input. If the template VI is not password protected, the password input is ignored.

vi reference is the refnum associated with the newly created VI. If the function fails, "not-a-refnum" is returned.

error out contains error information. If error in indicates an error, error out contains the same error information. Otherwise error out describes the error status that this node produces.

Figure 30:
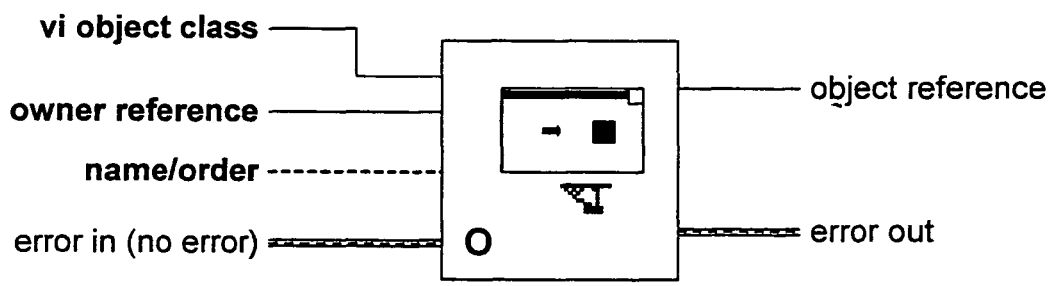

FIG. 30—Open VI Object Reference Node

Figure 39:
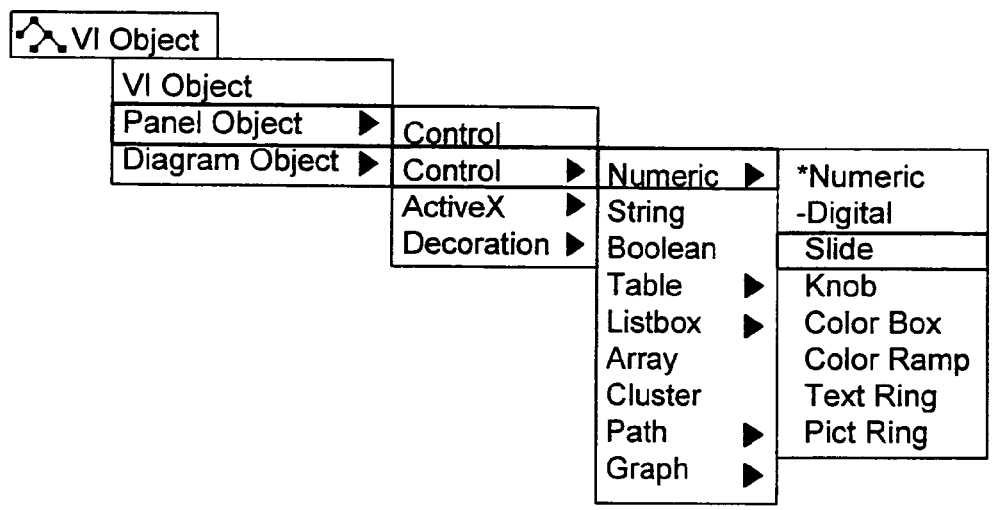
FIGS. 39 and 40 illustrate how a user may select graphical program objects to create or edit by choosing from hierarchical menus.

FIG. 30 illustrates the Open VI Object Reference node. The Open VI Object Reference node outputs a reference to an object contained in a VI. The following describes the inputs and outputs of the Open VI Object Reference node:

vi object class specifies the type of object reference to obtain. References to both objects of a front panel (user interface panel) and of a block diagram may be obtained. FIG. 39 illustrates how a user may choose a value for the vi object class input by selecting from a hierarchical menu. For example, a "slide" value may be chosen to designate that the reference to obtain is a reference to a slide user interface control.

owner reference is an input reference to the object that "owns" or "contains" the object for which a reference is to be obtained. The owner reference may be a reference to a VI or to an object within a VI. For example, the owner reference may be a reference to a block diagram node, and the reference to be obtained may be a reference to an input terminal of the block diagram node.

name/order identifies the name or order, e.g. zplane order, of the object for which to obtain a reference. The name/order input may be a simple string, an array of strings, or a numeric constant. An array of names may be used if the object is a nested object. For example, to access the status boolean of an error cluster in an array called "myArray", the name array may be: ["myArray", NULL, "status"].

error in describes error conditions that occur prior to the execution of this function. The default input of this cluster is no error.

object reference is an output reference to the object specified by the node inputs. If the function fails, "not-a-refnum" is returned.

error out contains error information. If error in indicates an error, error out contains the same error information. Otherwise error out describes the error status that this node produces.

Figure 31:
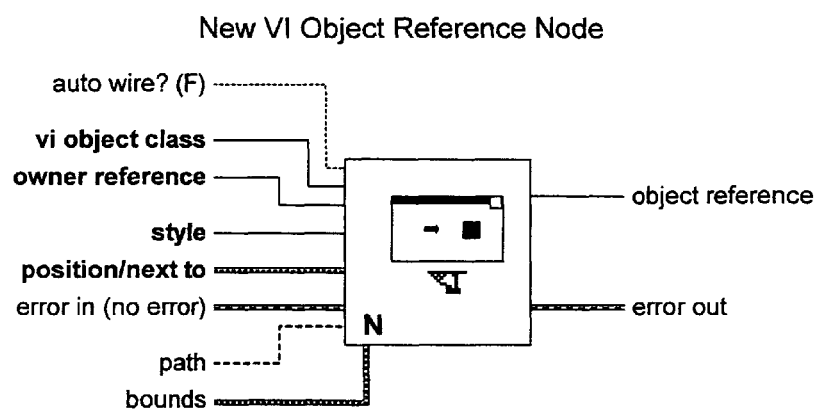

FIG. 31—New VI Object Reference Node

Figure 40:
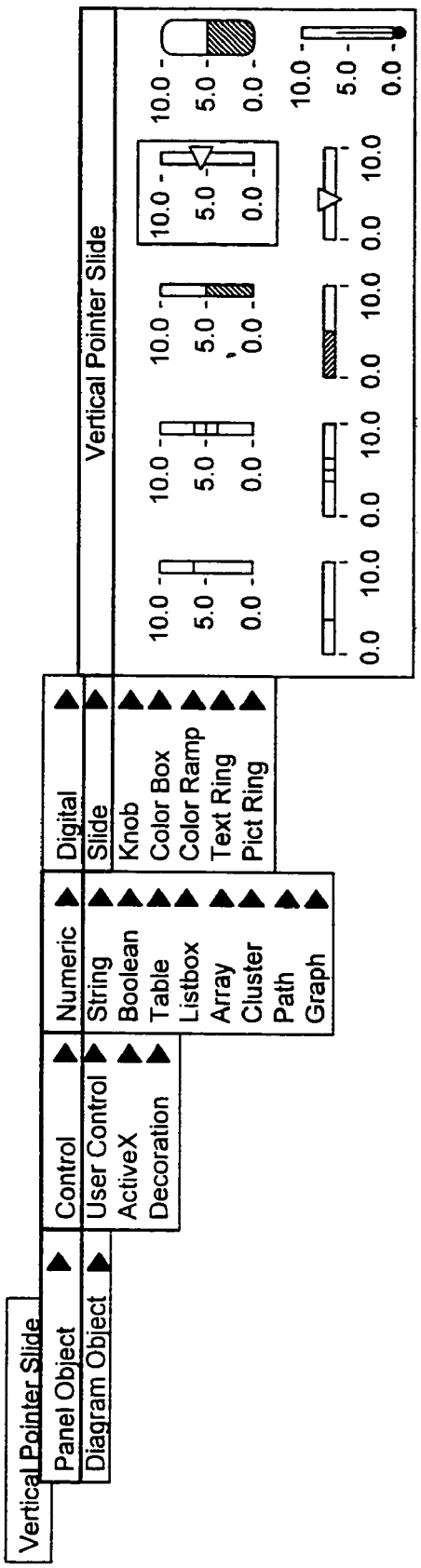

FIG. 31 illustrates the New VI Object Reference node. The New VI Object Reference node creates a new VI object and outputs a reference to the new VI object. The following describes the inputs and outputs of the New VI Object Reference node:

auto wire is a boolean input specifying whether to automatically wire the terminals of the new object with compatible terminals of a source object. This input is only applicable for diagram objects, not user interface objects. If this input is wired, then the position/next to input should also be wired.

vi object class specifies the type of object to create. Both objects for a front panel (user interface panel) and for a block diagram may be created. FIG. 39 illustrates how a user may choose a value for the vi object class input by selecting from a hierarchical menu. For example, a "slide" value may be chosen to designate that the reference to obtain is a reference to a slide user interface control.

owner reference is a reference to the VI or VI object that will "own" or "contain" the new object. For example, the owner may be the VI, and the new object may be a new function node to add.

style specifies the style or sub-class of object to create. FIG. 40 illustrates how a user may choose a value for the style input by selecting from a hierarchical menu. For example, if "slide" is chosen as the vi object class input, then "vertical pointer slide" may be chosen for the style input. The style input is ignored if the path input is wired.

position/next to specifies a position for the new object. An X-Y coordinate pair may be wired to this input, or a reference to an existing object may be wired. If an object reference is wired in, then the new object is positioned next to the referenced object.

error in describes error conditions that occur prior to the execution of this function. The default input of this cluster is no error.

path specifies the location of a user control/VI.

bounds specifies the size of the new object. The bounds input is ignored for fixed-size objects.

Figure 32:
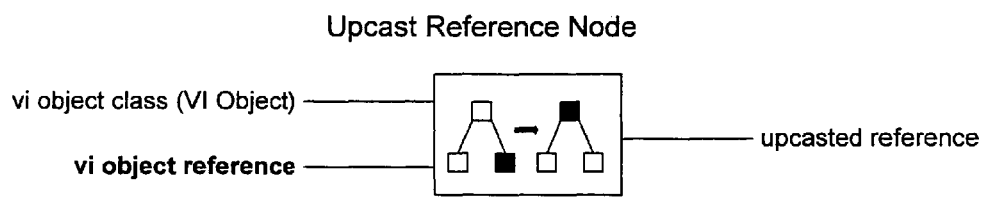

FIG. 32—Upcast Reference Node

FIG. 32 illustrates the Upcast Reference node. The Upcast Reference node casts the type of a reference to an object to the type of a superclass for the object. The following describes the inputs and outputs of the Upcast Reference node:

vi object reference specifies a VI object reference to upcast.

vi object class specifies a class to cast the object reference to. FIG. 39 illustrates how a user may choose an object class from a hierarchical menu. For example a reference to a vertical pointer slide object may be upcasted to a reference to a general slide object.

upcasted reference is an output reference with the specified class as the reference type information. If the upcast fails, "not-a-refnum" is the output value.

Figure 33:
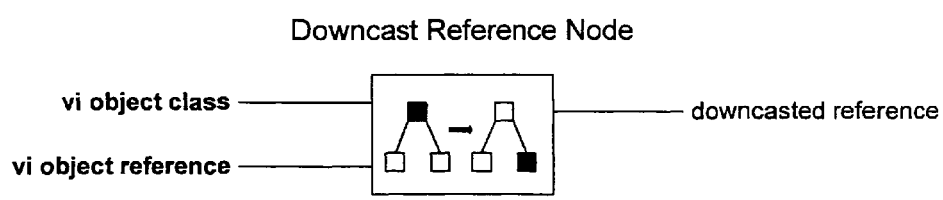

FIG. 33—Downcast Reference Node

FIG. 33 illustrates the Downcast Reference node. The Downcast Reference node casts the type of a reference to an object to the type of a subclass. The following describes the inputs and outputs of the Downcast Reference node:

vi object reference specifies a VI object reference to downcast.

vi object class specifies a class to cast the object reference to. FIG. 40 illustrates how a user may choose a class from a hierarchical menu. For example a reference to a general slide object may be downcasted to a reference to a vertical pointer slide object.

error in describes error conditions that occur prior to the execution of this function. The default input of this cluster is no error.

downcasted reference is an output reference with the specified class as the reference type information. If the downcast fails, "not-a-refnum" is the output value.

error out contains error information. If error in indicates an error, error out contains the same error information. Otherwise error out describes the error status that this node produces.

Figure 34:
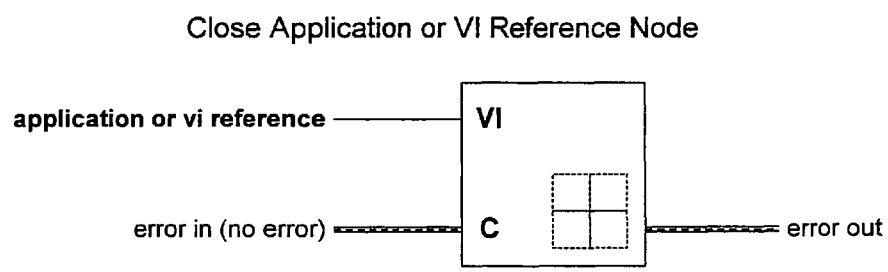

FIG. 34—Close Application or VI Reference Node

FIG. 34 illustrates the Close Application or VI Reference node. The Close Application or VI Reference node closes an open VI or the connection to a LabVIEW application instance. The following describes the inputs and outputs of the Close Application or VI Reference node:

application or vi reference is the refnum associated with an open VI or a LabVIEW application instance.

error in describes error conditions that occur prior to the execution of this function. The default input of this cluster is no error.

error out contains error information. If error in indicates an error, error out contains the same error information. Otherwise it describes the error status that this node produces.

Figure 35:
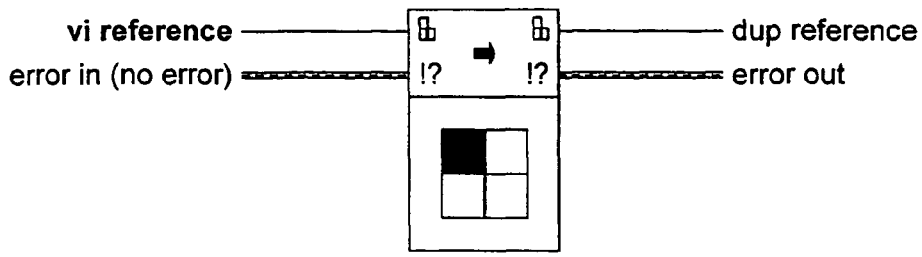

FIG. 35—Call By Reference Node

FIG. 35 illustrates the Call By Reference node. The Call By Reference node may be used to call a VI, such as a VI which has been created programmatically. The Call By Reference node is similar to a sub-VI node in that either can be used to call a VI. However, a sub-VI node is statically linked to a particular VI that the user determines when he/she drops the node on the diagram. With the Call By Reference node, the VI that is called is determined dynamically at run time by the value of the VI reference wired to the reference input at the top of the node. Thus, the VI which is called by the Call By Reference node may be on a different computer.

The top of the Call By Reference node includes four terminals: an input/output pair of flow through VI reference terminals, and an input/output pair of flow through error clusters. The VI reference input accepts wires only from strictly-typed VI references. Below these terminals is an area within which a connector pane resides (is displayed) that is identical to that of a VI with its terminals showing (rather than its icon). The connector pane of the strictly-typed VI reference input determines the pattern and data types of this connector pane which is displayed in the Call By Reference node icon. The user wires to these terminals just as he/she would to a normal sub-VI.

As long as none of the terminals of the connector pane have wires attached to them, the connector pane will adapt automatically to that of the input VI reference's connector pane. However, if any of them are wired, the node does not adapt automatically, and the user must explicitly change the connector pane (possibly breaking those wires) by popping up on the node and selecting the Adapt To Reference Input menu item.

At run time there is a small amount of overhead in calling the VI that is not necessary in a normal sub-VI call. This overhead comes from validating the VI reference and a few other bookkeeping details. However, for a call to a VI in the local LabVIEW, this overhead should be insignificant for all but the smallest subVIs. Calling a VI located in another LabVIEW application (across the network) may involve more overhead.

The following describes the inputs and outputs of the Call By Reference node:

vi reference is the refnum associated with a VI that is already open.

error in describes error conditions that occur prior to the execution of this function. The default input of this cluster is no error.

dup reference has the same value as reference.

error out contains error information. If error in indicates an error, error out contains the same error information. Otherwise, it describes the error status that this VI produces.

Figure 36:
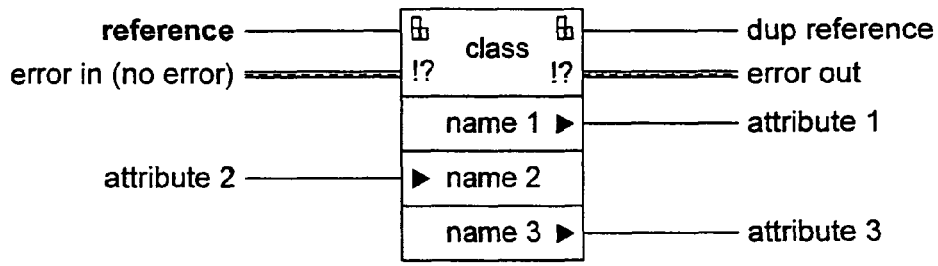

FIG. 36—Property Node

FIG. 36 illustrates the Property node. The Property node sets (writes) or gets (reads) application, VI and VI object property information. Thus, the Property node may be used to create/edit a graphical program. For example, the property node may be used to change the color of a user interface object, etc.

To select a specific property, the user pop ups on one of the name terminals and selects Properties. The list of available properties to select from may depend on the type of object wired to the reference input. To set property information, the user pop ups and selects Change to Write. To get property information the user pop ups and selects Change to Read. Some properties are read only, so Change to Write cannot be seen in the popup menu. If the user desires to add items to the node, the user pop ups and selects Add Element or clicks and drags the node to expand the number of items in the node. The properties are changed in the order from top to bottom. If an error occurs on one of the properties, the node stops at that property and returns an error. In this case, no further properties are handled. The error string reports which property caused the error. If the small direction arrow on a property is on the left, then the property value is being set. If the small direction arrow on the property is on the right, the user is getting the property value. Each property name has a short or long name which can be changed by popping up and selecting Name Format. Another name format is no name where only the type is displayed for each property. The Property node may be used to access or affect a number of different properties, including VI (virtual instrument) and application properties.

The inputs and outputs of the Property node are described below.

reference is the refnum associated with a VI object, VI, or a LabVIEW application instance.

error in describes error conditions that occur prior to the execution of this function. The default input of this cluster is no error.

dup reference has the same value as reference.

error out contains error information. If error in indicates an error, error out contains the same error information. Otherwise error out describes the error status that this node produces.

Figure 37:
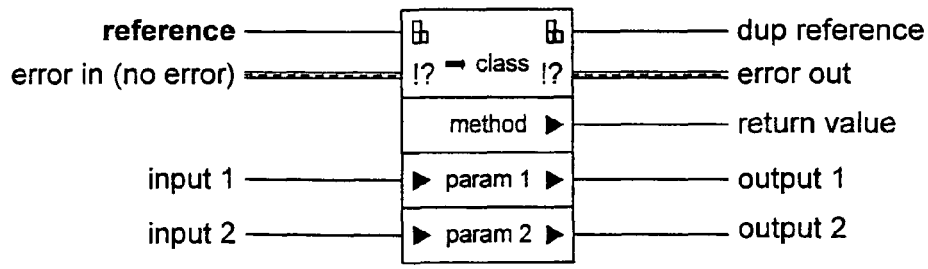

FIG. 37—Invoke Node

FIG. 37 illustrates the Invoke node. The Invoke node invokes a method or action on a VI or VI object. Thus, the Invoke node may be used to create/edit a graphical program. For example, a method may be invoked on a block diagram node to reposition the node, wire the node to another node, etc. Most methods have parameters associated with them. To select the method, the user pops up anywhere on the node and select Methods. Once the user selects the method, the associated parameters appear in the node, as shown in FIG. 37. The number of parameters shown may vary, depending on which method is selected. Each parameter may have an input terminal, output terminal, or both. An output terminal may be present for the return value of the method. The Invoke node may be used to invoke a number of different methods, including VI (virtual instrument), VI object, and application methods.

The inputs and outputs of the Invoke node are as follows:

reference is the refnum associated with a VI object, VI, or application on which the user desires to perform an action.

error in describes error conditions that occur prior to the execution of this function. The default input of this cluster is no error.

dup reference has the same value as reference.

error out contains error information. If error in indicates an error, error out contains the same error information. Otherwise error out describes the error status that this node produces.

Figure 38:
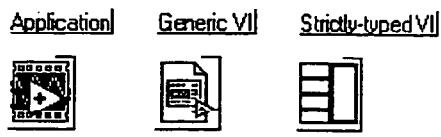
FIG. 38 illustrates user interface controls which may be placed on a front panel in order to interactively obtain a reference to a server program or a graphical program to edit.

FIG. 38—VI Server Refnum Controls

FIG. 38 illustrates user interface controls which may be placed on a front panel in order to interactively obtain a reference, such as a reference to a VI. VI references are further sub-divided into two classes of VIs: the Generic VI and the Strictly typed VI. In general, a Generic VI reference is used to perform editing operations (e.g., setting properties or invoking functions) on any VI, and a Strictly-typed VI reference is used to call a dynamically loaded VI as a sub-VI, and to perform operations that do not edit or change the VI. FIG. 38 illustrates front panel refnum controls for the Application, Generic VI, and Strictly-typed VI data types. As shown in FIG. 38, the image in each refnum icon indicates the type of the refnum. The Application class refnum icon displays the LabVIEW application icon. The Generic VI class refnum icon displays the VI file icon. The Strictly-typed VI class refnum icon depicts the connector pane that defines the class.

The front panel refnum comprises a reference to an appropriate entity. Thus, the Application refnum provides a reference to a graphical programming application, e.g. a LabVIEW application, the generic VI refnum provides a reference to a generic virtual instrument or generic graphical program, and the strictly typed VI refnum provides a reference to a specified graphical program or VI.

In the preferred embodiment, the user selects a VI Server front panel refnum control and places this refnum control in a front panel of a VI. The user then configures the refnum to be either an Application refnum, a Generic VI refnum, or a Strictly-typed VI refnum. Once the user has configured the refnum control to one of these three types, the refnum control takes on the respective appearance by the class selected by the user. For example, if the user drops the front panel refnum control on the front panel and configures the refnum to be of the Application class, the refnum takes on the Application icon appearance shown in FIG. 38.

When the user drops or places the VI Server refnum in the front panel and configures the refnum, corresponding terminals appear in the block diagram. These terminals provide the information on the application or graphical program referenced by the refnum.

Figure 41:
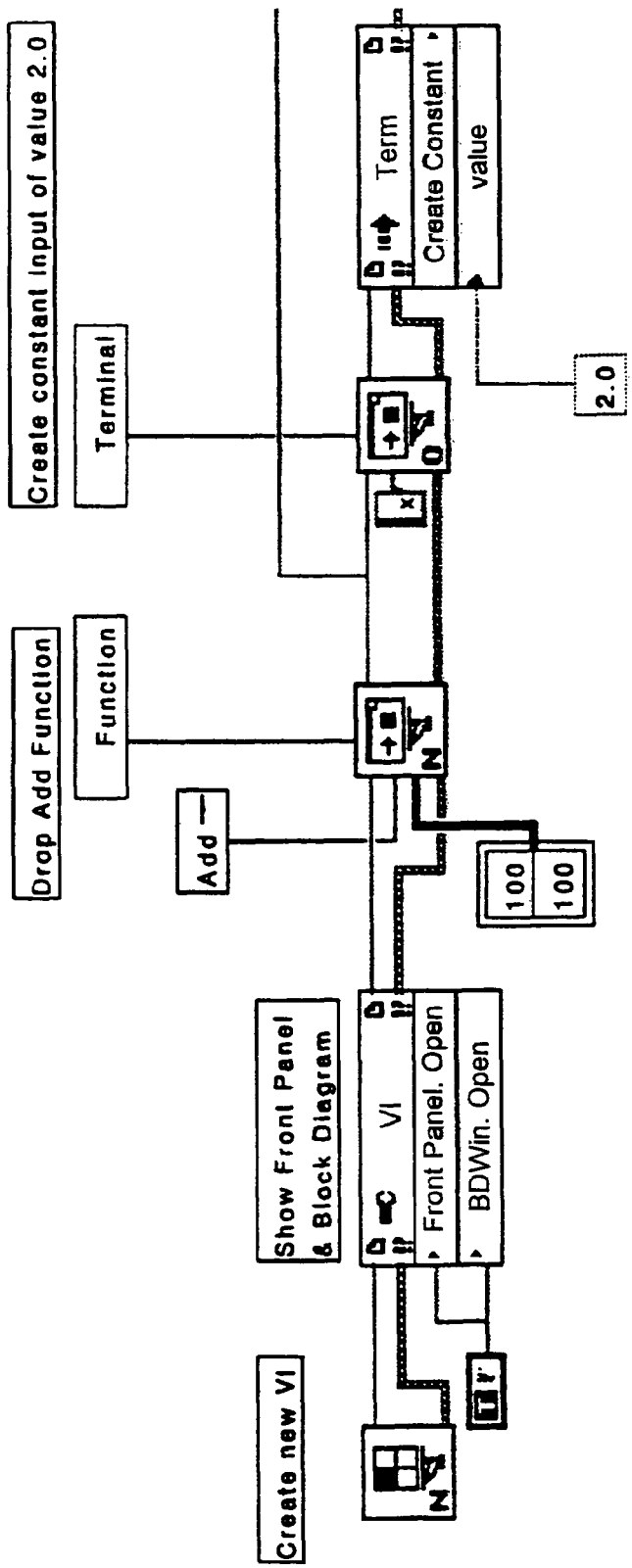
FIG. 41 illustrates a simple client graphical program that generates the graphical program of FIGS. 5A and 5B.
Figure 41:
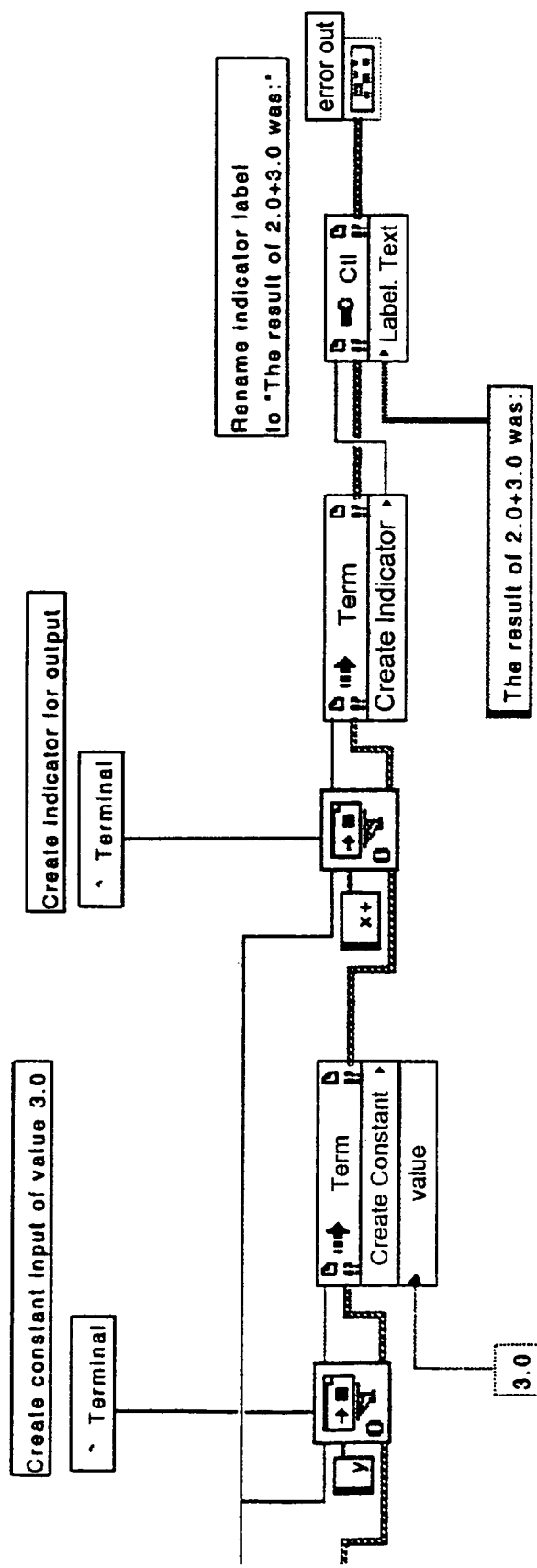

FIG. 41—Programmatic Graphical Program Creation Example

FIG. 41 illustrates an exemplary client graphical program that uses the nodes described above to dynamically create the graphical program of FIGS. 5A and 5B. Various sections of the FIG. 41 program are labeled in the diagram to illustrate the purpose of the code.

As shown in FIG. 41, a New VI Reference node is used to create a new graphical program. Since no application reference is passed to the New VI Reference node, the new graphical program is created by the default local LabVIEW application instance. The New VI Reference node outputs a reference to the new graphical program, and the Property node "reference" input receives this reference. The Property node sets properties of the graphical program, specifying that the user interface panel window and block diagram window of the graphical program are open. As described above, a user may pop up a menu to select the desired property of an object to get or set. The list of displayed properties may vary according to what type of object the reference input references.

After the graphical program has been created and modified as described above, a New VI Object Reference node is used to create the Addition function node shown in FIG. 5B.

Next, the Open VI Object Reference Node is used to obtain a reference to the "x" input terminal of the Addition function node. The reference to the "x" input terminal is passed to an Invoke node, which creates a constant value of 2.0 that is wired to the "x" input terminal. As described above, a user may pop up a menu to select the desired method to invoke on an object. The list of displayed methods may vary according to what type of object the reference input references. Similarly, an Open VI Object Reference Node and an Invoke node are used to create a constant value of 3.0 that is wired to the "y" input terminal of the Addition function node.

Next, an Open VI Object Reference Node and an Invoke node are used to create a user interface indicator control that is wired to the output terminal of the Addition function node.

Finally, a Property node is used to rename the label of the user interface indicator control to, "The result of 2.0+3.0 was:", as shown in FIG. 5A. Note that the reference to the user interface indicator control created by the preceding Invoke node is wired as the input reference to this Property node.

Figure 42:
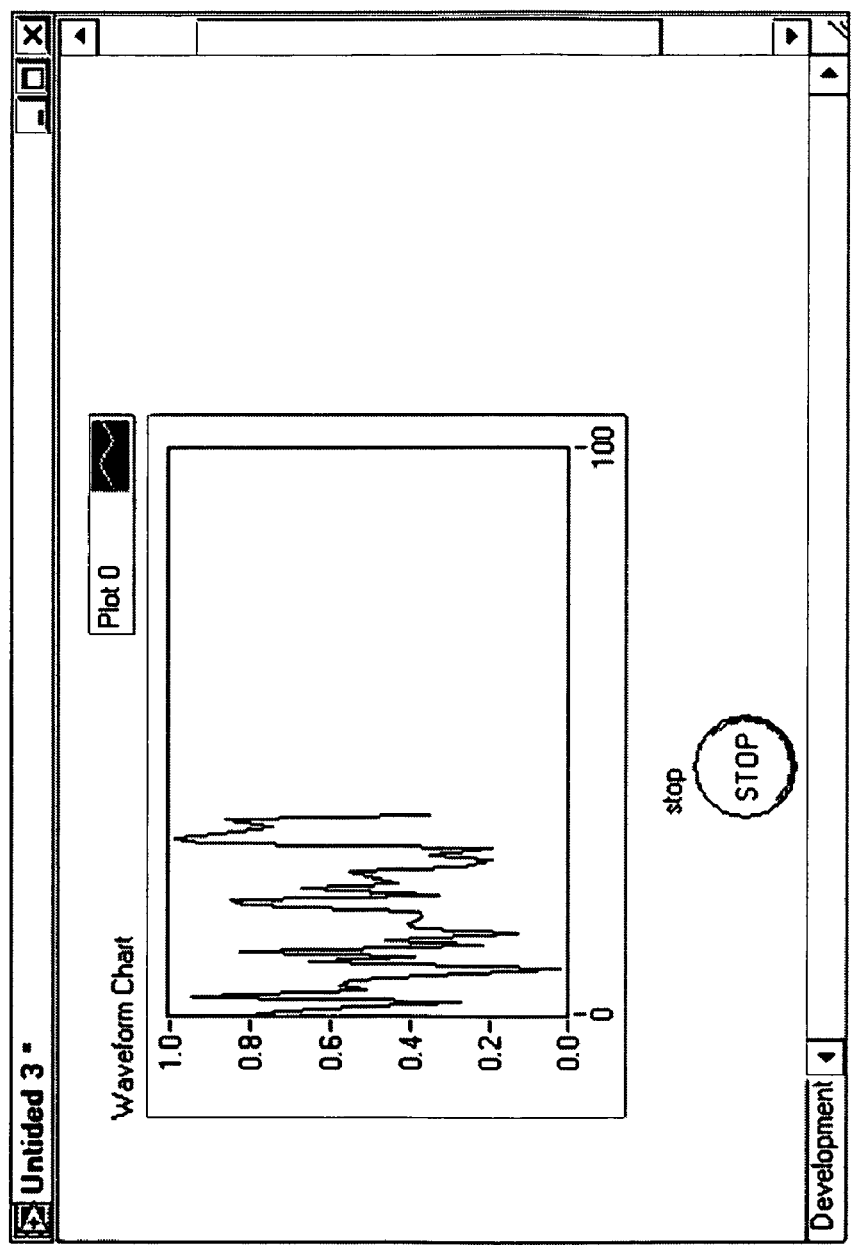
FIGS. 42 and 43 illustrate a slightly more complex example of a graphical program than the program of FIGS. 5A and 5B.
Figure 43:
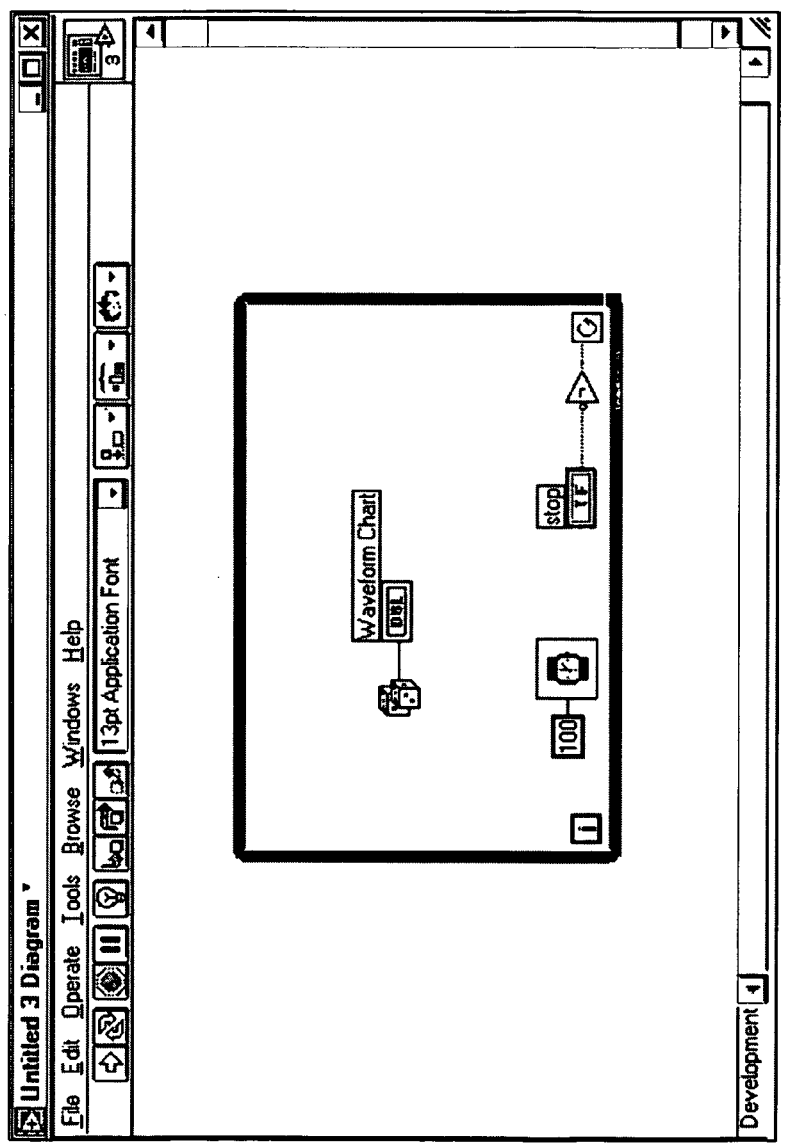
Figure 44A:
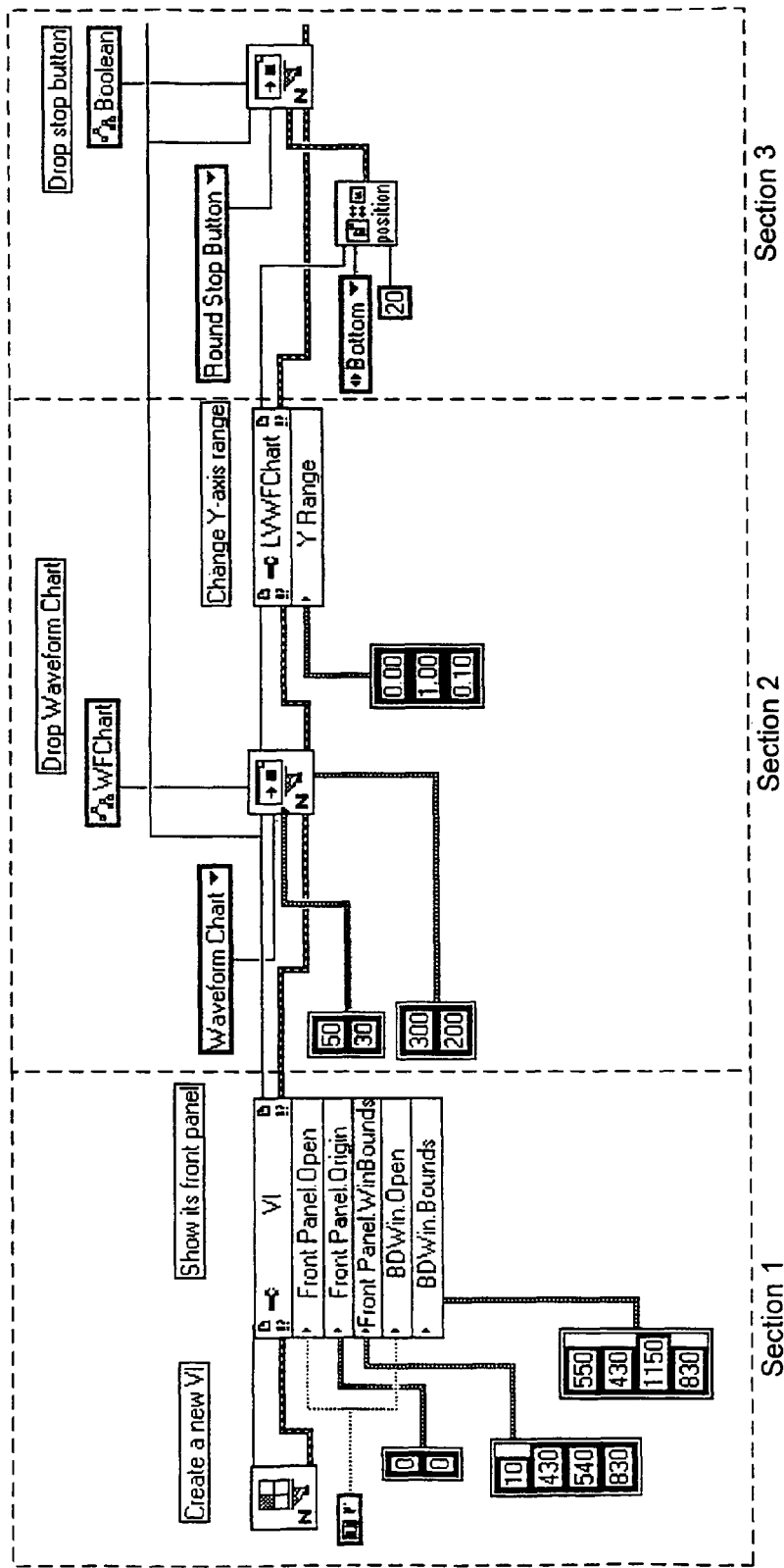
FIG. 44 illustrates a graphical program client that generates the graphical program of FIGS. 42 and 43.
Figure 44A:
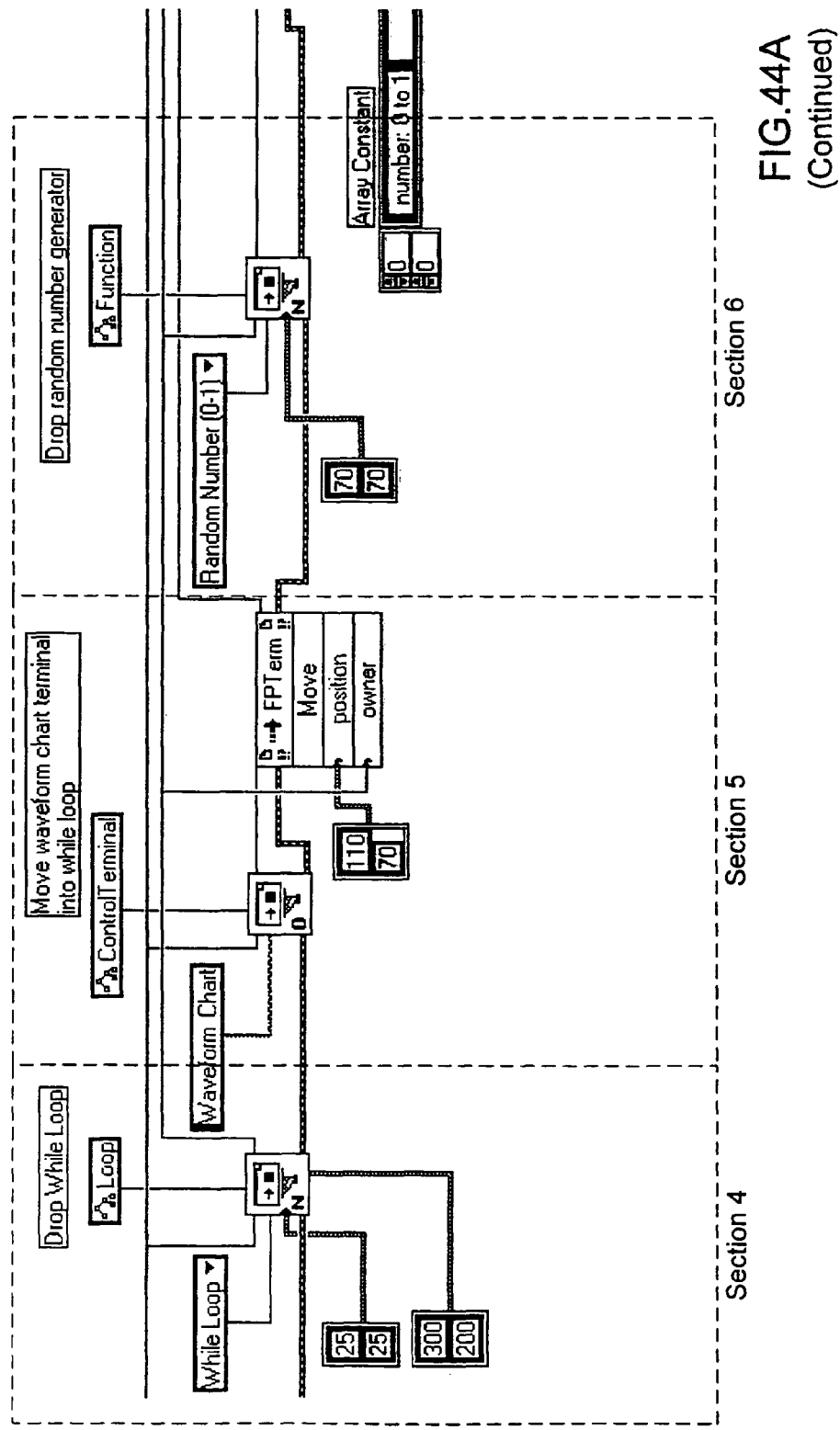
Figure 44B:
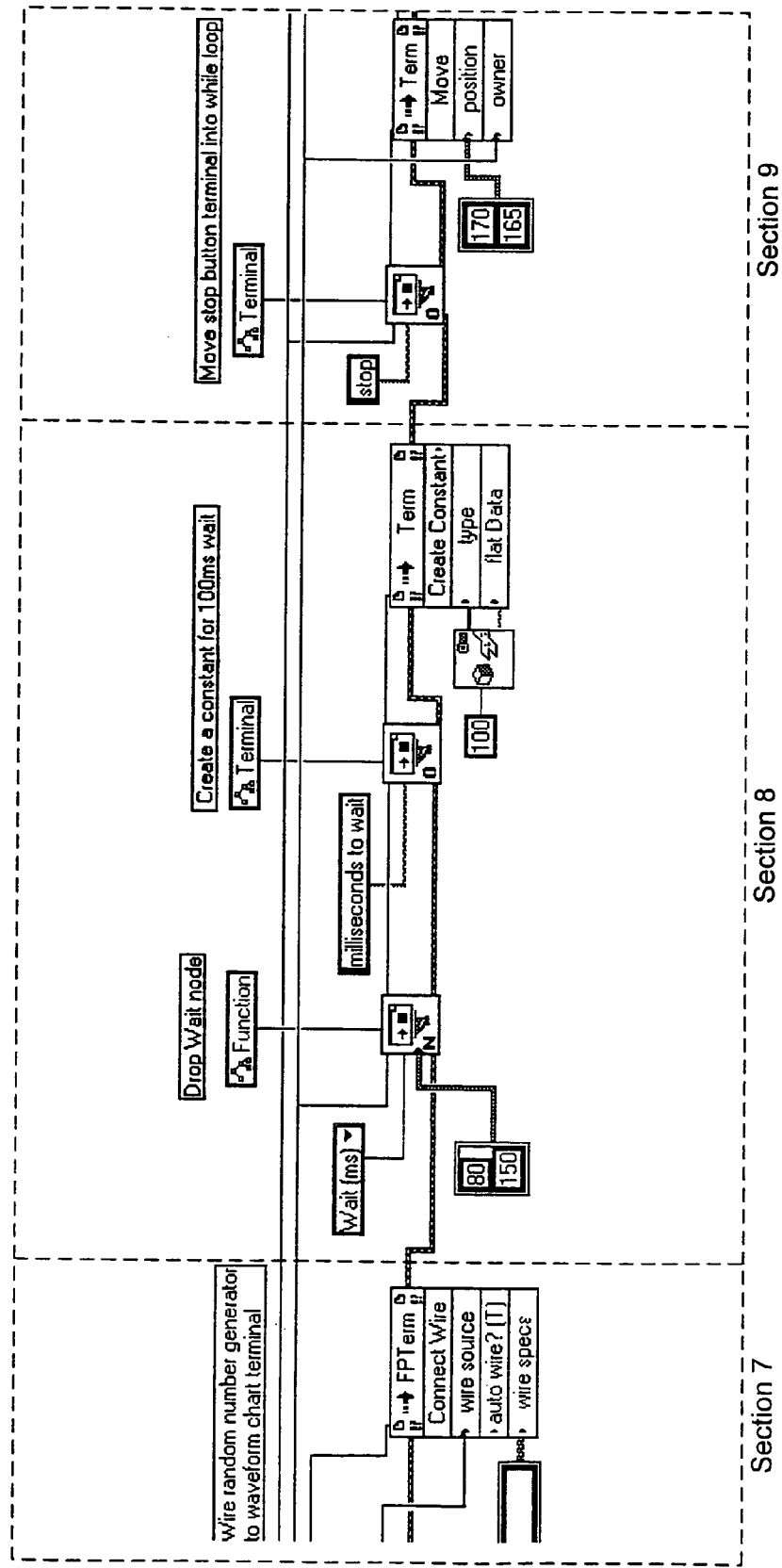
Figure 44B:
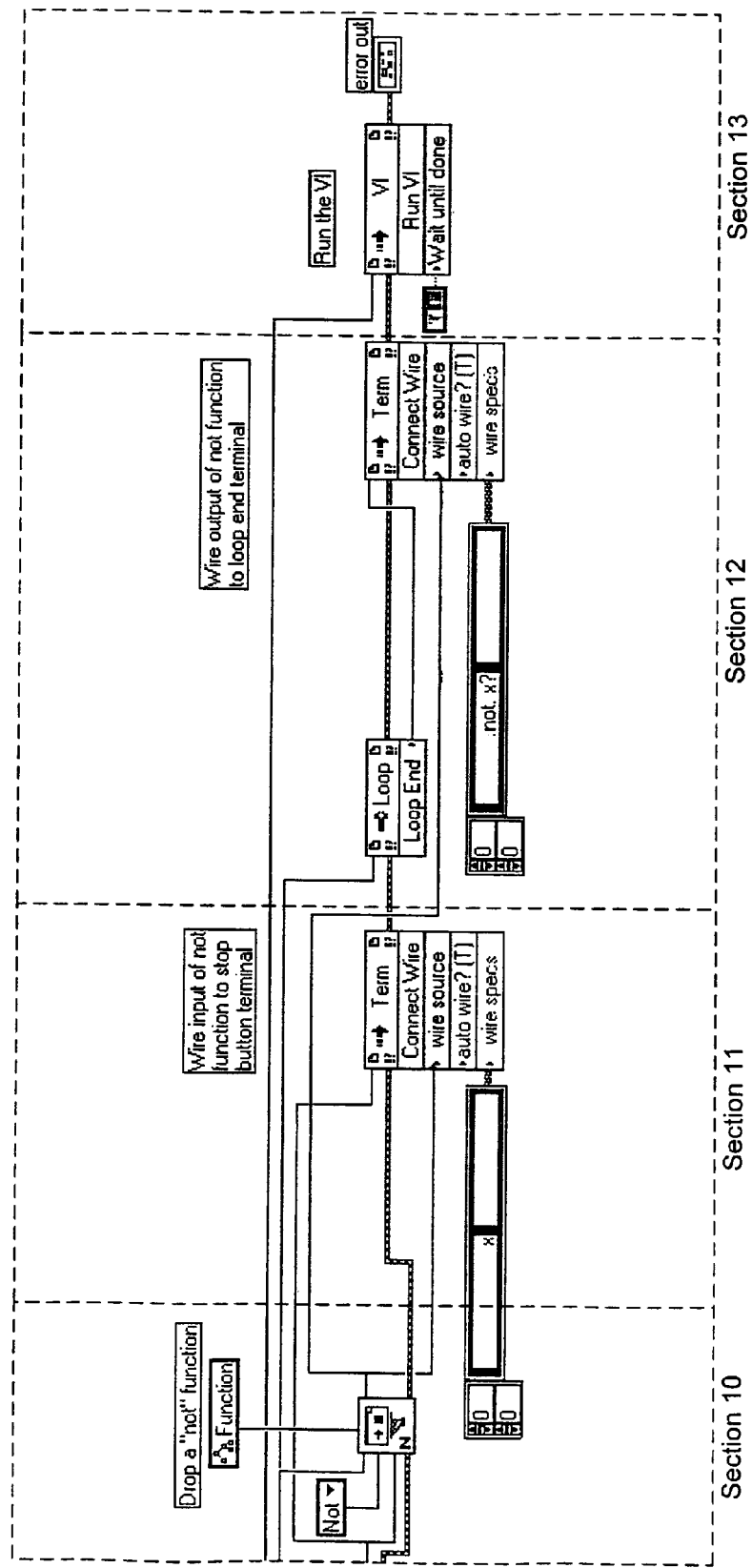

FIGS. 42-44: Programmatic Graphical Program Creation Example

FIGS. 42 and 43 illustrate a slightly more complex example of a graphical program than the program of FIGS. 5A and 5B. FIG. 44 illustrates a client graphical program that uses the nodes described above to create the program shown in FIGS. 42 and 43. The client graphical program of FIG. 44 may be created interactively by a user, as described above.

FIG. 42 illustrates a user interface panel which includes a waveform chart control and a button control. FIG. 43 illustrates a block diagram representing the execution and data flow of the program. Each of the user interface controls of FIG. 42 has a corresponding user interface node in the FIG. 43 block diagram. The rectangular object 610 with the arrowhead is a while loop. The icon 612 is the condition terminal for the while loop 610.

When this program is run, the graphical code shown within the while loop executes until the input to the condition terminal 612 becomes "false". As shown, the user interface node 614 for the stop button is connected to a boolean "Not" function. By default, the output of the stop button user interface node 614 is "false". When a user presses the stop button, the output of the node 614 becomes "true", and the input to the condition terminal 612 thus becomes "false". When this happens, the program terminates, since in this example there is no additional code to execute after the while loop ends.

The icon 616 represents a random number generator function node. The output terminal of the random number node 616 is connected to the input terminal of the waveform chart user interface node 618. Thus, for each iteration of the while loop, a random number is generated and plotted on the waveform chart user interface control. FIG. 42 shows how the waveform chart may appear after several loop iterations. The icon 620 is simply a "wait" function icon with an input constant of 100, which causes a pause of 100 milliseconds for each loop iteration.

FIG. 44 illustrates a client graphical program which uses the nodes described above to dynamically create the graphical program of FIGS. 42 and 43. For clarity, the client graphical program is broken into sections, and the function of each section is described.

In section 1 of FIG. 44, a New VI Reference node is used to create a new graphical program. Since no application reference is passed to the New VI Reference node, the new graphical program is created by the default local LabVIEW application instance. The New VI Reference node outputs a reference to the new graphical program, and the Property node "reference" input receives this reference. As shown, the Property node sets various properties of the graphical program. For example, the origin and coordinate bounds of the user interface panel (front panel) are set, the coordinate bounds of the block diagram window are set, etc. As described above, a user may pop up a menu to select the desired property of an object to get or set. The list of displayed properties may vary according to what type of object the reference input references.

In section 2 of FIG. 44, a New VI Object Reference node is used to create the waveform chart user interface control. As shown, the reference to the new graphical program generated by the New VI Reference node in section 1 is connected as the "owner reference" input of the New VI Object Reference node. Other inputs are also connected which specify the type of object to create, the position to place the object, etc. Once the waveform control is created, the New VI Object Reference node outputs a reference to the waveform control. The property node of section 2 receives this reference input and changes the Y axis range of the waveform control to range from 0.0 to 1.0.

In section 3 of FIG. 44, a New VI Object Reference node is used to create the stop button user interface control. A positioning function is used to specify the position input for the node, in order to appropriately position the button under the waveform chart on the user interface panel.

In section 4 of FIG. 44, a New VI Object Reference node is used to create and position the while loop.

In section 5 of FIG. 44, an Open VI Object Reference node is used to obtain a reference to the user interface node on the block diagram corresponding to the waveform chart user interface control. As shown, a "Control Terminal" data type is specified as the class of the object for which to obtain a reference, "Waveform Chart" is specified as the name of the object for which to obtain a reference, and the reference to the new graphical program is specified as the owner reference. Together, these inputs identify the waveform chart user interface node. Once the reference to the waveform chart user interface node is obtained, the reference is connected to the reference input of the Invoke node shown in section 5. The Invoke node invokes a "Move" method on the waveform chart user interface node, moving it into the area bounded by the while loop. As described above, a user may pop up a menu to select the desired method to invoke on an object. The list of displayed methods may vary according to what type of object the reference input references.

In section 6 of FIG. 44, a New VI Object Reference node is used to create the random number generator function. As shown, the reference to the while loop created in section 4 is used as the "owner reference" input of the New VI Object Reference node. Thus, the random number function is created within the while loop.

In section 7 of FIG. 44, an Invoke node is used to connect the random number generator function to the waveform chart user interface node. As shown, the reference to the waveform chart user interface node is connected to the reference input of the Invoke node. Once the user selects the "Connect Wire" method as the method to invoke, the Invoke node displays a list of relevant input parameters. As shown, the reference to the random number generator function node is supplied as the "wire source" input parameter. Thus, when the Invoke node invokes the "Connect Wire" method, the random number generator function node is connected to the waveform chart user interface node.

In section 8 of FIG. 44, a New VI Object Reference node is used to create a wait function node, an Open VI Object Reference node is used to obtain a reference to the "milliseconds to wait" input terminal of the wait function node, and an Invoke node is used to create a numeric constant of 100 which is connected to the "milliseconds to wait" input terminal of the wait function node.

In section 9 of FIG. 44, the stop button user interface node is moved inside the area bounded by the while loop. Section 9 is similar to section 5 described above.

In section 10 of FIG. 44, a New VI Object Reference node is used to create a "Not" boolean function inside the while loop. Section 10 is similar to the sections described above.

In section 11 of FIG. 44, an Invoke node is used to connect the stop button user interface node to the Not function node. Section 11 is similar to section 7 described above.

In section 12 of FIG. 44, a Property node is used to obtain a reference to the loop condition terminal of the while loop. The reference to the condition terminal is connected as the reference input to the Invoke node shown in section 12, and the Invoke node connects the output of the Not function node to the condition terminal of the while loop, similarly to the sections described above.

In section 13 of FIG. 44, an Invoke node is used to run the newly created graphical program. As shown, the reference to the new graphical program is connected to the reference input of the Invoke node, and a "Run" method is selected as the method to invoke on the program. Although omitted from the above description, error information is propagated through the FIG. 44 client program, and the "error out" node shown in section 13 receives the final error status of the program.

Although this example is primarily concerned with creating a new graphical program, it is noted that the above-described functionality also enables programmatic editing of a graphical program. References to graphical program objects may be obtained, and various properties may be set and various methods may be invoked to move objects, resize objects, add/remove objects, reconnect objects, etc., similarly to the description above. In the preferred embodiment, any operation which a program developer may perform interactively may also be performed programmatically.

Text-Based Client Program

As described above, client programs may also be text-based programs. In the preferred embodiment, a text-based program may obtain a reference to a software component which includes an interface with functions or methods to perform the operations of the nodes described above. For example, a program may obtain a reference to an ActiveX component, where the interface for the ActiveX component includes a CreateNewProgram method which is comparable to the New VI Reference node, a GetProgramObjectReference method which is comparable to the Open VI Object Reference node described above, etc.

In the preferred embodiment, various types of software components are provided which enable programs of various languages executing on various systems to programmatically create/edit graphical programs. As is well known in the art, modern component-based software architecture and object oriented design techniques make it relatively straightforward to encapsulate portions of code and provide various interfaces to the code. For example, a service to create/edit a graphical program may be exposed as an ActiveX component, a CORBA component, a Java component, etc. In the preferred embodiment, the implementation of the nodes described above and the implementation of components for use in text-based programs is based on a common code base.

Configuring the VI Server

As described above, in the preferred embodiment, the server program of FIG. 24 is a LabVIEW application instance which comprises VI Server functionality. The user can configure which parts of the VI Server are available to other applications, as well as enable or disable particular protocols and specify which server resources are exported. This section describes VI Server configuration.

1. Server Configuration

To configure the server for external applications, the user selects Edit>>Preferences on the server machine and selects Server: Configuration from the drop down menu. The dialog box appears as shown in FIG. 45.

Figure 45:
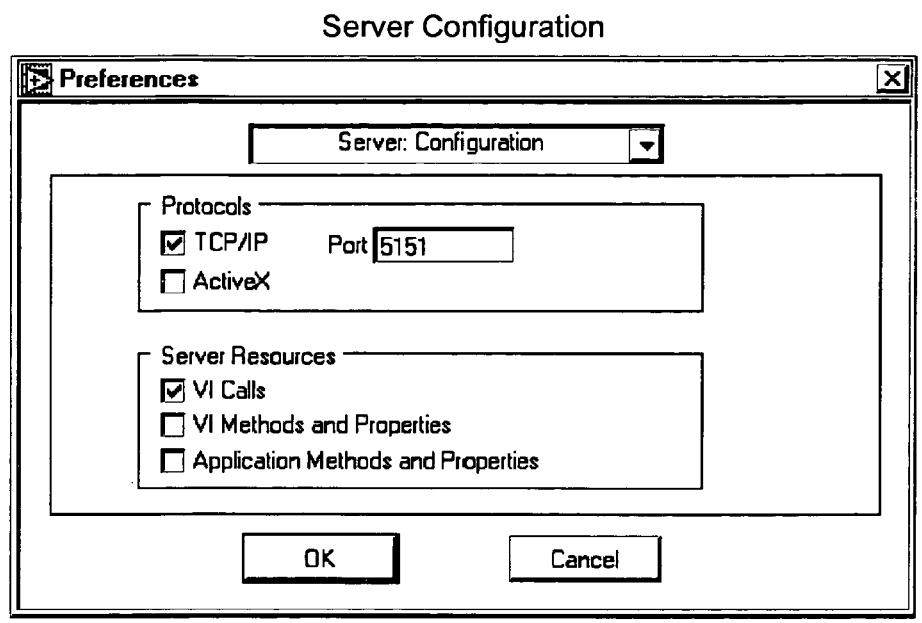
FIGS. 45-47 illustrate dialog boxes for configuring one embodiment of a server program.

The options shown in FIG. 45 specify through which communication protocols other applications can access the VI Server: TCP/IP or ActiveX protocols. If the user enables TCP/IP, the user must enter the Port number that client applications use to connect to the server. When the user allows other applications to connect using TCP/IP, the user should also configure which Internet hosts have access to the server. See the TCP/IP Access Configuration section for more information. For more information about the VI server ActiveX interface, refer to U.S. provisional patent application Ser. No. 60/056,528 titled "System and Method for Accessing Object Capabilities in a Graphical Program" filed Aug. 21, 1997, whose inventors are Ram Kudukoli, Robert Dye, and Murali Parthasarathy, which is hereby incorporated by reference.

With Server: Configuration selected, the user also specifies which server resources are available to applications that access the VI Server. The following server resources are available:

VI Calls allows applications to make calls to VIs on the server. When the user allows other applications access to VIs, the user should also configure which VIs they have access to. See the section Exported VIs Configuration for more information.

VI Methods and Properties allows applications to read and set the properties of VIs on the server. When the user allows other applications access to VIs, the user should also configure which VIs they have access to. See the section Exported VIs Configuration for more information.

Application Methods and Properties allows applications to read and set the properties of the server.

In the example of FIG. 45, TCP/IP server access is enabled for port 5151 and the ActiveX server access is disabled. The server allows remote clients to call VIs, but does not allow access to VI or application methods and properties.

The default server settings have ActiveX enabled and TCP/IP disabled. By default, VI Calls is enabled, but VI Methods and Properties and Application Methods and Properties are disabled.

2. Exported VIs Configuration

Figure 46:
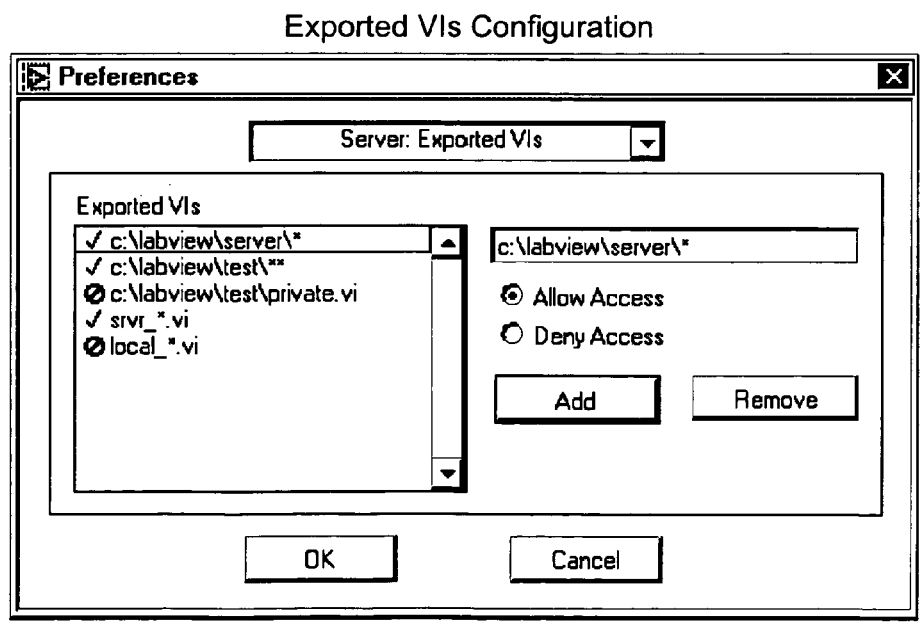

The user may specify which VIs remote applications can access. To configure the exported VIs, the user selects Edit>>Preferences on the server computer, then selects Server: Exported VIs from the drop down menu. The dialog box appears as shown in FIG. 46. Although not shown in FIG. 46, the user may also specify various options which allow or disallow client programs to perform particular operations regarding creating/editing graphical programs. For example, the user may set up the server to allow clients to create new programs, but disallow the editing of existing programs, or the user may set a password required to edit existing programs, etc.

The Server: Exported VIs options allows the user to specify which VIs other applications can access through the VI Server. The Exported VIs list specifies which VIs are exported. To change an entry, the user selects it from the list, then types into the text box at the right of the Exported VIs list. To specify whether remote computers can or cannot access that VI, the user clicks on the Allow Access or Deny Access radio buttons. The user clicks the Add button to insert a new entry after the current selection. The user clicks the Remove button to delete the current selection. The user clicks and drags an entry to change its position within the Exported VIs list. If an entry allows access to VIs, a check mark appears next to the entry. If an entry denies access to VIs, a "cross out" symbol appears next to the entry. If no symbol appears next to the entry, the syntax of the entry is incorrect.

Each entry in the list describes a VI name or a VI path and may contain wildcard characters (see the paragraph below on wildcard characters). Entries that contain path separators are compared against VI paths, while entries that do not contain path separators are compared against VI names only. When a remote client tries to access a VI, the server examines the Exported VIs list to determine whether to grant access to the requested VI. If an entry in the list matches the requested VI, the server either allows or denies access to that VI, based on how that entry is set up. If a subsequent entry also matches the VI, its access permission is used in place of the previous permission. If there is not a VI in the list that matches the requested VI, access to the VI is denied.

As mentioned earlier, the user can use wildcard characters in the Exported VIs list so an entry in the list matches more than one VI. The following wildcard characters can be used:

| | |
|---|---|
| `?' | matches exactly one arbitrary character, except for the path separator. |
| `*' | matches zero or more arbitrary characters, except for the path separator. |
| `**' | together match zero or more arbitrary characters, including the path separator. |

If the user wants to match a VI with a name that contains a wildcard character, the user must escape that character using '\' on the Macintosh and UNIX platforms, and using '`' on Windows.

The following tables shows some examples of Exported VI list entries. The examples use UNIX path separators.

TABLE 1

Server: TCP/IP Access Entries

| | |
|---|---|
| * | Matches all VIs |
| /usr/labview/* | Matches all VIs in the directory /usr/labview/. |
| /usr/labview/** | Matches all VIs in the directory /usr/labview/ and any of its sub-directories. |
| Test.vi | Matches any VI named "Test.vi". |
| *export* | Matches any VI with a name that contains the string "export". |
| OK\? | Matches any VI with the name OK?. |

In FIG. 46, all VIs in the c:\labview\server directory are exported. All VIs in the c:\labview\test directory and all its sub-directories are exported as well, with the exception of the VI c:\Labview\test\private.vi. Additionally, any VI that begins with the string srvr_ and ends with the string .vi is exported. No VI that begins with the string local_ and ends with the string .vi is exported, even if it is located within the c:\labview\server directory.

The default Exported VIs settings allow access to all VIs.

3. TCP/IP Access Configuration

Figure 47:
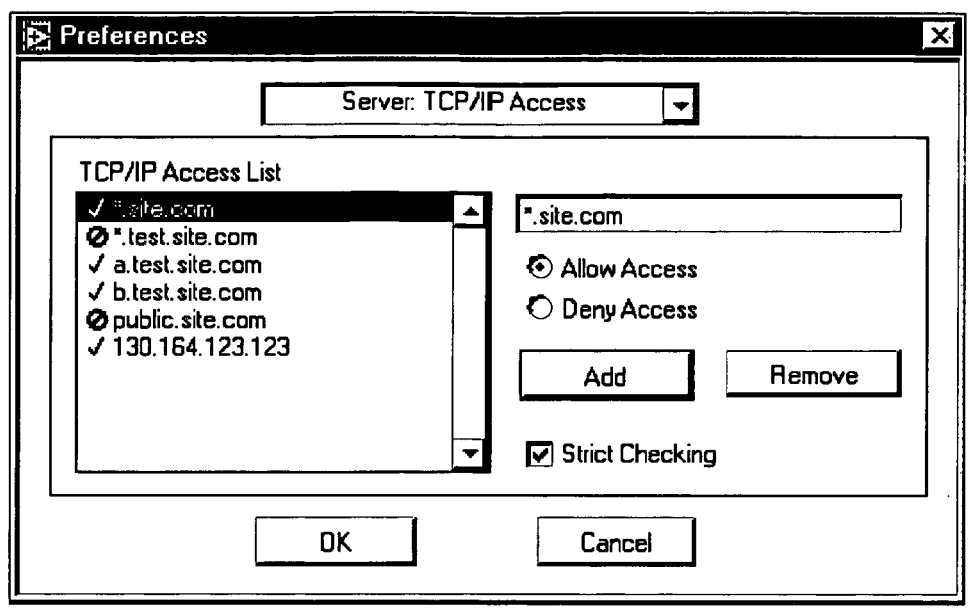
Figure 48:
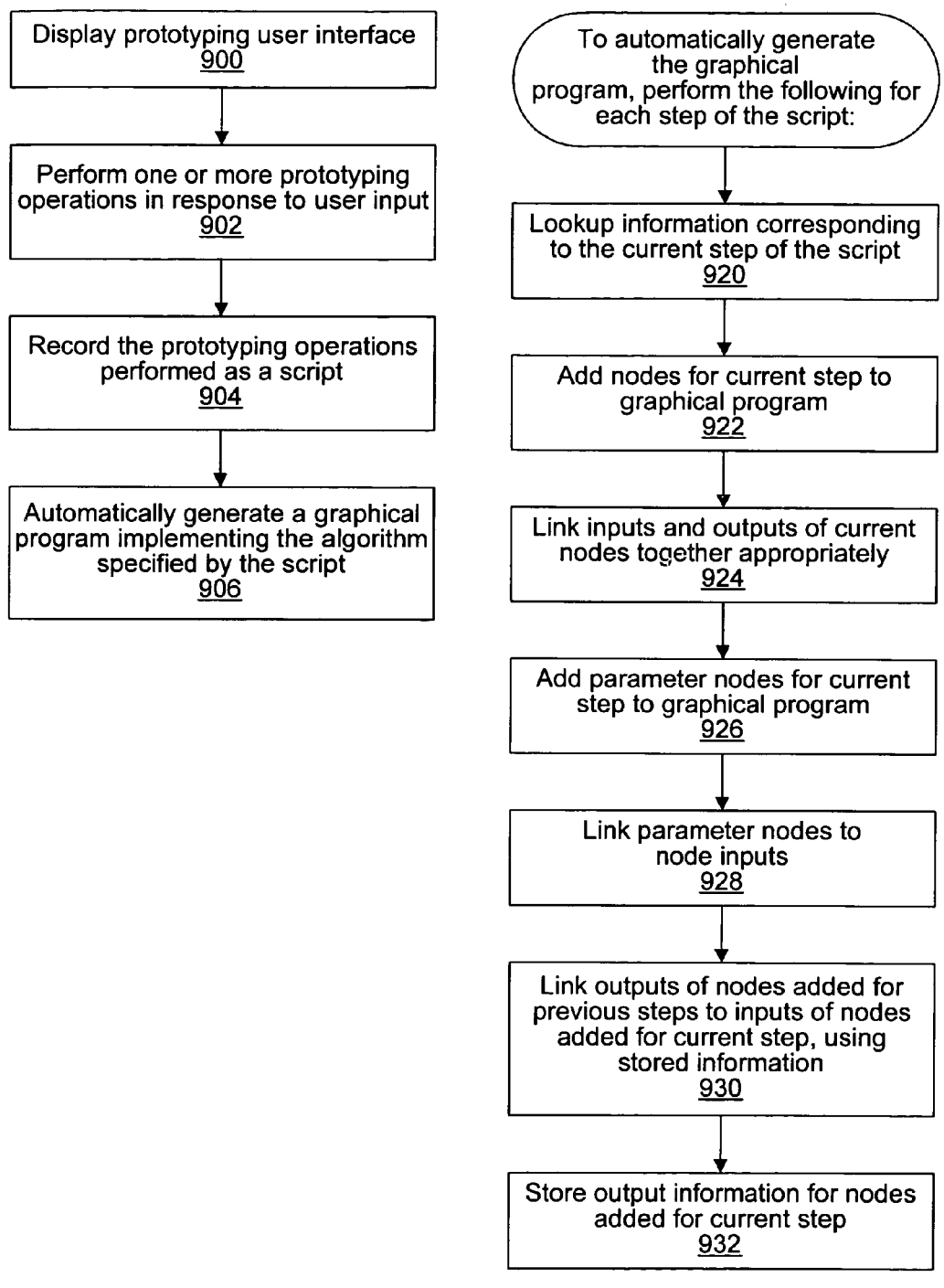
FIG. 48 illustrates flowchart diagrams illustrating how the methods described for automatically generating a graphical program to perform an image processing algorithm may be extended to other applications.

When the user allows remote applications to access the VI Server using the TCP/IP protocol, the user should specify which Internet hosts have access to the server. To configure the clients that have access, the user selects Edit>>Preferences on the server machine and selects Server: TCP/IP Access from the drop down menu. The options appear in the Preferences dialog box as shown in FIG. 47.

Selecting Server: TCP/IP Access allows the user to specify which clients can access the VI Server. The TCP/IP Access List describes clients that either have access to or are denied access to the LabVIEW server. To change an entry, the user selects it from the list, then types into the text box at the right of the TCP/IP Access List. The user clicks on the Allow Access radio button to allow the client to access the server. The user clicks the Deny Access radio button to deny the client access to the server. The user clicks the Add button to insert a new entry after the current selection. the user clicks the Remove button to remove the current selection from the list. The user clicks and drags an entry to change its position within the TCP/IP Access List. If an address is allowed access, a check mark appears next to the entry. If an address is denied access, a "cross out" symbol appears next to the entry. If no symbol appears next to the entry, the syntax of the entry is incorrect.

When a client tries to open a connection to the server, the server examines the entries in the TCP/IP Access List to determine whether it grants access to the client. If an entry in the list matches the client's address, the server either allows or denies access, based on how the user set up the entry. If a subsequent entry also matches the client's address, its access permission is used in place of the previous permission. (For example, in FIG. 46 above, a.test.site.com in the TCP/IP Access List is allowed access even though the list indicates that all addresses ending in.test.site.com are not allowed access. See the paragraph on wildcards later in this document.) If no entry matches the client's address, access is denied.

An Internet (IP) address, such as "130.164.123.123", may have one domain name (such as "www.natinst.com") or more associated with it. The conversion from a domain name to its corresponding IP address is called name resolution. The conversion from an IP address to its domain name is called name lookup.

Name lookups and name resolutions are done through system calls that access domain name system (DNS) servers on the Internet. A name lookup or resolution can fail when the system does not have access to a DNS server, or when the address or name is not valid. A resolution problem occurs when an entry contains a domain name that cannot be resolved into an IP address. A lookup problem occurs when an entry contains a partial domain name, such as "*.natinst.com", and the lookup for the client's IP address fails.

The Strict Checking option determines how the server treats access list entries that cannot be compared to a client's IP address because of resolution or lookup problems. When Strict Checking is enabled, a denying access list entry in the TCP/IP Access List that encounters a resolution problem is treated as if it matched the client's IP address. When Strict Checking is disabled, an access list entry that encounters a resolution problem is ignored.

To specify an Internet host address, the user enters its domain name or IP address. The * wildcard can be used when specifying Internet host addresses. For example, the user can specify all hosts within the domain domain.com with the entry *.domain.com. The user can specify all hosts in the subnet whose first two octets are 130.164 with the entry 130.164.*. The entry * matches all addresses.

The following table shows some examples of TCP/IP Access List entries.

TABLE 2

| Server: TCP/IP Access | |
|---|---|
| * | Matches all hosts. |
| test.site.com | Matches the host whose domain name is test.site.com. |
| *.site.com | Matches all hosts whose domain name ends with *.site.com. |
| 130.164.123.123 | Matches the host with the IP address 130.164.123.123. |
| 130.164.123.* | Matches all hosts whose IP address starts with 130.164.123. |

In FIG. 47, all hosts in the site.com domain have access to the server, with the exception of all hosts in the test.site.com domain. Additionally, the hosts a.test.site.com, b.test.site.com and 130.164.123.123 have also access to the server. The host public.site.com does not have access, even though it is in the site.com domain.

The default TCP/IP Access settings allow access only to clients on the server machine.

It is noted that, if the VI Server runs on a system that does not have access to a DNS server, domain name entries should not be used in the TCP/IP Access list—requests to resolve the domain name or an IP address will fail, slowing down the system. For performance reasons, place frequently matched entries toward the end of the TCP/IP Access List.

Local Client/Server Communication

When a client on a first computer accesses an instance of a VI Server located on the first computer, i.e., accesses a local VI, the respective access node, e.g., the New VI Reference node, the Invoke node, the Property node, etc., operates to manipulate or access the VI in a similar manner as if the VI were in the client graphical program.

Although the system and method of the present invention has been described in connection with the preferred embodiment, it is not intended to be limited to the specific form set forth herein, but on the contrary, it is intended to cover such alternatives, modifications, and equivalents, as can be reasonably included within the spirit and scope of the invention as defined by the appended claims.

We claim:

1. A method of creating a graphical program to perform an algorithm, the method comprising:
    recording one or more functions in response to user input, wherein the one or more functions specify the algorithm; and
    automatically generating the graphical program in response to the recorded one or more functions, wherein the graphical program comprises a plurality of interconnected nodes which visually indicate functionality of the graphical program, wherein the graphical program implements the algorithm;
    wherein said automatically generating the graphical program comprises automatically including the nodes in the graphical program, wherein said automatically including the nodes in the graphical program is performed without direct user input selecting the nodes.

2. The method of claim 1, further comprising:
    performing the one or more functions in response to user input;
    wherein said recording the one or more functions is performed in response to said performing the one or more functions.

3. The method of claim 1,
    wherein said recording the one or more functions comprises creating a prototype.

4. The method of claim 3,
    wherein the prototype comprises a prototype in at least one of the disciplines from the group consisting of:
    image processing, machine vision, image analysis, process control, industrial automation, test and measurement, simulation, workflow processes, and robotics.

5. The method of claim 1,
    wherein said recording the one or more functions is performed in response to user input received via a graphical user interface (GUI).

6. The method of claim 5,
    wherein the graphical user interface is associated with a prototyping environment application.

7. The method of claim 5,
    wherein the user input comprises selecting the functions from one or more of a menu or palette.

8. The method of claim 1,
    wherein said automatically generating the graphical program comprises automatically including and connecting the nodes in the graphical program without direct user input.

9. The method of claim 1, further comprising:
    executing the graphical program to perform the algorithm.

10. The method of claim 1,
    wherein the graphical program includes a block diagram portion and a user interface panel portion.

11. The method of claim 1,
    wherein the graphical program is a graphical data flow program.

12. The method of claim 1,
    wherein said automatically generating the graphical program comprises automatically including one or more nodes corresponding to respective ones of the one or more functions in the graphical program.

13. The method of claim 1, wherein the recorded one or more functions comprise a script, the method further comprising:
    creating an association between the script and the graphical program;
    modifying the script to create a new script in response to user input after said creating the association; and
    modifying the graphical program according to the new script to create a new graphical program.

14. The method of claim 13,
    wherein said modifying the graphical program according to the new script uses the association between the script and the graphical program;
    wherein the association remains between the new script and the new graphical program.

15. The method of claim 13, further comprising:
    receiving user input indicating a desire to change the graphical program;
    displaying script information of the script;
    modifying the script information in response to user input; and modifying the graphical program after said modifying the script information.

16. The method of claim 13, further comprising:
creating an association between the script and the graphical program;
locking the association between the script and the graphical program, wherein said locking prevents user editing of the graphical program.

17. The method of claim 16, further comprising:
unlocking the association between the script and the graphical program in response to user input after said locking;
directly changing the graphical program in response to user input after said unlocking.

18. The method of claim 17,
wherein said unlocking removes the association between the script and the graphical program.

19. The method of claim 16, further comprising:
modifying the graphical program in response to user input after said generating the graphical program and after said creating the association between the script and the graphical program;
determining if an association exists between the script and the graphical program in response to said modifying the graphical program; and
removing the association between the script and the graphical program in response to said modifying.

20. The method of claim 1, further comprising:
receiving user input specifying code generation information;
wherein said automatically generating the graphical program utilizes the code generation information.

21. The method of claim 20,
wherein the code generation information specifies a type of graphical program to create in response to the recorded one or more functions;
wherein the graphical program is created in accordance with the specified graphical program type.

22. The method of claim 21,
wherein the graphical program type specifies a particular graphical programming environment;
wherein the graphical program is created in a file format that is usable by the particular graphical programming environment.

23. The method of claim 20,
wherein a plurality of parameters are associated with the one or more functions, wherein each parameter is an input parameter which provides input to a function or an output parameter which accepts output from a function;
wherein the code generation information specifies one or more of the input parameters which are desired to be interactively changeable or one or more of the output parameters which are desired to be interactively viewable;
wherein said automatically generating the graphical program comprises enabling the graphical program to receive user input during program operation, wherein the user input specifies values for the specified one or more input parameters;
wherein said automatically generating the graphical program comprises enabling the graphical program to display output during program operation, wherein the output indicates values for the specified one or more output parameters.

24. The method of claim 1,
wherein said automatically generating the graphical program comprises:
generating portions of graphical code, wherein each portion of graphical code implements one of the functions;
linking the portions of graphical code together.

25. The method of claim 24,
wherein each portion of graphical code includes one or more graphical program nodes, wherein each node has one or more inputs or outputs;
wherein generating each portion of graphical code comprises connecting the node inputs and outputs together in order to implement the function with which the portion of graphical code is associated.

26. The method of claim 25,
wherein linking a first portion of graphical code to a second portion of graphical code comprises connecting an output of a node in the first portion of graphical code to an input of a node in the second portion of graphical code.

27. The method of claim 25,
wherein at least one of the functions has an associated input parameter;
wherein each portion of code that implements a function that has an associated input parameter includes a node that has an input for receiving a value for the input parameter;
wherein each portion of code that implements a function that has an associated input parameter includes a leaf node that has an output for providing a value for the input parameter;
wherein the leaf node output for providing the parameter value is connected to the node input for receiving the parameter value.

28. The method of claim 25,
wherein at least one of the functions has an associated output parameter;
wherein each portion of code that implements a function that has an associated output parameter includes a node that has an output for providing a value for the output parameter;
wherein each portion of code that implements a function that has an associated output parameter includes a leaf node that has an input for receiving a value for the output parameter;
wherein the leaf node input for receiving the parameter value is connected to the node output for providing the parameter value.

29. The method of claim 24, further comprising:
for each function, retrieving information associated with the function from a database;
wherein generating the portion of graphical code that implements a particular function utilizes the database information retrieved for the particular function.

30. A system for creating a graphical program to perform an algorithm, the system comprising:
a processor;
a memory coupled to the processor which stores a prototyping environment application;
a user input device which receives user input;
wherein the prototyping environment application is executable in response to the user input to store one or more functions in the memory, wherein the one or more functions specify the algorithm;
wherein the prototyping environment application is executable to automatically generate a graphical program in response to the stored one or more functions, wherein the graphical program comprises a plurality of interconnected nodes which visually indicate functionality of the graphical program, wherein the graphical program implements the algorithm specified by the one or more functions;

wherein, in automatically generating the graphical program, the prototyping environment application is executable to automatically include the nodes in the graphical program without direct user input selecting the nodes.

31. The system of claim 30,
wherein said storing the one or more functions in the memory comprises creating a prototype.

32. The system of claim 31,
wherein the prototyping environment application is a prototyping environment application in at least one of the disciplines from the group consisting of:
image processing, machine vision, image analysis, process control, industrial automation, test and measurement, simulation, workflow processes, and robotics.

33. The system of claim 30,
wherein the prototyping environment application includes a graphical user interface (GUI);
wherein said storing the one or more functions in the memory is performed in response to user input received via the graphical user interface.

34. The system of claim 33,
wherein the user input comprises selecting the functions from one or more of a menu or palette.

35. The system of claim 30, further comprising:
a graphical program creation program stored in the memory;
wherein the prototyping environment application is executable to call the graphical program creation program;
wherein the graphical program creation program is executable to automatically generate the graphical program in response to said prototyping environment application calling the graphical program creation program.

36. The system of claim 35,
wherein the graphical program creation program is a graphical programming development environment application.

37. The system of claim 35,
wherein the stored one or more functions comprise a script;
wherein the memory stores an association between the script and the graphical program;
wherein the prototyping environment application is executable to utilize the association to modify the script to create a new script in response to user input;
wherein the graphical program creation program is executable to modify the graphical program according to the new script to create a new graphical program.

38. The system of claim 37,
wherein the memory stores an association between the script and the graphical program;
wherein the memory stores information specifying that the association between the script and the graphical program is locked, wherein said locking prevents user editing of the graphical program.

39. The system of claim 30,
wherein said automatically generating the graphical program comprises automatically including and connecting the nodes in the graphical program without direct user input.

40. The system of claim 30,
wherein the graphical program includes a block diagram portion and a user interface portion.

41. The system of claim 30,
wherein the graphical program is a graphical data flow program.

42. The system of claim 30,
wherein said automatically generating the graphical program comprises automatically including one or more nodes corresponding to respective ones of the one or more functions in the graphical program.

43. The system of claim 30,
wherein the prototyping environment application is executable to receive user input specifying code generation information, wherein the code generation information specifies information to use in generating the graphical program.

44. The system of claim 43,
wherein the code generation information specifies a type of graphical program to create in response to the stored one or more functions;
wherein the graphical program is created in accordance with the specified graphical program type.

45. The method of claim 44,
wherein the graphical program type specifies a particular graphical programming environment;
wherein the graphical program is created in a file format that is usable by the particular graphical programming environment.

46. The system of claim 43,
wherein a plurality of parameters are associated with the functions, wherein each parameter is an input parameter which provides input to a function or an output parameter which accepts output from a function;
wherein the code generation information specifies one or more of the input parameters which are desired to be interactively changeable or one or more of the output parameters which are desired to be interactively viewable;
wherein said automatically generating the graphical program comprises enabling the graphical program to receive user input during program operation, wherein the user input specifies values for the specified one or more input parameters;
wherein said automatically generating the graphical program comprises enabling the graphical program to display output during program operation, wherein the output indicates values for the specified one or more output parameters.

47. The system of claim 30,
wherein said automatically generating the graphical program comprises:
generating portions of graphical code, wherein each portion of graphical code implements one of the functions;
linking the portions of graphical code together.

48. The system of claim 47,
wherein each portion of graphical code includes one or more graphical program nodes, wherein each node has one or more inputs or outputs;
wherein generating each portion of graphical code comprises connecting the node inputs and outputs together in order to implement the function with which the portion of graphical code is associated.

49. The system of claim 48,
wherein linking a first portion of graphical code to a second portion of graphical code comprises connecting an output of a node in the first portion of graphical code to an input of a node in the second portion of graphical code.

50. The system of claim 47,
wherein, for each function, information associated with the function is retrieved from a database;
wherein generating the portion of graphical code that implements a particular function utilizes the database information retrieved for the particular function.

51. A memory medium comprising program instructions executable to:
record one or more functions in response to user input, wherein the one or more functions specify an algorithm; and
automatically generate a graphical program in response to the recorded one or more functions, wherein the graphical program comprises a plurality of interconnected nodes which visually indicate functionality of the graphical program, wherein the graphical program implements the algorithm;
wherein said automatically generating the graphical program comprises automatically generating graphical code in the graphical program without direct user input.

52. The memory medium of claim 51, further comprising program instructions executable to:
perform the one or more functions in response to user input;
wherein said recording the one or more functions is performed in response to said performing the one or more functions.

53. The memory medium of claim 51,
wherein said recording the one or more functions comprises creating a prototype.

54. The memory medium of claim 53,
wherein the prototype comprises a prototype in at least one of the disciplines from the group consisting of:
image processing, machine vision, image analysis, process control, industrial automation, test and measurement, simulation, workflow processes, and robotics.

55. The memory medium of claim 51,
wherein said recording the one or more functions is performed in response to user input received via a graphical user interface (GUI).

56. The memory medium of claim 55,
wherein the graphical user interface is associated with a prototyping environment application.

57. The memory medium of claim 55,
wherein the user input comprises selecting the functions from one or more of a menu or palette.

58. The memory medium of claim 51,
wherein said automatically generating the graphical program comprises automatically including and connecting the nodes in the graphical program without direct user input.

59. The memory medium of claim 51, further comprising program instructions executable to:
execute the graphical program to perform the algorithm.

60. The memory medium of claim 51,
wherein the graphical program includes a block diagram portion and a user interface panel portion.

61. The memory medium of claim 51,
wherein said automatically generating the graphical program comprises automatically including one or more nodes corresponding to respective ones of the one or more functions in the graphical program.

62. The memory medium of claim 51, wherein the recorded one or more functions comprise a script, the memory medium further comprising program instructions executable to:
create an association between the script and the graphical program;
modify the script to create a new script in response to user input after said creating the association; and
modify the graphical program according to the new script to create a new graphical program.

63. The memory medium of claim 62, further comprising program instructions executable to:
create an association between the script and the graphical program;
lock the association between the script and the graphical program, wherein said locking prevents user editing of the graphical program.

64. The memory medium of claim 51, further comprising program instructions executable to:
receive user input specifying code generation information;
wherein said automatically generating the graphical program utilizes the code generation information.

65. The memory medium of claim 64,
wherein the code generation information specifies a type of graphical program to create in response to the recorded one or more functions;
wherein the graphical program is created in accordance with the specified graphical program type.

66. The memory medium of claim 64,
wherein a plurality of parameters are associated with the one or more functions, wherein each parameter is an input parameter which provides input to a function or an output parameter which accepts output from a function;
wherein the code generation information specifies one or more of the input parameters which are desired to be interactively changeable or one or more of the output parameters which are desired to be interactively viewable;
wherein said automatically generating the graphical program comprises enabling the graphical program to receive user input during program operation, wherein the user input specifies values for the specified one or more input parameters;
wherein said automatically generating the graphical program comprises enabling the graphical program to display output during program operation, wherein the output indicates values for the specified one or more output parameters.

67. The memory medium of claim 51,
wherein said automatically generating the graphical program comprises:
generating portions of graphical code, wherein each portion of graphical code implements one of the functions;
linking the portions of graphical code together.

68. A method of creating a graphical program to perform an algorithm, the method comprising:
creating a prototype in response to user input, wherein the prototype specifies the algorithm; and
automatically generating the graphical program in response to the prototype, wherein the graphical program comprises a plurality of interconnected nodes which visually indicate functionality of the graphical program, wherein the graphical program implements the algorithm;
wherein said automatically generating the graphical program comprises automatically including the nodes in the graphical program, wherein said automatically including the nodes in the graphical program is performed without direct user input selecting the nodes.

69. The method of claim 68,
wherein the prototype comprises a prototype in at least one of the disciplines from the group consisting of:

image processing, machine vision, image analysis, process control, industrial automation, test and measurement, simulation, telecommunications, workflow processes, and robotics.

70. The method of claim 68,
wherein the user input is received via a graphical user interface (GUI) associated with a prototyping environment application.

71. The method of claim 70,
wherein the user input comprises selecting one or more functions from one or more of a menu or palette.

72. The method of claim 68,
wherein said automatically generating the graphical program comprises programmatically including and connecting the nodes in the graphical program without direct user input.

73. The method of claim 68,
wherein said automatically generating the graphical program comprises automatically including one or more function nodes in the graphical program.

74. The method of claim 68,
wherein said creating the prototype in response to user input comprises creating a diagrammatic model of the algorithm.

75. The method of claim 68,
wherein said creating the prototype in response to user input comprises recording one or more functions in response to user input;
wherein the recorded one or more functions specify the algorithm.

76. The method of claim 75,
wherein said automatically generating the graphical program comprises:
generating portions of graphical code, wherein each portion of graphical code implements one of the functions;
linking the portions of graphical code together.

77. A memory medium comprising program instructions for creating a graphical program to perform an algorithm, wherein the program instructions are executable to implement:
creating a prototype in response to user input, wherein the prototype specifies the algorithm; and
automatically generating the graphical program in response to the prototype, wherein the graphical program comprises a plurality of interconnected nodes which visually indicate functionality of the graphical program, wherein the graphical program implements the algorithm;
wherein said automatically generating the graphical program comprises automatically generating graphical code in the graphical program without direct user input.

78. The memory medium of claim 77,
wherein the prototype comprises a prototype in at least one of the disciplines from the group consisting of:
image processing, machine vision, image analysis, process control, industrial automation, test and measurement, simulation, telecommunications, workflow processes, and robotics.

79. The memory medium of claim 77,
wherein the user input is received via a graphical user interface (GUI) associated with a prototyping environment application.

80. The memory medium of claim 79,
wherein the user input comprises selecting one or more functions from one or more of a menu and a palette.

81. The memory medium of claim 77,
wherein said automatically generating the graphical program comprises programmatically including and connecting the nodes in the graphical program without direct user input.

82. The memory medium of claim 77,
wherein said automatically generating the graphical program comprises automatically including one or more function nodes in the graphical program.

83. The memory medium of claim 77,
wherein said creating the prototype in response to user input comprises creating a diagrammatic model of the algorithm.

84. The memory medium of claim 77,
wherein said creating the prototype in response to user input comprises recording one or more functions in response to user input;
wherein the recorded one or more functions specify the algorithm.

85. The memory medium of claim 84,
wherein said automatically generating the graphical program comprises:
generating portions of graphical code, wherein each portion of graphical code implements one of the functions;
linking the portions of graphical code together.

86. A memory medium comprising program instructions executable to:
record one or more functions in response to user input, wherein the one or more functions specify an algorithm; and
automatically generate a graphical program in response to the recorded one or more functions, wherein the graphical program comprises a plurality of interconnected nodes which visually indicate functionality of the graphical program, wherein the graphical program implements the algorithm;
wherein, in automatically generating the graphical program, the program instructions are executable to automatically generate graphical code in the graphical program without direct user input.

* * * * *